(12) United States Patent
Miura

(10) Patent No.: US 8,616,706 B2
(45) Date of Patent: Dec. 31, 2013

(54) ILLUMINATION DEVICE, PROJECTION DISPLAY, AND DIRECT-VIEW DISPLAY

(75) Inventor: Koji Miura, Tokyo (JP)

(73) Assignee: Sony Corporation, Tokyo (JP)

( * ) Notice: Subject to any disclaimer, the term of this patent is extended or adjusted under 35 U.S.C. 154(b) by 107 days.

(21) Appl. No.: 13/414,797

(22) Filed: Mar. 8, 2012

(65) Prior Publication Data

US 2012/0242961 A1    Sep. 27, 2012

(30) Foreign Application Priority Data

Mar. 22, 2011   (JP) ................................ 2011-062923
Nov. 28, 2011   (JP) ................................ 2011-258665

(51) Int. Cl.
*G03B 21/14*    (2006.01)

(52) U.S. Cl.
USPC ..................... 353/38; 362/309; 362/311.02

(58) Field of Classification Search
USPC .......... 353/31, 34, 37, 38, 102; 362/231, 232, 362/249.02, 255, 277
See application file for complete search history.

(56) References Cited

U.S. PATENT DOCUMENTS

| | | | |
|---|---|---|---|
| 5,313,479 A | 5/1994 | Florence | |
| 7,995,298 B2 * | 8/2011 | Chen | 359/831 |
| 2012/0086916 A1 * | 4/2012 | Miura et al. | 353/38 |
| 2012/0092624 A1 * | 4/2012 | Oiwa et al. | 353/31 |
| 2012/0133900 A1 * | 5/2012 | Miura | 353/31 |
| 2012/0133901 A1 * | 5/2012 | Miura | 353/31 |
| 2012/0242960 A1 * | 9/2012 | Oiwa et al. | 353/31 |
| 2012/0249621 A1 * | 10/2012 | Miura | 345/694 |
| 2012/0249918 A1 * | 10/2012 | Yasui | 349/61 |
| 2013/0016136 A1 * | 1/2013 | Yasui et al. | 345/690 |
| 2013/0021581 A1 * | 1/2013 | Takahashi et al. | 353/31 |
| 2013/0088652 A1 * | 4/2013 | Yasui | 349/5 |

FOREIGN PATENT DOCUMENTS

| | | |
|---|---|---|
| JP | 55-065940 | 5/1980 |
| JP | 06-208089 | 7/1994 |
| JP | 2008-134324 | 6/2008 |

* cited by examiner

*Primary Examiner* — William C Dowling
(74) *Attorney, Agent, or Firm* — Dentons US LLP

(57) ABSTRACT

An illumination device includes: a first light source; a first beam spread angle changing element; an integrator; and a first small-amplitude oscillation element, in which the integrator is configured of a first fly-eye lens and a second fly-eye lens, optical magnification of an optical system configured of the first beam spread angle changing element and the first and second fly-eye lenses, and a shape of the first small-amplitude oscillation element are determined to allow a size of each light source image formed on the second fly-eye lens by each cell of the first fly-eye lens not to exceed a size of one cell of the second fly-eye lens, an amount of displacement of each light source image by oscillation amplitude of the first small-amplitude oscillation element is determined not to form the light source image over a plurality of cells of the second fly-eye lens.

13 Claims, 32 Drawing Sheets

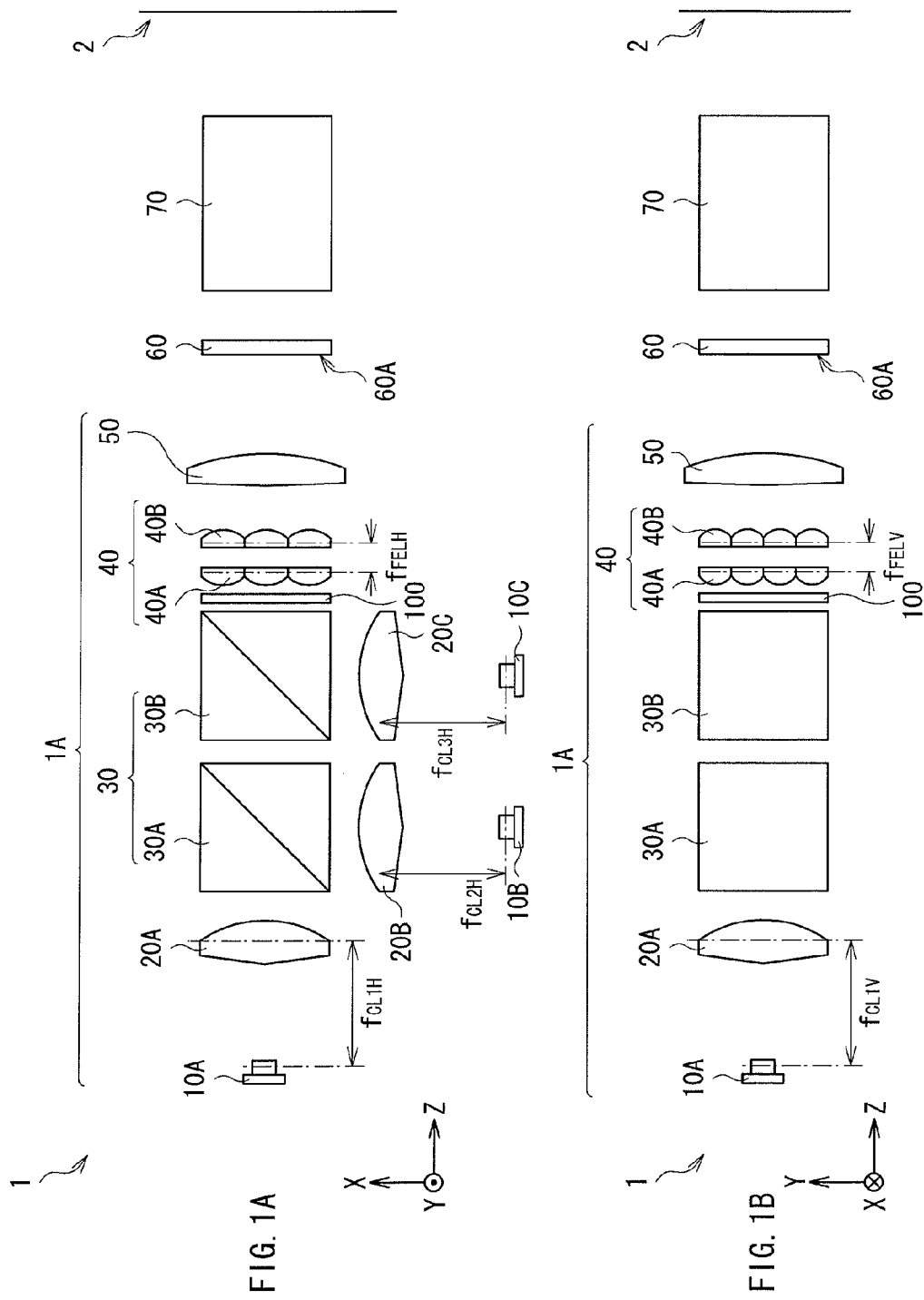

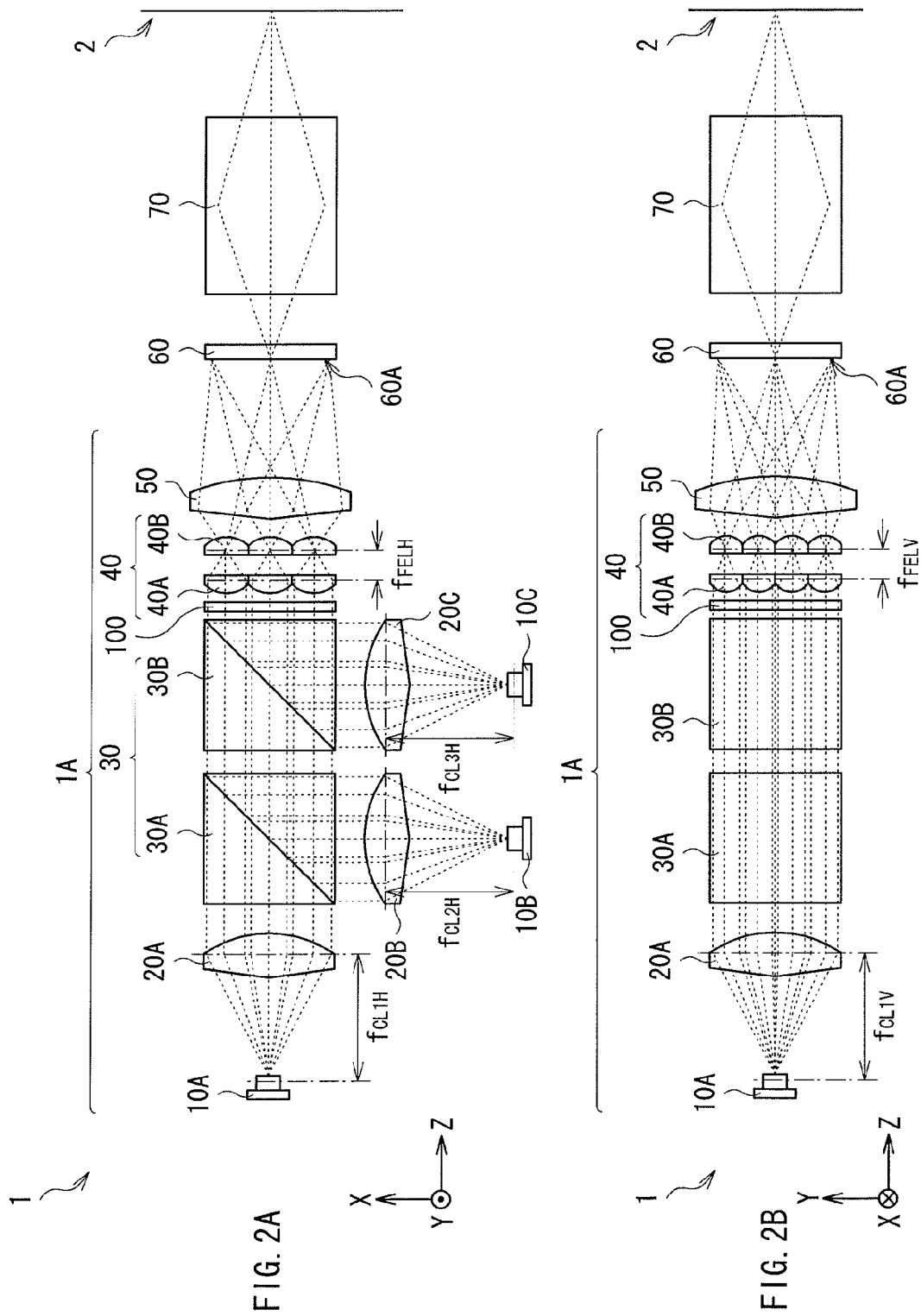

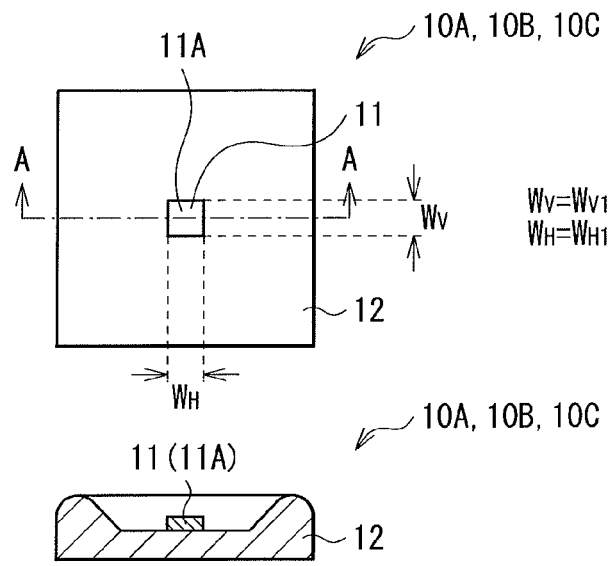
FIG. 3A
FIG. 3B
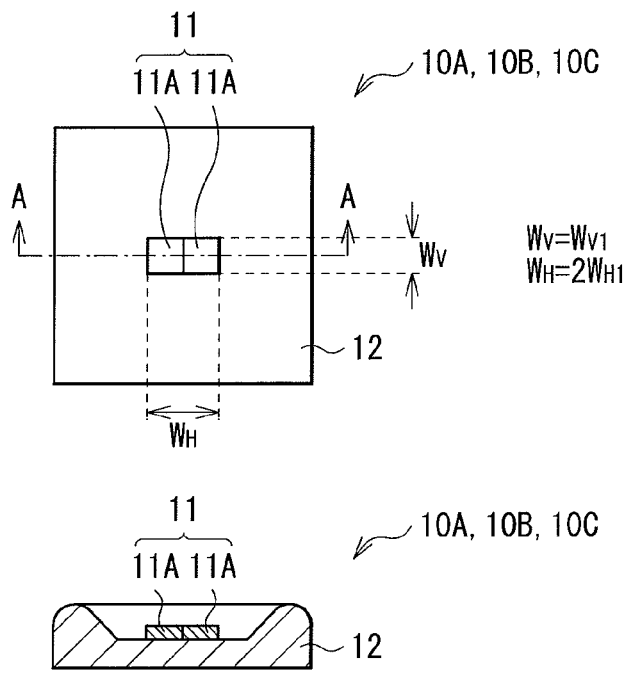
FIG. 4A
FIG. 4B

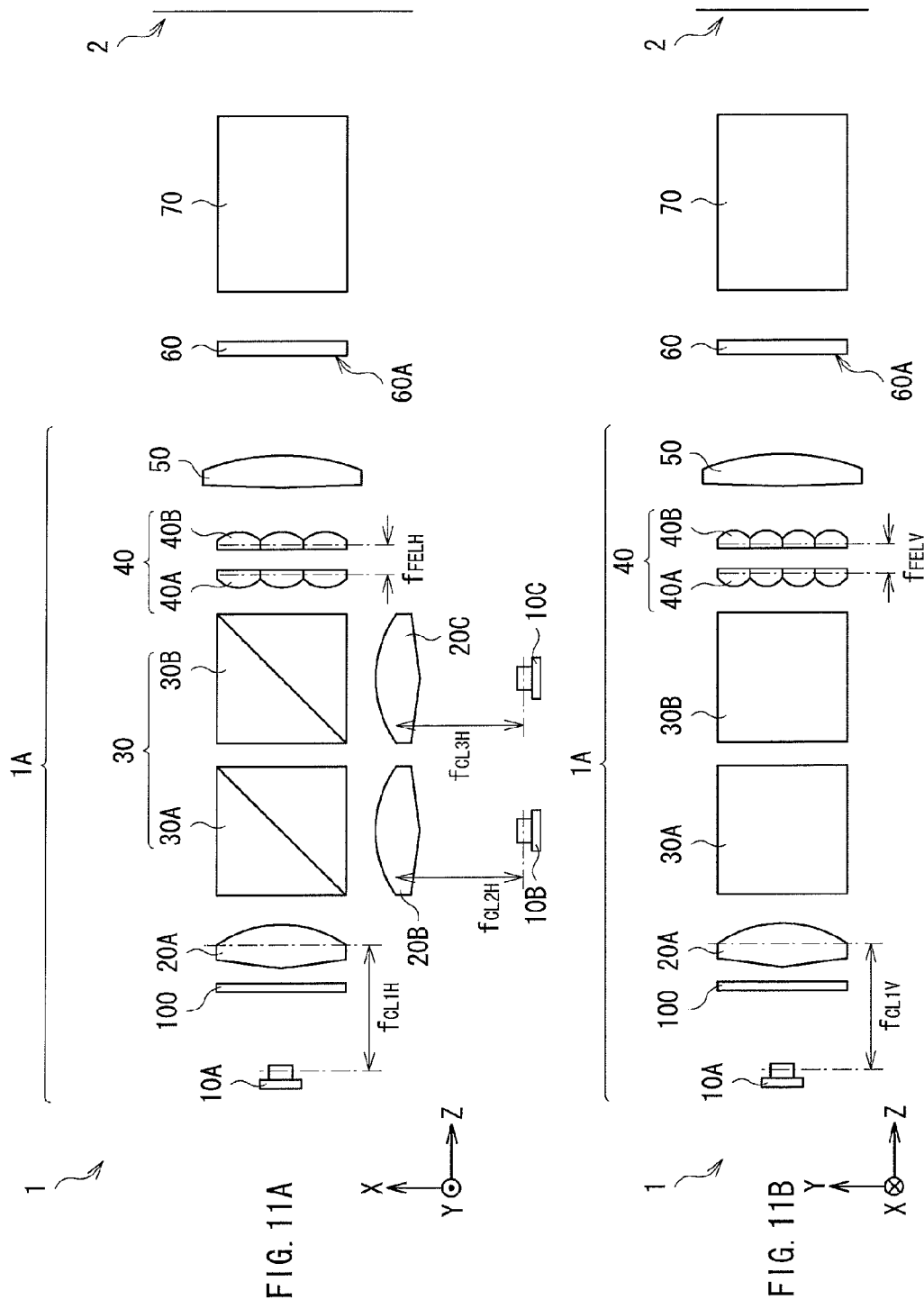

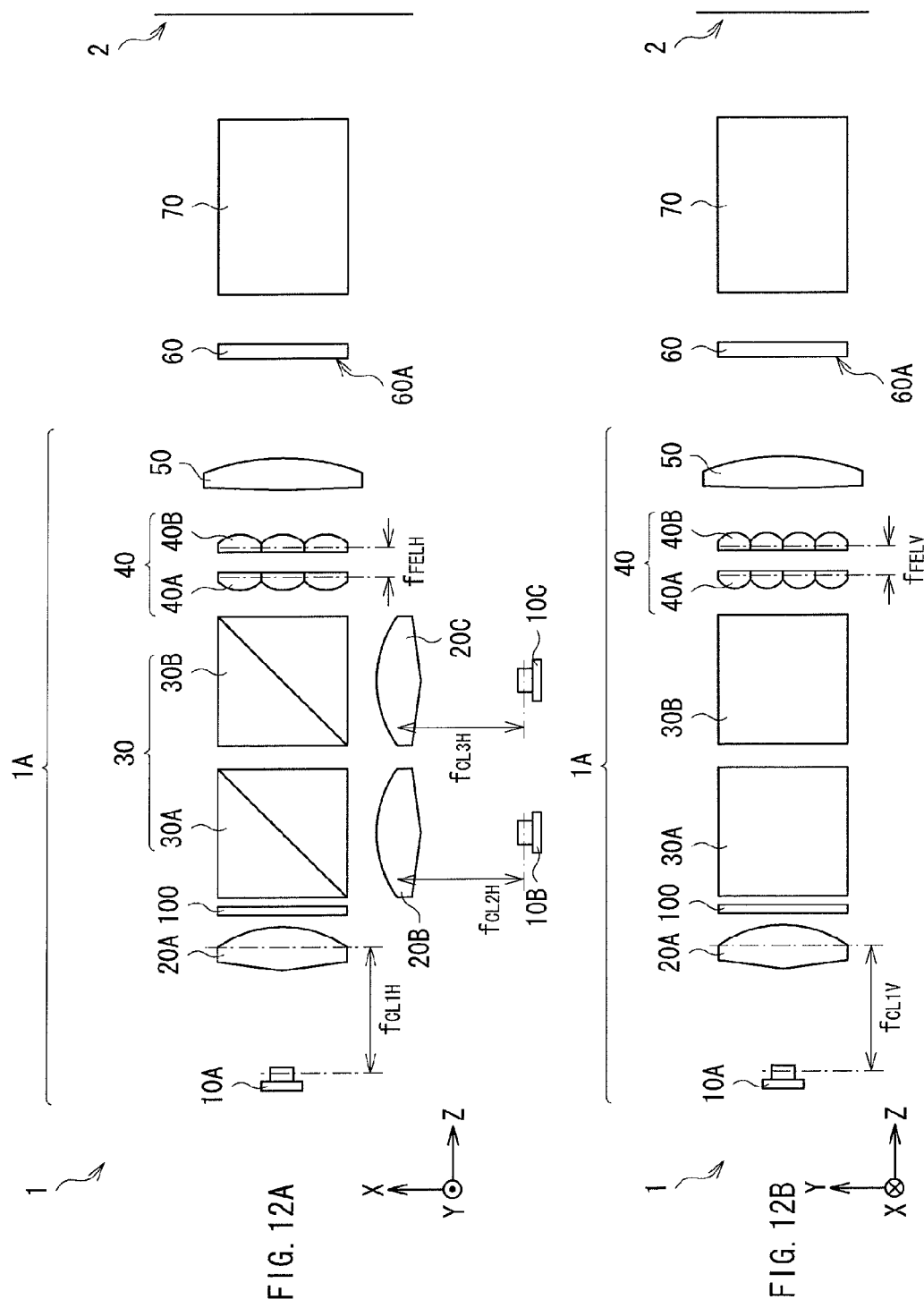

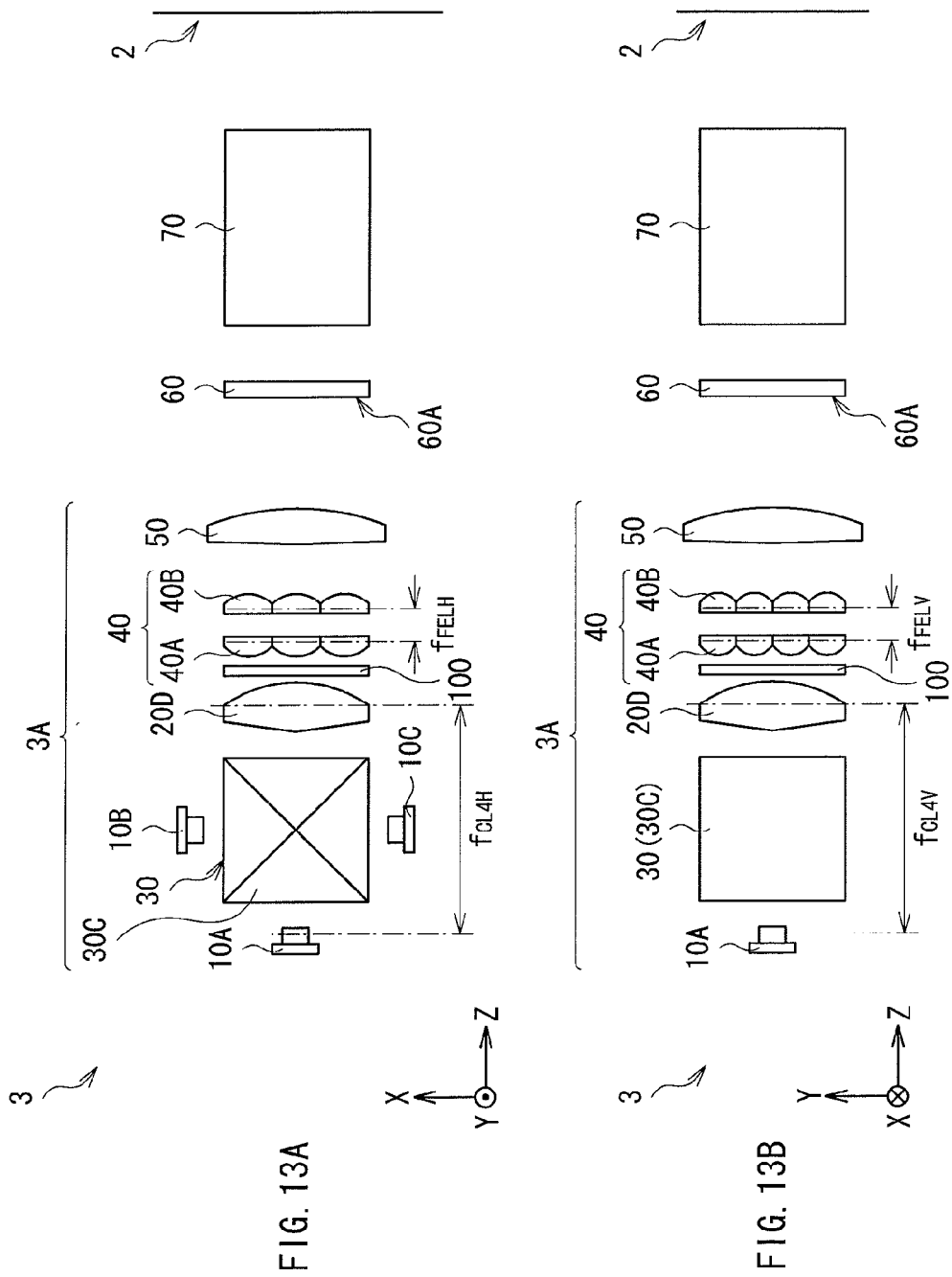

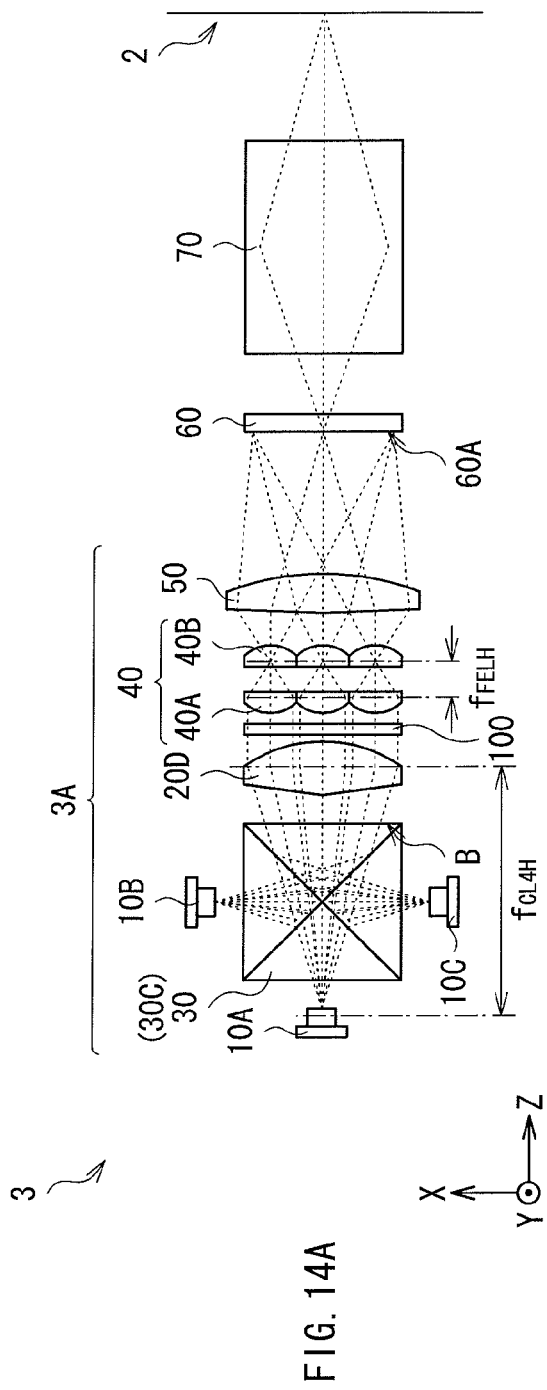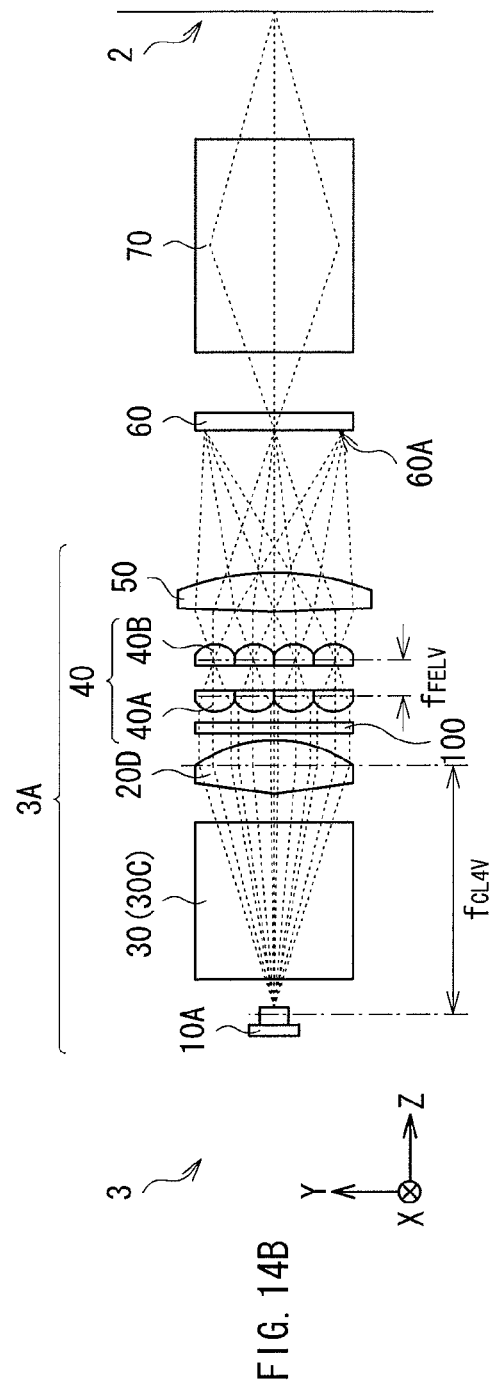

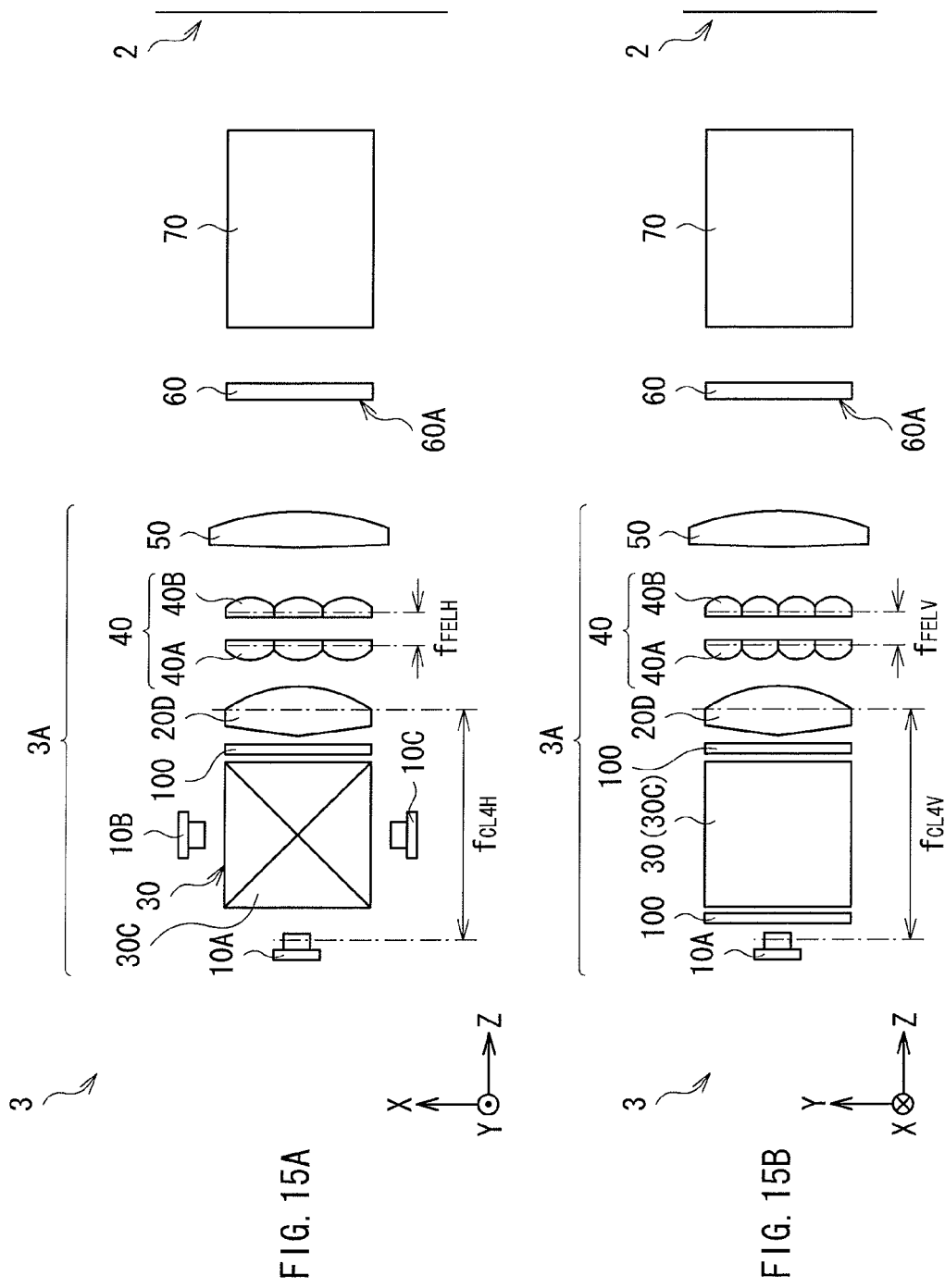

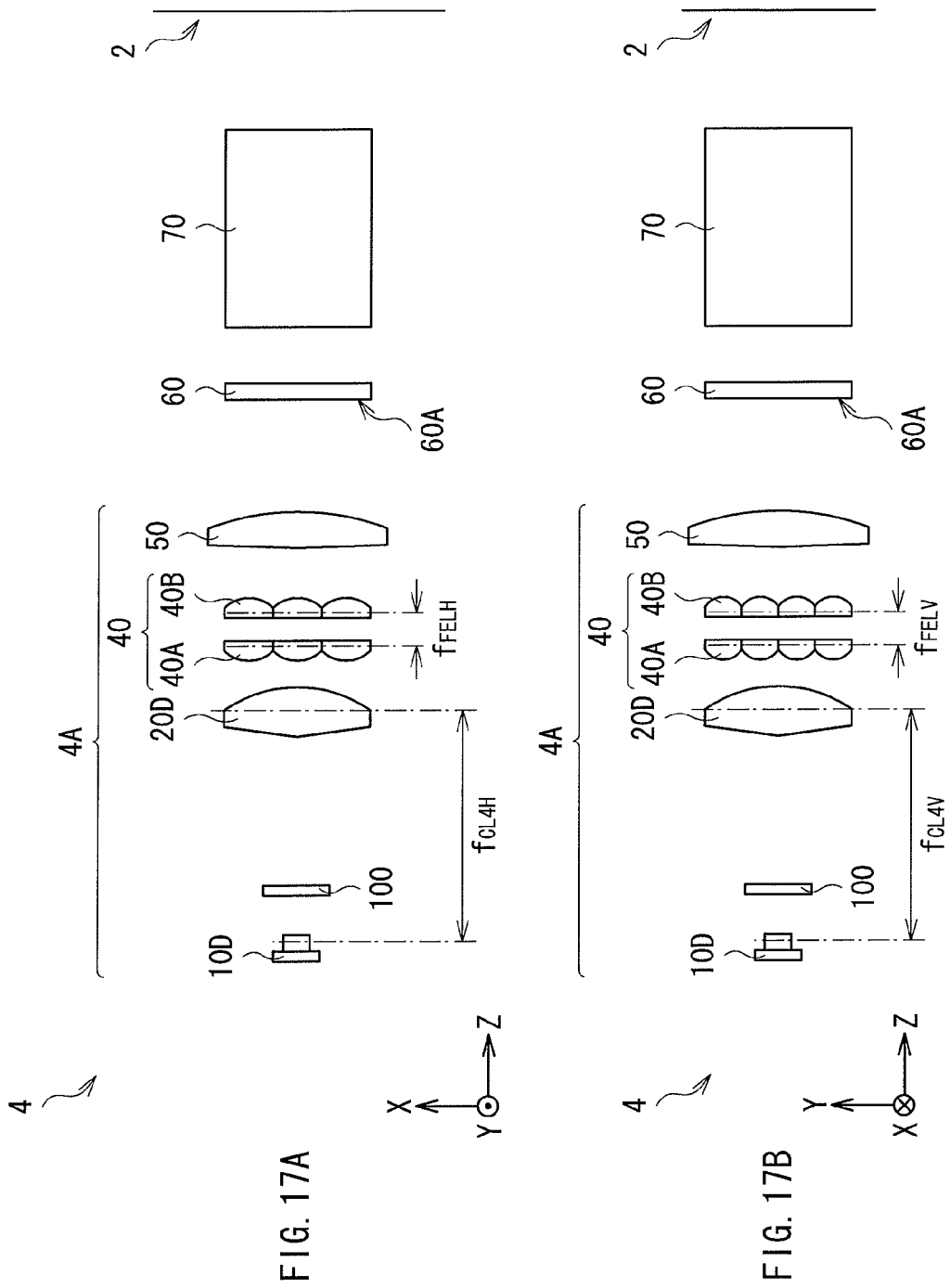

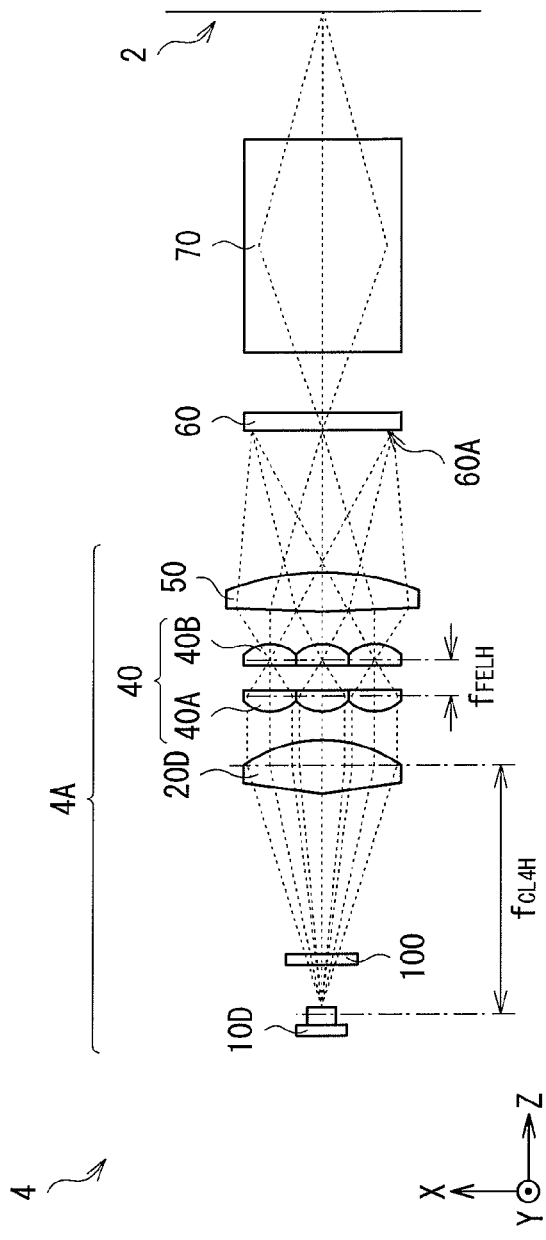
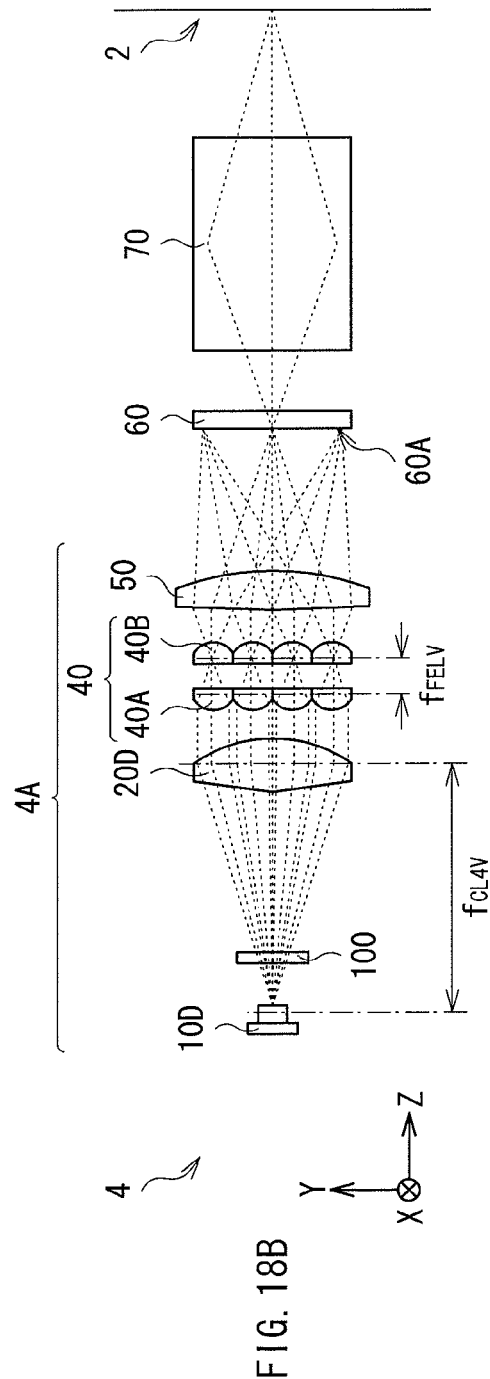
FIG. 18A
FIG. 18B

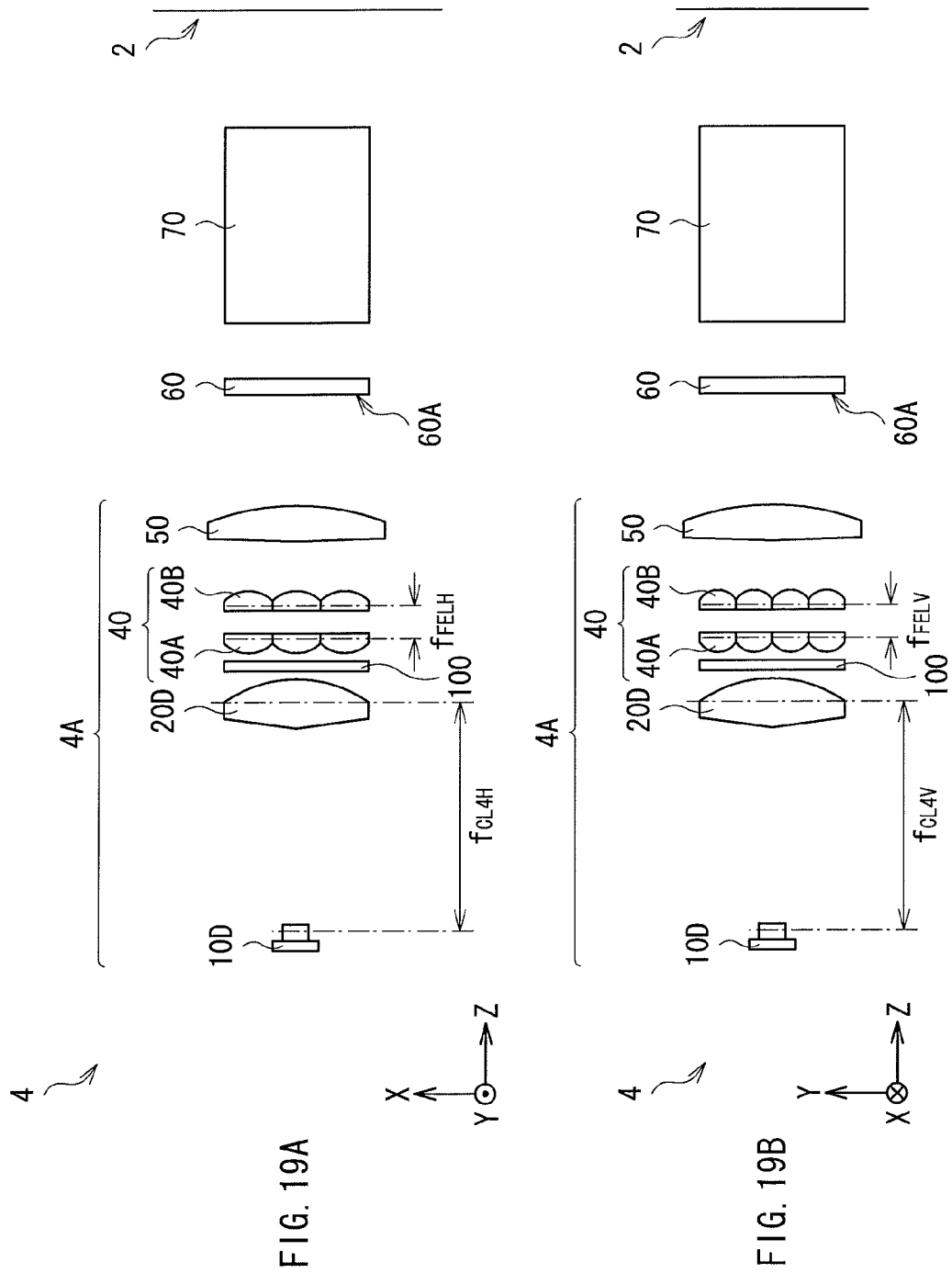

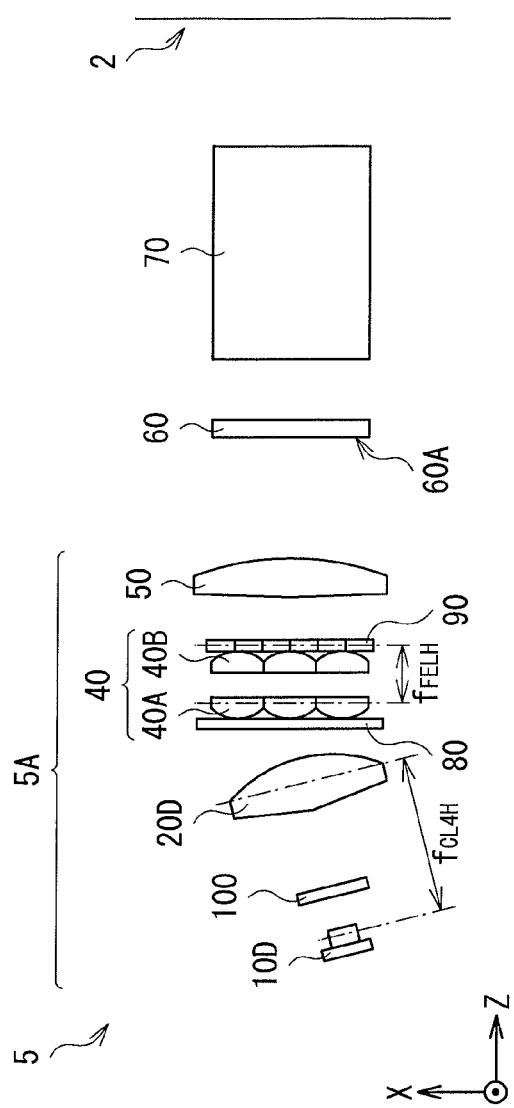
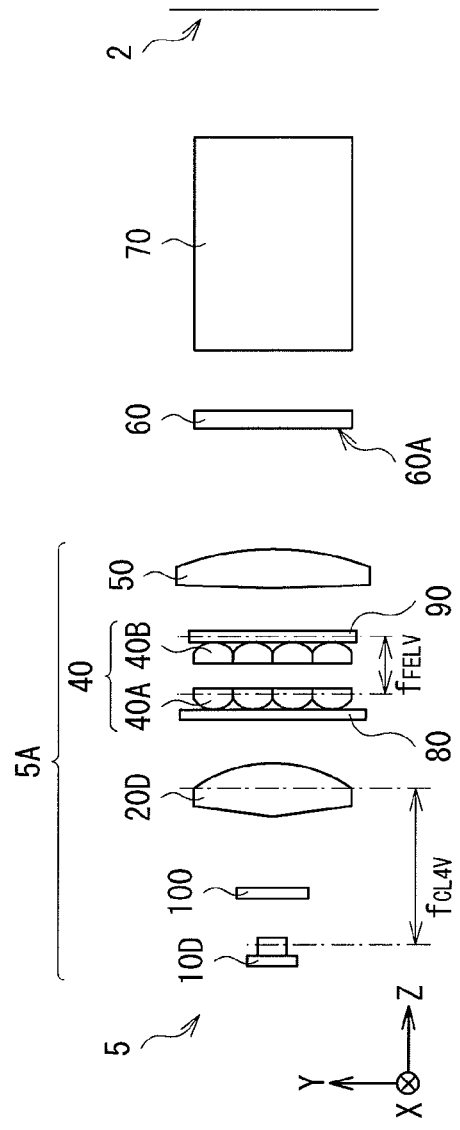
FIG. 20A
FIG. 20B

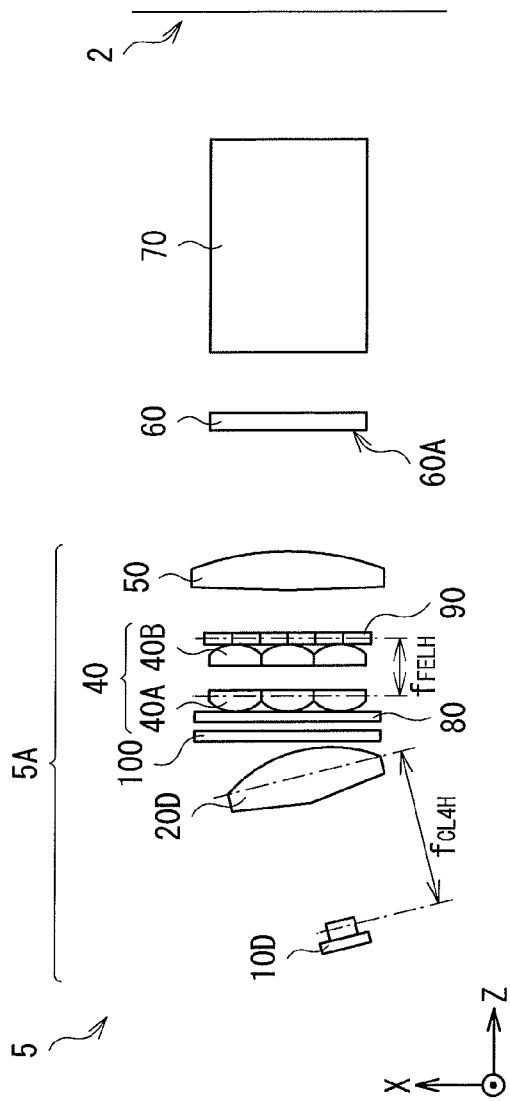
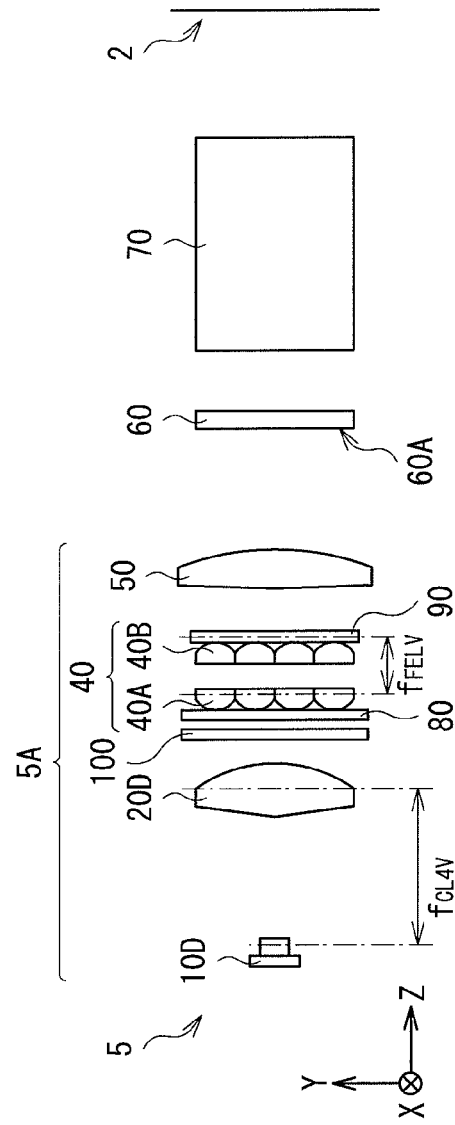
FIG. 25A
FIG. 25B

|  |  | EXAMPLE 1 | EXAMPLE 2 | EXAMPLE 3 |
|---|---|---|---|---|
| ILLUMINATED RANGE | H | 4 | 4 | 5.3 |
|  | V | 3 | 2.25 | 3 |
| LIGHT SOURCE SIZE | $W_H$ | 1 | 1 | 1 |
|  | $W_V$ | 1 | 1 | 1 |
| FLY-EYE LENS FOCAL LENGTH | $f_{FELH}$ | 3 | 3 | 3 |
|  | $f_{FELV}$ | 3 | 3 | 2 |
| FLY-EYE LENS SIZE | $h_{FEL2H}$ | 1 | 1 | 1 |
|  | $h_{FEL2V}$ | 0.75 | 0.5625 | 0.566037736 |
| BEAM SPREAD ANGLE OF LIGHT SOURCE | $\theta_H$ | 50 | 60 | 80 |
|  | $\theta_V$ | 50 | 40 | 55 |
| COLLIMATOR EFFECTIVE SIZE | $h_{CLH}$ | 7 | 7 | 7 |
|  | $h_{CLV}$ | 7 | 7 | 6 |
| NA | $NA_H$ | 0.766044443 | 0.866025404 | 0.984807753 |
|  | $NA_V$ | 0.766044443 | 0.64278761 | 0.819152044 |
| CONDITIONAL EXPRESSION |  | $3 \leq f_{CLH} \leq 4.6$ | $3 \leq f_{CLH} \leq 4$ | $3 \leq f_{CLH} \leq 3.6$ |
|  |  | $4 \leq f_{CLV} \leq 4.6$ | $5.3 \leq f_{CLV} \leq 5.4$ | $3.5 \leq f_{CLV} \leq 3.7$ |

FIG. 26

|  |  | EXAMPLE 4 |
|---|---|---|
| ILLUMINATED RANGE | H | 4 |
|  | V | 3 |
| LIGHT SOURCE SIZE | $W_H$ | 1 |
|  | $W_V$ | 1 |
| FLY-EYE LENS FOCAL LENGTH | $f_{FELH}$ | 3 |
|  | $f_{FELV}$ | 3 |
| BEAM SPREAD ANGLE OF LIGHT SOURCE | $\theta_H$ | 50 |
|  | $\theta_V$ | 50 |
| COLLIMATOR EFFECTIVE SIZE | $h_{CLH}$ | 10 |
|  | $h_{CLV}$ | 7 |
| NA | $NA_H$ | 0.766044443 |
|  | $NA_V$ | 0.766044443 |
| CONDITIONAL EXPRESSION |  | $6 \leq f_{CLH} \leq 6.5$ |
|  |  | $4 \leq f_{CLV} \leq 4.6$ |

FIG. 27

$W_V = W_{V1}$
$W_H \geqq 3W_{H1}$

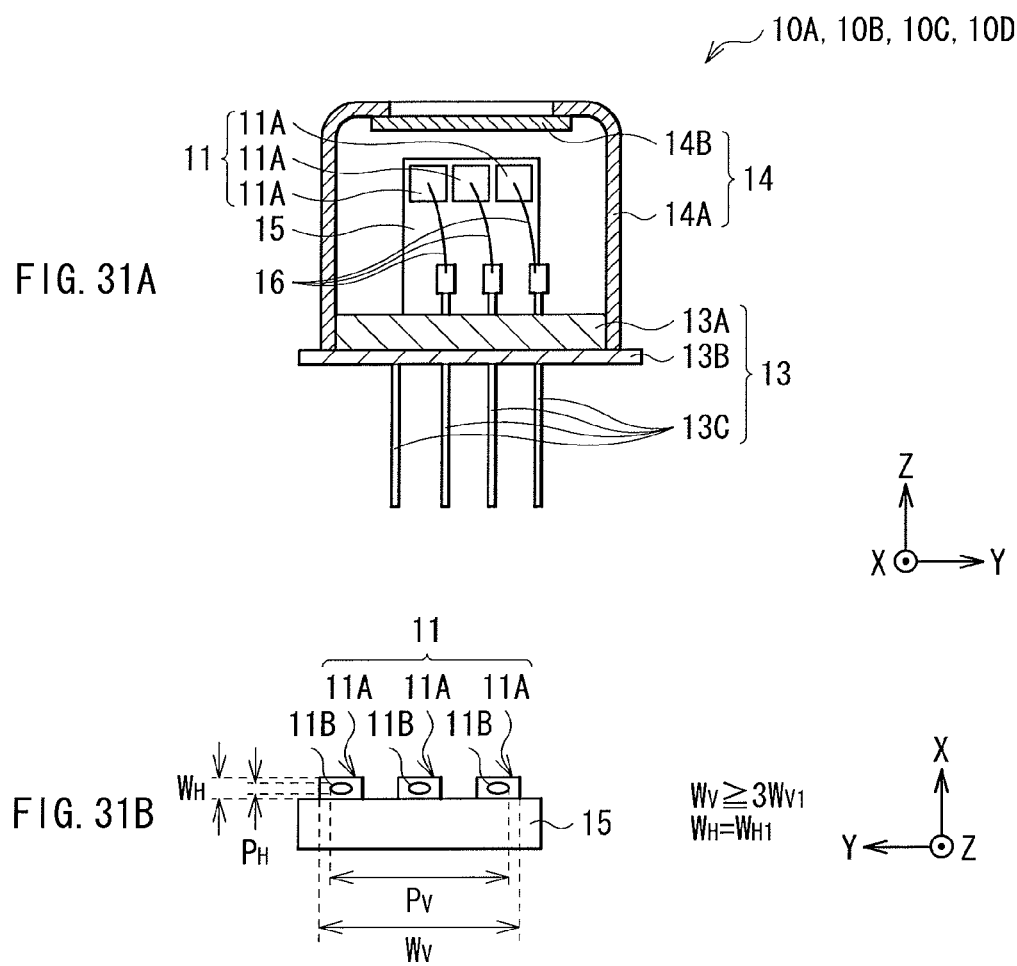

$W_V \geq 2W_{V1}$
$W_H = W_{H1}$

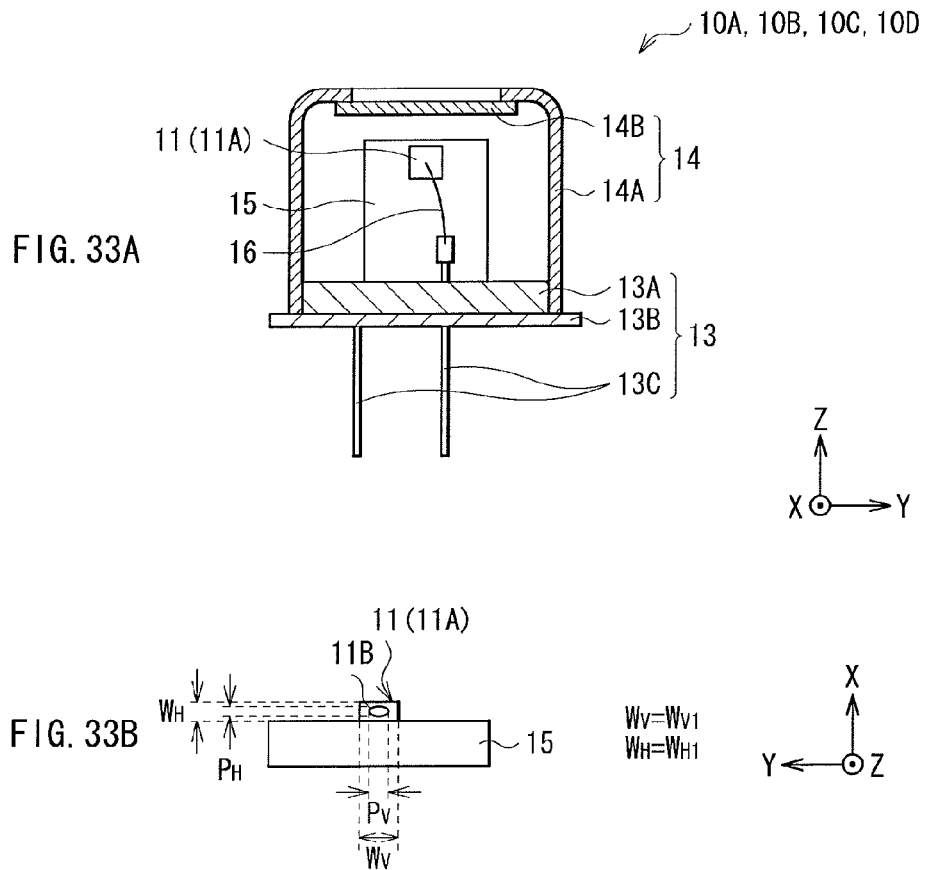
FIG. 33A
FIG. 33B
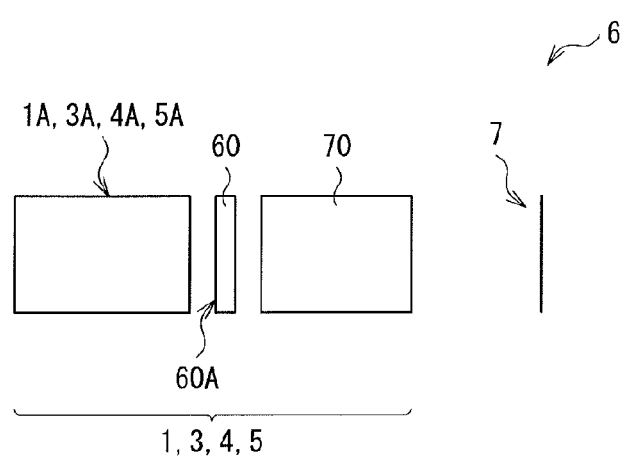
FIG. 34

ILLUMINATION DEVICE, PROJECTION DISPLAY, AND DIRECT-VIEW DISPLAY

BACKGROUND

The present technology relates to an illumination device using a solid light-emitting element such as a laser diode (LD), and a projection display and a direct-view display each including the illumination device.

In recent years, projectors projecting pictures on a screen are widely used not only in offices but also in households. Projectors generate image light by modulating light from a light source by a light valve to project the image light on a screen, thereby performing display. Recently, palm-size ultrasmall projectors, cellular phones with built-in ultrasmall projectors, and the like are starting to become widespread (for example, refer to Japanese Unexamined Patent Application Publication No. 2008-134324).

SUMMARY

As light sources used for projectors, high-intensity discharge lamps are mainstream. However, the discharge lamps have a relatively large size and high power consumption; therefore, in recent years, solid light-emitting elements such as light-emitting diodes (LEDs), laser diodes (LDs), and organic ELs (OLEDs) have been attracting attention as alternatives to the discharge lamps. These solid light-emitting elements have advantages over the discharge lamps not only in size and power consumption but also in high reliability.

In the case where a laser diode is used as a light source of a projector, laser light is coherent; therefore, speckles are superimposed onto a display image on a screen. Speckles are perceived as high-intensity random noise by human eyes, thereby leading a decline in display image quality.

Therefore, to reduce the generation of speckles, in Japanese Unexamined Patent Application Publication No. S55-65940, a technique of applying small-amplitude oscillation to a screen is proposed. In general, human eyes and brains do not perceive flicker in images within a range of approximately 20 ms to 50 ms. In other words, images within such duration are integrated and averaged in human eyes. Therefore, when a large number of individual speckle patterns are superimposed onto a screen within the duration, speckles are allowed to be averaged enough not to perceive speckles by human eyes. However, in this technique, it is necessary to apply small-amplitude oscillation to the screen, thereby causing upsizing of a device configuration.

Moreover, in Japanese Unexamined Patent Application Publication No. H6-208089, there is proposed a technique of mechanically rotating a diffusion element to move the position of a speckle pattern on a screen at high speed, thereby not allowing human eyes to detect speckle noise. However, in this technique, light is diffused with use of the diffusion element, thereby causing a decline in light use efficiency.

It is desirable to provide an illumination device capable of reducing the generation of speckles while achieving downsizing and an improvement in light use efficiency. Moreover, it is desirable to provide a projection display and a direct-view display each using such an illumination device.

According to an embodiment of the technology, there is provided an illumination device including a first light source including a first solid light-emitting element which emits light from a light-emission region configured of a single or a plurality of light-emission spots. The illumination device further includes a first beam spread angle changing element changing a beam spread angle of light incident from the first light source, and an integrator equalizing an illuminance distribution of light in a predetermined illuminated region illuminated with light having passed through the first beam spread angle changing element. The illumination device further includes a first small-amplitude oscillation element disposed between the first light source and the first beam spread angle changing element or between the first beam spread angle changing element and the integrator, and changing, from time to time, an illumination state in the illuminated region. In this case, the first solid light-emitting element includes a laser diode. The integrator is configured of a first fly-eye lens and a second fly-eye lens, the first fly-eye lens where light from the first beam spread angle changing element enters, the second fly-eye lens where light from the first fly-eye lens enters. Optical magnification of an optical system configured of the first beam spread angle changing element and the first and second fly-eye lenses, and a shape of the first small-amplitude oscillation element are determined to allow a size of each light source image formed on the second fly-eye lens by each cell of the first fly-eye lens not to exceed a size of one cell of the second fly-eye lens. Moreover, an amount of displacement of each light source image by oscillation amplitude of the first small-amplitude oscillation element is determined not to form the light source image over a plurality of cells of the second fly-eye lens.

According to an embodiment of the technology, there is provided a projection display including: an illumination optical system; a spatial modulating element modulating light from the illumination optical system based on an input picture signal to generate image light; and a projection optical system projecting the image light generated by the spatial modulating element. The illumination optical system included in the projection display includes the same components as those included in the above-described illumination device.

According to an embodiment of the technology, there is provided a direct-view display including: an illumination optical system; a spatial modulating element modulating light from the illumination optical system based on an input picture signal to generate image light; a projection optical system projecting the image light generated by the spatial modulating element; and a transmissive screen displaying the image light projected from the projection optical system. The illumination optical system included in the direct-view display includes the same components as those included in the above-described illumination device.

In the illumination device, the projection display, and the direct-view display according to the embodiment of the technology, the first small-amplitude oscillation element changing, from time to time, the illumination state in the region illuminated with light having passed through the integrator is disposed between the first light source and the integrator. Therefore, speckles are allowed to be averaged enough not to perceive speckles by human eyes. Moreover, in the embodiment of the technology, the optical magnification of the optical system configured of the first beam spread angle changing element and the first and second fly-eye lenses, and the shape of the first small-amplitude oscillation element are determined to allow the size of each light source image formed on the second fly-eye lens by each cell of the first fly-eye lens not to exceed the size of one cell of the second fly-eye lens. Moreover, the amount of displacement of each light source image by oscillation amplitude of the first small-amplitude oscillation element is determined not to form the light source image over a plurality of cells of the second fly-eye lens. Therefore, light incident to the second fly-eye lens efficiently reaches the illuminated region. It is to be noted that the first small-amplitude oscillation element oscillates enough to allow the illumination state in the illuminated region to be changed from time to time; therefore, the first small-amplitude oscillation element does not impede downsizing of the illumination device.

In the embodiment of the technology, the first solid light-emitting element may be configured of a single chip emitting light in a predetermined wavelength band, or a plurality of chips emitting light in the same wavelength band, or light in different wavelength bands. In this case, the amount of displacement of the light source image by oscillation amplitude of the first small-amplitude oscillation element preferably satisfies the following relational expression:

$$h+d \leq h_{FEL2}$$

where h is the size of the light source image, d is the amount of displacement of the light source image by oscillation of the first small-amplitude oscillation element, and $h_{FEL2}$ is the size of one cell of the second fly-eye lens.

In the embodiment of the technology, cells of the first and second fly-eye lenses each may have an aspect ratio not equal to 1. In this case, as illustrated in the following expressions, the amount of displacement of the light source image by oscillation amplitude of the first small-amplitude oscillation element is preferably determined in consideration of the aspect ratio:

$$h_x+d_x \leq h_{FEL2x}$$

$$h_y+d_y \leq h_{FEL2y}$$

where $h_x$ is a size in a first direction (a longer direction of each cell of the first and second fly-eye lenses or a direction corresponding thereto) of the light source image, $h_y$ is a size in a second direction (a shorter direction of each cell of the first and second fly-eye lenses or a direction corresponding thereto) orthogonal to the first direction of the light source image, $h_{FEL2x}$ is a size in the first direction of one cell of the second fly-eye lens, $h_{FEL2y}$ is a size in the second direction of one cell of the second fly-eye lens, $d_x$ is a component in the first direction ($d_x \geq 0$, but $d_x>0$ under $d_y=0$) of the amount of displacement of the light source image by oscillation amplitude of the first small-amplitude oscillation element, and $d_y$ is a component in the second direction ($d_y \geq 0$, but $d_y>0$ under $d_x=0$) of the amount of displacement of the light source image by oscillation amplitude of the first small-amplitude oscillation element.

Moreover, in the embodiment of the technology, a second light source including a second solid light-emitting element which emits light from a light-emission region configured of a single or a plurality of light-emission spots may be further included. In this case, a second beam spread angle changing element changing a beam spread angle of light incident from the second light source, and an optical path combining element combining light having passed through the first beam spread angle changing element and light having passed through the second beam spread angle changing element into composite light, and then outputting the composite light to the integrator may be further included. At this time, the first small-amplitude oscillation element is preferably disposed between the optical path combining element and the integrator.

Further, in the embodiment of the technology, in the case where the second light source, the second beam spread angle changing element, and the optical path combining element are included, a second small-amplitude oscillation element changing, from time to time, an illumination state in the illuminated region may be disposed between the second light source and the second beam spread angle changing element or between the second beam spread angle changing element and the optical path combining element. In this case, the first small-amplitude oscillation element is preferably disposed between the first light source and the first beam spread angle changing element or between the first beam spread angle changing element and the optical path combining element. Further, optical magnification of an optical system configured of the second beam spread angle changing element and the first and second fly-eye lenses, and a shape of the second small-amplitude oscillation element are preferably determined to allow the size of each light source image formed on the second fly-eye lens by each cell of the first fly-eye lens not to exceed the size of one cell of the second fly-eye lens. In addition, the shape of the second small-amplitude oscillation element and an amount of displacement of each light source image by oscillation amplitude of the second small-amplitude oscillation element are preferably determined not to form the light source image over a plurality of cells of the second fly-eye lens.

Moreover, in the embodiment of the technology, in the case where a focal length of the first beam spread angle changing element and each of the cells of the first and second fly-eye lenses have an aspect ratio not equal to 1, a ratio of vertical and horizontal focal lengths of the first beam spread angle changing element and an inverse of the aspect ratio of each cell of the second fly-eye lens may be equal to each other.

In the illumination device, the projection display, and the direct-view display according to the embodiment of the technology, the first small-amplitude oscillation element is disposed on an optical path of the first light source, and even in a state where the first small-amplitude oscillation element oscillates, each light source image is not formed over a plurality of cells; therefore, while achieving downsizing and an improvement in light use efficiency, the generation of speckles is allowed to be reduced.

Moreover, in the illumination device, the projection display, and the direct-view display according to the embodiment of the technology, in the case where the cells of the first and second fly-eye lenses each have an aspect ratio not equal to 1, when the amount of displacement of the light source image by oscillation amplitude of the first small-amplitude oscillation element is determined in consideration of the aspect ratio, light use efficiency is allowed to be further improved.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 1A and 1B are schematic views illustrating a configuration of a projector according to a first embodiment of the technology.

FIGS. 2A and 2B are diagram illustrating an example of an optical path in the projector in FIGS. 1A and 1B.

FIGS. 3A and 3B are a top view and a sectional view illustrating an example of a light source in FIGS. 1A and 1B, respectively.

FIGS. 4A and 4B are a top view and a sectional view illustrating another example of the light source in FIGS. 1A and 1B, respectively.

FIGS. 11A and 11B are diagrams illustrating a modification of the configuration of the projector in FIGS. 1A and 1B.

FIGS. 12A and 12B are diagrams illustrating another modification of the configuration of the projector in FIGS. 1A and 1B.

FIGS. 13A and 13B are schematic views illustrating a configuration of a projector according to a second embodiment of the technology.

FIGS. 14A and 14B are diagrams illustrating an example of an optical path in the projector in FIGS. 13A and 13B.

FIGS. 15A and 15B are diagrams illustrating a modification of the configuration of the projector in FIGS. 13A and 13B.

FIGS. 17A and 17B are schematic views illustrating a configuration of a projector according to a third embodiment of the technology.

FIGS. 18A and 18B are diagrams illustrating an example of an optical path in the projector in FIGS. 17A and 17B.

FIGS. 19A and 19B are diagrams illustrating a modification of the configuration of the projector in FIGS. 17A and 17B.

FIGS. 20A and 20B are schematic views illustrating a configuration of a projector according to a fourth embodiment of the technology.

FIGS. 25A and 25B are diagrams illustrating another modification of the configuration of the projector in FIGS. 20A and 20B.

FIG. 26 is a table illustrating design values in examples of the first to third embodiments.

FIG. 27 is a table illustrating design values in an example of the fourth embodiment.

FIGS. 31A and 31B are a sectional view illustrating an example of the configuration of the light source in FIGS. 28A and 28B rotated by 90° on an XY plane, and a diagram of the solid light-emitting element included in the light source in FIG. 31A when viewed from a light emission surface side, respectively.

FIGS. 33A and 33B are a sectional view illustrating an example of the configuration of the light source in FIGS. 30A and 30B rotated by 90° on an XY plane, and a diagram of the solid light-emitting element included in the light source in FIG. 33A when viewed from a light emission surface side, respectively.

FIG. 34 is a schematic view illustrating a configuration of a rear projection display using an illumination optical system according to the above-described respective embodiments and modifications thereof.

DETAILED DESCRIPTION OF THE PREFERRED EMBODIMENTS

Figure 5A:
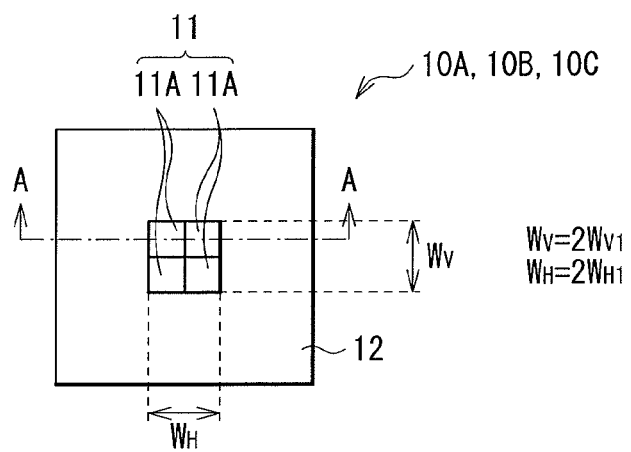
FIGS. 5A and 5B are a top view and a sectional view illustrating still another example of the light source in FIGS. 1A and 1B, respectively.

Preferred embodiments of the technology will be described in detail below referring to the accompanying drawings. It is to be noted that description will be given in the following order.

1. First Embodiment (FIGS. 1A and 1B to FIGS. 12A and 12B)

Example in which light from respective light sources is converted into parallel light by a coupling lens, and then combined 2. Second Embodiment (FIGS. 13A and 13B to FIGS. 16A and 16B)

Example in which light from respective light sources is combined, and then converted into parallel light by a coupling lens 3. Third Embodiment (FIGS. 17A and 17B to FIGS. 19A and 19B)

Example in which light in respective wavelength bands is emitted from a single package without combining optical paths 4. Fourth Embodiment (FIGS. 20A and 20B to FIGS. 25A and 25B)

Example including a polarization splitting element and a retardation film array
5. Examples (FIGS. 26 and 27)
6. Modifications (FIGS. 28A and 28B to FIG. 37)

1. First Embodiment

[Configuration]

FIGS. 1A and 1B illustrate a schematic configuration of a projector 1 according to a first embodiment of the technology. It is to be noted that the projector 1 corresponds to a specific example of "projection display" in the technology. FIG. 1A illustrates a configuration example of the projector 1 viewed from above (from a y-axis direction), and FIG. 1B illustrates a configuration example of the projector 1 viewed from a side thereof (from an x-axis direction). FIGS. 2A and 2B illustrate an example of an optical path in the projector 1 in FIGS. 1A and 1B. FIG. 2A illustrates an example of the optical path when the projector 1 is viewed from above (from the y-axis direction), and FIG. 2B illustrates an example of the optical path when the projector 1 is viewed from a side thereof (from the x-axis direction).

Typically, a y axis is directed toward a vertical direction, and an x axis is directed toward a horizontal direction; however, the y axis may be directed toward the horizontal direction, and the x axis may be directed toward the vertical direction. It is to be noted that for convenience sake, in the following description, the y axis and the x axis are directed toward the vertical direction and the horizontal direction, respectively. Moreover, in the following description, a "transverse direction" indicates the x-axis direction, and a "longitudinal direction" indicates the y-axis direction.

The projector 1 includes, for example, an illumination optical system 1A, a spatial modulating element 60, and a projection optical system 70. The spatial modulating element 60 generates image light by modulating light from the illumination optical system 1A based on an input picture signal. The projection optical system 70 projects the image light generated by the spatial modulating element 60 onto a reflective screen 2. It is to be noted that the illumination optical system 1A corresponds to a specific example of "illumination device" in the technology.

The illumination optical system 1A supplies a light flux applied to an illuminated region 60A (an illuminated plane) of the spatial modulating element 60. It is to be noted that, as necessary, an optical element of some kind may be provided on a region where light from the illumination optical system 1A passes. For example, a filter reducing light from the illumination optical system 1A except for visible light, or the like may be provided on the region where light from the illumination optical system 1A passes.

For example, as illustrated in FIGS. 1A an 1B, the illumination optical system 1A includes light sources 10A, 10B, and 10C, coupling lenses 20A, 20B, and 20C, an optical path combining element 30, an integrator 40, a condenser lens 50, and a small-amplitude oscillation element 100. It is to be noted that the light source 10A corresponds to a specific example of "first light source" in the technology, and the light source 10B or the light source 10C corresponds to a specific example of "second light source". The coupling lens 20A corresponds to a specific example of "first beam spread angle changing element" in the technology, and the coupling lens 20B or the coupling lens 20C corresponds to a specific example of "second beam spread angle changing element" in the technology. The small-amplitude oscillation element 100 corresponds to a specific example of "first small-amplitude oscillation element" in the technology.

The optical path combining element 30 combines light from the light sources 10A, 10B, and 10C, and is configured of, for example, two dichroic mirrors 30A and 30B. The integrator 40 equalizes an illuminance distribution of light in an illuminated region 60A, and is configured of, for example, a pair of fly-eye lenses 40A and 40B. The coupling lens 20A, the optical path combining element 30, the integrator 40, and the condenser lens 50 are arranged in this order from a side closer to the light source 10A on an optical axis of the light source 10A. An optical axis of the light source 10B is orthogonal to the optical axis of the light source 10A on the dichroic mirror 30A, and the coupling lens 20B and the dicrohic mirror 30A are arranged in this order from a side closer to the light source 10B on the optical axis of the light source 10B. An optical axis of the light source 10C is orthogonal to the optical axis of the light source 10A on the dichroic mirror 30B, and the coupling lens 20C and the dichroic mirror 30B are arranged in this order from a side closer to the light source 10C on the optical axis of the light source 10C.

It is to be noted that in FIGS. 1A and 1B, the case where respective components (except for the light sources 10B and 10C and the coupling lenses 20B and 20C) of the projector 1 are arranged on a line segment parallel to a z axis is illustrated; however, some of the respective components of the projector 1 may be arranged on a line segment not parallel to the z axis. For example, although not illustrated, the whole illumination optical system 1A may be rotated by 90° from a state illustrated in FIGS. 1A and 1B to allow an optical axis of the illumination optical system 1A to be directed toward a direction orthogonal to the z axis. However, in such a case, it is necessary to provide an optical element (for example, a mirror) guiding light emitted from the illumination optical system 1A to the spatial modulating element 60. Moreover, for example, the light source 10A, the coupling lens 20A, and the optical path combining element 30 may be rotated by 90° from the state illustrated in FIGS. 1A and 1B to allow optical axes thereof to be directed toward the direction orthogonal to the z axis. However, in such a case, it is necessary to provide an optical element (for example, a mirror) guiding light emitted from the optical path combining element 30 to the integrator 40.

Figure 5B:
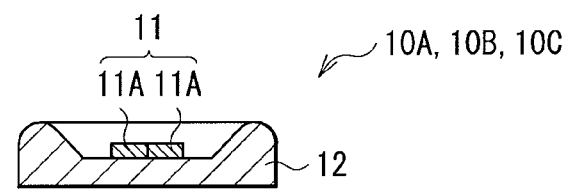

For example, as illustrated in FIGS. 3A and 3B to FIGS. 5A and 5B, the light sources 10A, 10B, and 10C each include a solid light-emitting element 11 and a package 12 supporting the solid light-emitting element 11 and allowing the solid light-emitting element 11 to be covered therewith. The solid light-emitting element 11 emits light from a light-emission region configured of a single or a plurality of point-shaped or non-point-shaped light-emission spots. For example, as illustrated in FIGS. 3A and 3B, the solid light-emitting element 11 may be configured of a single chip 11A emitting light in a predetermined wavelength band, or as illustrated in FIGS. 4A, 4B, 5A, and 5B, the solid light-emitting element 11 may be configured of a plurality of chips 11A emitting light in the same wavelength band or in different wavelength bands. In the case where the solid light-emitting element 11 is configured of a plurality of chips 11A, these chips 11A may be arranged, for example, in a line in the transverse direction as illustrated in FIGS. 4A and 4B, or in a grid-like pattern in the transverse direction and the longitudinal direction as illustrated in FIGS. 5A and 5B. In the light sources 10A, 10B, and 10C, the number of chips 11A included in the solid light-emitting element 11 may vary from one light source to another, or may be equal.

In the case where the solid light-emitting element 11 is configured of a single chip 11A, for example, as illustrated in FIG. 3A, a size ($W_V \times W_H$) of the solid light-emitting element 11 is equal to a size ($W_{V1} \times W_{H1}$) of the single chip 11A. On the other hand, in the case where the solid light-emitting element 11 is configured of a plurality of chips 11A, for example, as illustrated in FIGS. 4A and 5A, the size of the solid light-emitting element 11 is equal to the size of a combination of all of the chips 11A. In the case where the plurality of chips 11A are arranged in a line in the transverse direction, the size ($W_V \times W_H$) of the solid light-emitting element 11 is equal to $W_{V1} \times 2W_{H1}$ in an example in FIG. 4A. Moreover, in the case where the plurality of chips 11A are arranged in a grid-like pattern in the transverse direction and the longitudinal direction, the size ($W_V \times W_H$) of the solid light-emitting element 11 is equal to $2W_{V1} \times 2W_{H1}$ in an example in FIG. 5A.

The chip 11A is configured of a light-emitting diode (LED), an organic EL light-emitting diode (OLED), or a laser diode (LD). The LED and the OLED emit non-polarized and incoherent light. The LD emits polarized and coherent (or substantially coherent) light.

In the case where the solid light-emitting element 11 is configured of a plurality of chips 11A, all of the chips 11A included in the light sources 10A, 10B, and 10C may be configured of LDs. Moreover, in the case where the solid light-emitting element 11 is configured of a plurality of chips 11A, the chips 11A included in one or two of the light sources 10A, 10B, and 10C may be configured of LDs, and the chips 11A included in the other light source(s) may be configured of LEDs or OLEDs.

In the case where the solid light-emitting element 11 is configured of a plurality of chips 11A, the chips 11A included in the solid light-emitting element 11 may emit light in the same wavelength band, or light in different wavelength bands. The chips 11A included in the light sources 10A, 10B, and 10C emit light in wavelength bands varying from one light source to another, for example. The chips 11A included in the light source 10A emit, for example, light with a wavelength of approximately 400 nm to 500 nm (blue light). The chips 11A included in the light source 10B emit, for example, light with a wavelength of approximately 500 nm to 600 nm (green light). The chips 11A included in the light source 10C emit, for example, light with a wavelength of approximately 600 nm to 700 nm (red light). It is to be noted that the chips 11A included in the light source 10A may emit light (green light or red light) other than blue light. Moreover, the chips 11A included in the light source 10B may emit light (blue light or red light) other than green light. Further, the chips 11A included in the light source 10C may emit light (green light or blue light) other than red light.

For example, as illustrated in FIGS. 3A and 3B to FIGS. 6A, 6B, and 6C, the chips 11A each have a light-emission spot 11B with a smaller size ($P_{V1} \times P_{H1}$) than the size ($W_V \times W_H$) of the chip 11A. The light-emission spot 11B corresponds to a region (light-emission region) emitting light from the chip 11A when a current is injected into the chip 11A to drive the chip 11A. In the case where the chip 11A is configured of the LED or the OLED, the light-emission spot 11B has a non-point (planar) shape, but in the case where the chip 11A is configured of the LD, the light-emission spot 11B has a smaller point shape than the light-emission spot 11B of the LED or the OLED.

Figure 6A:
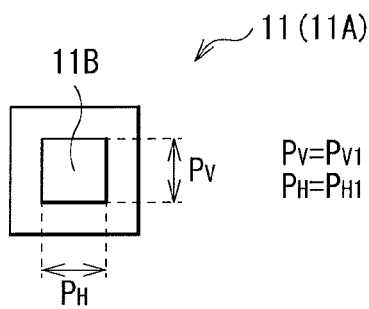
FIGS. 6A to 6C are diagrams illustrating examples of a light-emission spot of the light source in FIGS. 1A and 1B.
Figure 6B:
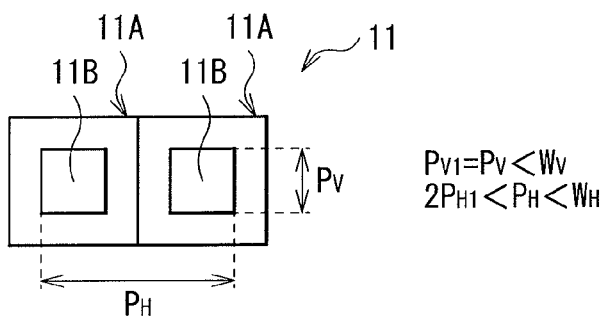
Figure 6C:
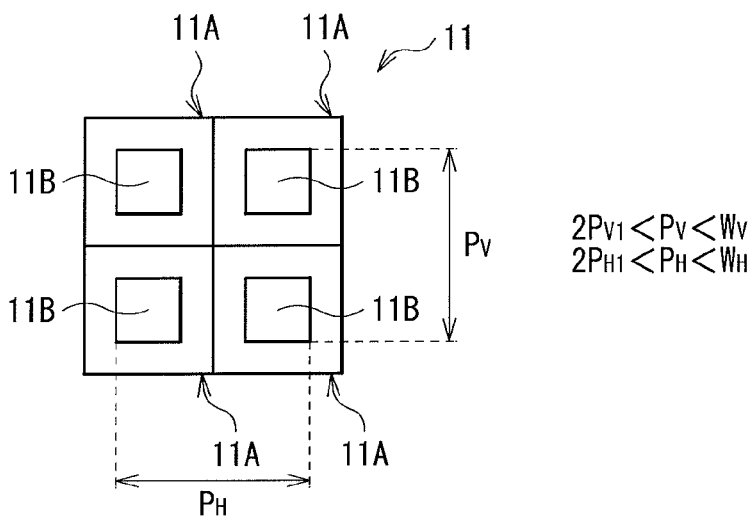

In the case where the solid light-emitting element 11 is configured of a single chip 11A, for example, as illustrated in FIG. 6A, the number of light-emission spots 11B is 1. On the other hand, in the case where the solid light-emitting element 11 is configured of a plurality of chips 11A, for example, as illustrated in FIGS. 6B and 6C, the number of the light-emission spots 11B is equal to the number of chips 11A. Herein, in the case where the solid light-emitting element 11 is configured of a single chip 11A, a size ($P_V \times P_H$) of a light-emission region of the solid light-emitting element 11 is equal to the size ($P_{V1} \times P_{H1}$) of the light-emission spot 11B. On the other hand, in the case where the solid light-emitting element 11 is configured of a plurality of chips 11A, the size ($P_V \times P_H$) of the light-emission region of the solid light-emitting element 11 is equal to a size of a smallest possible enclosure containing the light-emission spots 11B of all of the chips 11A. In the case where the plurality of chips 11A are arranged in a line in the transverse direction, in an example in FIG. 6B, the size ($P_V \times P_H$) of the light-emission region is larger than $P_{V1} \times 2P_{H1}$, and smaller than $W_V \times W_H$. Moreover, in the case where the plurality of chips 11A are arranged in a grid-like pattern in the transverse direction and the longitudinal direction, in an example in FIG. 6C, the size ($P_V \times P_H$) of the light-emission region is larger than $2P_{V1} \times 2P_{H1}$, and smaller than $W_V \times W_H$.

For example, as illustrated in FIGS. 2A and 2B, the coupling lens 20A converts light emitted from the light source 10A into substantially parallel light, and changes the beam spread angle ($\theta_H$, $\theta_V$) of the light emitted from the light source 10A to be equal to or close to the beam spread angle of parallel light. The coupling lens 20A is disposed in a position where light within the beam spread angle of the light emitted from the light source 10A enters. For example, as illustrated in FIGS. 2A and 2B, the coupling lens 20B converts light emitted from the light source 10B into substantially parallel light, and changes the beam spread angle ($\theta_H$, $\theta_V$) of the light emitted from the light source 10B to be equal to or close to the beam spread angle of parallel light. The coupling lens 20B is disposed in a position where light within the beam spread angle of the light emitted from the light source 10B enters. For example, as illustrated in FIGS. 2A and 2B, the coupling lens 20C converts light emitted from the light source 10C into substantially parallel light, and changes the beam spread angle ($\theta_H$, $\theta_V$) of the light emitted from the light source 10C to be equal to or close to the beam spread angle of parallel light. The coupling lens 20C is disposed in a position where light within the beam spread angle of the light emitted from the light source 10C enters. In other words, the coupling lenses 20A, 20B, and 20C are disposed in the light sources 10A, 10B, and 10C (respective packages), respectively. It is to be noted that the coupling lenses 20A, 20B, and 20C each may be configured of a single lens, or a plurality of lenses.

The dichroic mirrors 30A and 30B each include one mirror having wavelength selectivity. It is to be noted that, for example, the above-described mirror is configured by evaporating a multilayer interference film. For example, as illustrated in FIGS. 2A and 2B, the dichroic mirror 30A allows light incident from a back side of the mirror (light incident from the light source 10A) to pass to a front side of the mirror, and allows light incident from the front side of the mirror (light incident from the light source 10B) to be reflected by the mirror. On the other hand, as illustrated in FIGS. 2A and 2B, the dichroic mirror 30B allows light incident from a back side of the mirror (light of the light sources 10A and 10B incident from the dichroic mirror 30A) to pass to a front side of the mirror, and allows light incident from the front side of the mirror (light incident from the light source 10C) to be reflected by the mirror. Therefore, the optical path combining element 30 combines respective light fluxes emitted from the light sources 10A, 10B, and 10C into a single light flux.

The fly-eye lenses 40A and 40B each are configured of a plurality of lenses (cells) arranged in a predetermined arrangement (in this case, a matrix of 4 (vertical)×3 (horizontal)). A plurality of cells 42 included in the fly-eye lens 40B are arranged to face cells 41 of the fly-eye lens 40A, respectively. The fly-eye lens 40A is disposed in a focal position (or a substantial focal position) of the fly-eye lens 40B, and the fly-eye lens 40B is disposed in a focal position (or a substantial focal position) of the fly-eye lens 40A. Therefore, the integrator 40 allows light fluxes formed through separating the single light flux by the fly-eye lens 40A to be focused on proximity to a lens plane on an image side of the fly-eye lens 40B, thereby forming a secondary light source plane (a light source image) thereon. The secondary light source plane is located on a plane conjugate to an entrance pupil of the projection optical system 70. However, the secondary light source plane is not necessarily precisely located on the plane conjugate to the entrance pupil of the projection optical system 70, and may be located within a design allowable region. The fly-eye lenses 40A and 40B may be formed as one unit.

Typically, each of light fluxes emitted from the light sources 10A, 10B, and 10C have a nonuniform intensity distribution on a plane perpendicular to a traveling direction thereof. Therefore, when these light fluxes are directly guided to the illuminated region 60A (illuminated plane), an illuminance distribution in the illuminated region 60A becomes nonuniform; however, as described above, when light fluxes emitted from the light sources 10A, 10B, and 10C are separated by the integrator 40 into a plurality of light fluxes, and the plurality of light fluxes are superimposably guided to the illuminated region 60A, the illuminance distribution on the illuminate region 60A is allowed to become uniform.

The condenser lens 50 condenses light fluxes, from light sources, formed by the integrator 40 to superimposably illuminate the illuminated region 60A. The spatial modulating element 60 two-dimensionally modulates light fluxes from the illumination optical system 1A based on color image signals corresponding to respective wavelength components of the light sources 10A, 10B, and 10C to generate image light. For example, as illustrated in FIGS. 2A and 2B, the spatial modulating element 60 is a transmissive element, and is configured of, for example, a transmissive liquid crystal panel. It is to be noted that, although not illustrated, the spatial modulating element 60 may be configured of a reflective element such as a reflective liquid crystal panel or a digital micromirror device. However, in such a case, it is necessary for light reflected by the spatial modulating element 60 to enter the projection optical system 70.

Figure 10:
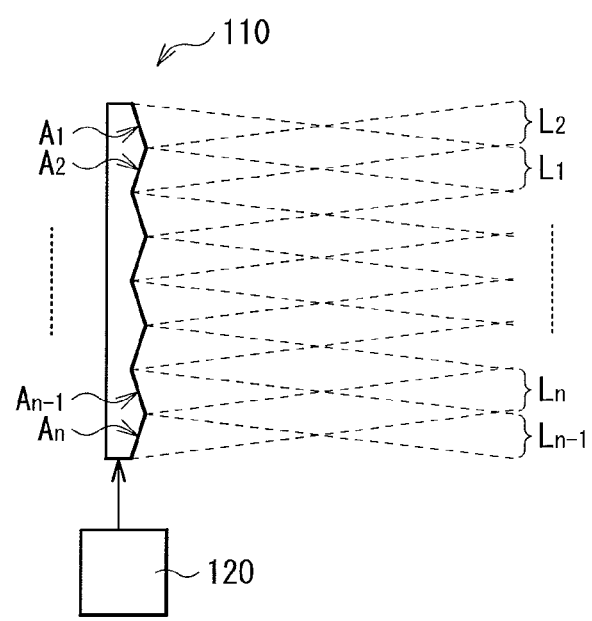
FIG. 10 is a sectional view illustrating an example of a small-amplitude oscillation element in FIGS. 1A and 1B.
Figures 16A, 16B:
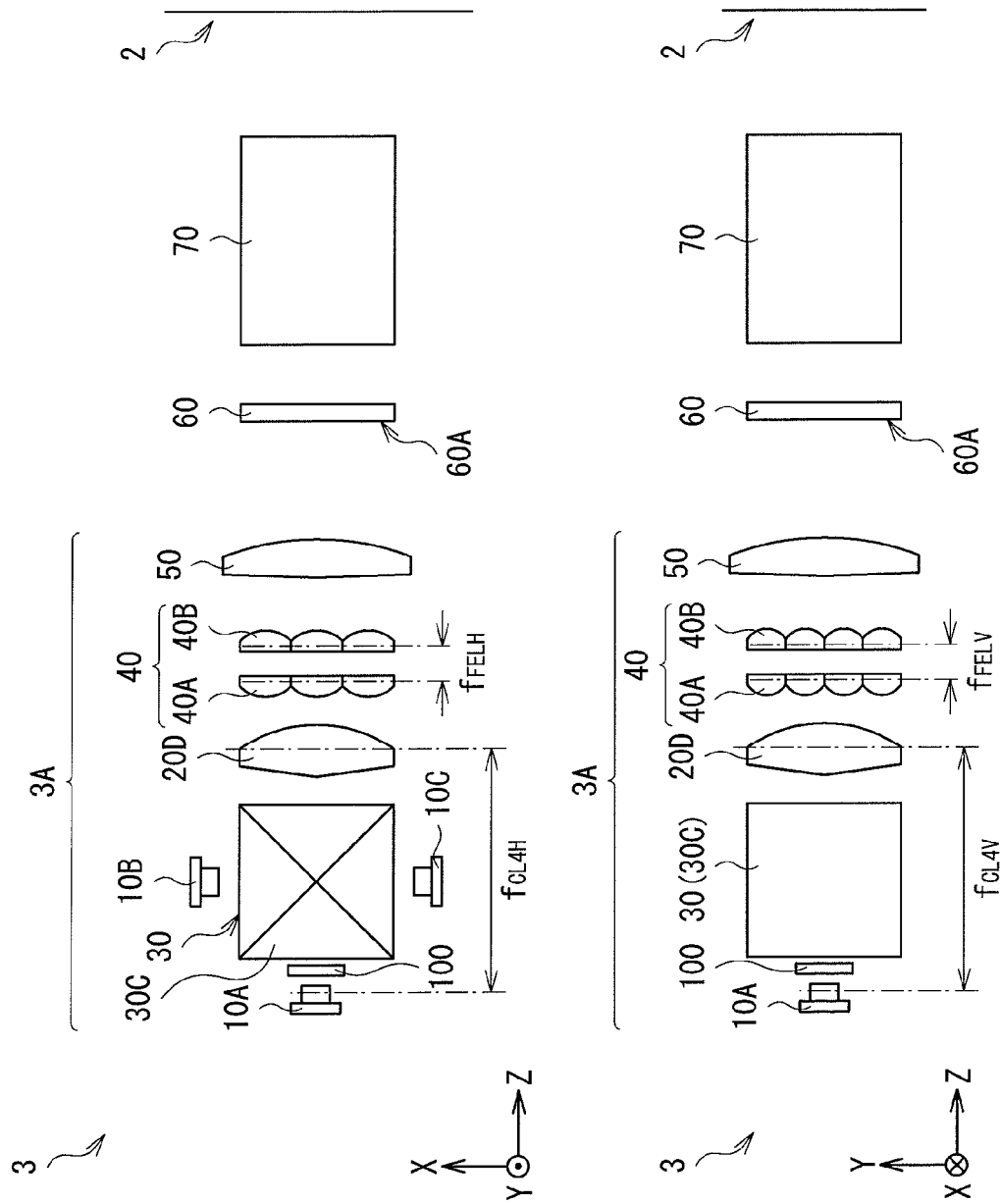
FIGS. 16A and 16B are diagrams illustrating another modification of the configuration of the projector in FIGS. 13A and 13B.

For example, as illustrated in FIGS. 1A and 1B, the small-amplitude oscillation element 100 is disposed between the optical path combining element 30 and the integrator 40. The small-amplitude oscillation element 100 changes, from time to time, an illumination state in the illuminated region 60A, and, for example, as illustrated in FIG. 10, the small-amplitude oscillation element 100 includes an optical element 110 and a drive section 120 applying small-amplitude oscillation to the optical element 110. The optical element 110 is disposed in a region where light emitted from the light sources 10A, 10B, and 10C passes. The drive section 120 is disposed in a position different from an optical path.

The optical element 110 is configured of, for example, a prism array having inclined surfaces $A_1$ to $A_n$ on a light-emission side. The prism array separates light emitted from the light sources 10A, 10B, and 10C into very small light fluxes $L_1$ to $L_n$ for the inclined surfaces $A_1$ to $A_n$, respectively.

The drive section 120 changes a relative position between the optical element 110 and the integrator 40. For example, the drive section 120 applies oscillation to the optical element 110 in a direction where the inclined surfaces $A_1$ to $A_n$ of the prism array are arranged (in a vertical direction in FIG. 10) to change the relative position between the optical element 110 and the integrator 40. Therefore, incident positions of the light fluxes $L_1$ to $L_n$ are changed in an incident surface of the integrator 40, thereby allowing the illumination state in the illuminated region 60A to be changed from time to time. It is to be noted that scanning of the light fluxes by the small-amplitude oscillation element 100 may be performed in a continuous cyclic manner or may be discretely repeated. In any case, the illumination state in the illuminated region 60A is allowed to be changed from time to time. Moreover, the inclined surfaces $A_1$ to $A_n$ of the optical element 110 are preferably configured to allow an incident angle of each of the light fluxes $L_1$ to $L_n$ to the fly-eye lens 40A to fall in an allowable angle of the fly-eye lens 40A. Moreover, the drive section 120 preferably applies oscillation to the small-amplitude oscillation element 100 to allow the incident angle of each of the light fluxes $L_1$ $L_n$ to the fly-eye lens 40A to fall in the allowable angle of the fly-eye lens 40A. The allowable angle means a maximum incident angle, to the fly-eye lens 40A, in which each light source image formed in proximity to the fly-eye lens 40B is not formed over a plurality of cells 42 included in the fly-eye lens 40B. It is to be noted that even if light incident at an incident angle larger than the allowable angle passes through the fly-eye lens 40A, the light is not applied to the illuminated region 60A, or is applied to the illuminated region 60A with very low efficiency. The drive section 120 has a configuration which is easily downsized, and is configured of, for example, a coil, a permanent magnet (for example, a permanent magnet made of a material such as neodymium (Nd), iron (Fe), boron (B)), and the like.

Next, characteristic parts of the projector 1 according to the embodiment will be described below.

(Characteristic Part 1)

In the embodiment, the focal lengths of the coupling lenses 20A, 20B, and 20C, the focal lengths of the fly-eye lenses 40A and 40B, and the shape of the small-amplitude oscillation element 100 are determined to allow the size of each light sources image S formed on the fly-eye lens 40B by each cell 41 of the fly-eye lens 40A not to exceed the size of one cell 42 of the fly-eye lens 40B. Moreover, the amount of displacement of each light source image S by oscillation amplitude of the small-amplitude oscillation element 100 is determined not to form the light source image S over a plurality of cells 42 of the fly-eye lens 40B.

This is represented by the following expressions.

$$h_1 + d_1 = P_1 \times (f_{FEL}/f_{CL1}) + d_1 \leq h_{FEL2} \quad (1)$$

$$h_2 + d_2 = P_2 \times (f_{FEL}/f_{CL2}) + d_2 \leq h_{FEL2} \quad (2)$$

$$h_3 + d_3 = P_3 \times (f_{FEL}/f_{CL3}) + d_3 \leq h_{FEL2} \quad (3)$$

where $h_1$ is the size of a light source image S (light source image $S_1$) formed by light from the light source 10A, $h_2$ is the size of a light source image S (light source image $S_2$) formed by light from the light source 10B, $h_3$ is the size of a light source image S (light source image $S_3$) formed by light from the light source 10C, $P_1$ is the size of a light-emission region of the solid light-emitting element 11 included in the light source 10A, $P_2$ is the size of a light-emission region of the solid light-emitting element 11 included in the light source 10B, $P_3$ is the size of a light-emission region of the solid light-emitting element 11 included in the light source 10C, $f_{FEL}$ is the focal length of each of the fly-eye lenses 40A and 40B, $f_{CL1}$ is the focal length of the coupling lens 20A, $f_{CL2}$ is the focal length of the coupling lens 20B, $f_{CL3}$ is the focal length of the coupling lens 20C, $h_{FEL2}$ is the size of one cell 42 of the fly-eye lens 40B, $d_1$ is the amount of displacement of the light source image $S_1$ by oscillation amplitude of the small-amplitude oscillation element 100, $d_2$ is the amount of displacement of the light source image $S_2$ by oscillation amplitude of the small-amplitude oscillation element 100, and $d_3$ is the amount of displacement of the light source image $S_3$ by oscillation amplitude of the small-amplitude oscillation element 100.

It is to be noted that in the case where the solid light-emitting element 11 included in the light source 10A is configured of a single chip 11A, $P_1$ is equal to the size of the light-emission spot 11B of the chip 11A. Likewise, in the case where the solid light-emitting element 11 included in the light source 10B is configured of a single chip 11A, $P_2$ is equal to the size of the light-emission spot 11B of the chip 11A, and in the case where the solid light-emitting element 11 included in the light source 10C is configured of a single chip 11A, $P_3$ is equal to the size of the light-emission spot 11B of the chip 11A. In the case where the solid light-emitting element 11 included in the light source 10A is configured of a plurality of chips 11A, $P_1$ is equal to a size of a smallest possible enclosure containing the light-emission spots 11B of all of the chips 11A. Likewise, in the case where the solid light-emitting element 11 included in the light source 10B is configured of a plurality of chips 11A, $P_2$ is equal to a size of a smallest possible enclosure containing the light-emission spots 11B of all of the chips 11A. In the case where the solid light-emitting element 11 included in the light source 10C is configured of a plurality of chips 11A, $P_3$ is equal to a size of a smallest possible enclosure containing the light-emission spots 11B of all of the chips 11A. Further, in the case where the coupling lens 20A is configured of a plurality of lenses, $f_{CL1}$ is a composite focal length of the lenses. Likewise, in the case where the coupling lens 20B is configured of a plurality of lenses, $f_{CL2}$ is a composite focal length of the lenses. In the case where the coupling lens 20C is configured of a plurality of lenses, $f_{CL3}$ is a composite focal length of the lenses.

Expressions substantially equivalent to the above-described expressions (1) to (3) are the following expressions (4) to (6). The expressions (4) to (6) are specifically advantageous in the case where the size of the light-emission region of the solid light-emitting element 11 is substantially equal to the size of the solid light-emitting element 11.

$$h_1 + d_1 = W_1 \times (f_{FEL}/f_{CL1}) + d_1 \leq h_{FEL2} \quad (4)$$

$$h_2 + d_2 = W_2 \times (f_{FEL}/f_{CL2}) + d_2 \leq h_{FEL2} \quad (5)$$

$$h_3 + d_3 = W_3 \times (f_{FEL}/f_{CL3}) + d_3 \leq h_{FEL2} \quad (6)$$

where $W_1$ is the size of the solid light-emitting element 11 included in the light source 10A, $W_2$ is the size of the solid light-emitting element 11 included in the light source 10B, and $W_3$ is the size of the solid light-emitting element 11 included in the light source 10C.

It is to be noted that in the case where the solid light-emitting element 11 is configured of a single chip 11A, W is equal to the size of the chip 11A. Moreover, in the case where the solid light-emitting element 11 is configured of a plurality of chips 11A, when a combination of all of the chips 11A is considered as a single chip, W is equal to a size of the single chip.

Figure 7A:
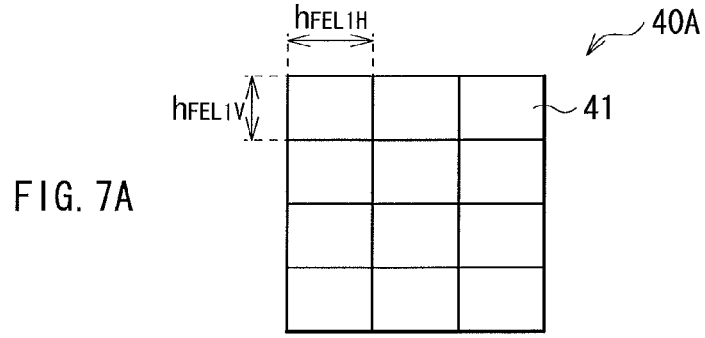
FIGS. 7A and 7B are schematic views illustrating a configuration of a fly-eye lens in FIGS. 1A and 1B.
Figure 7B:
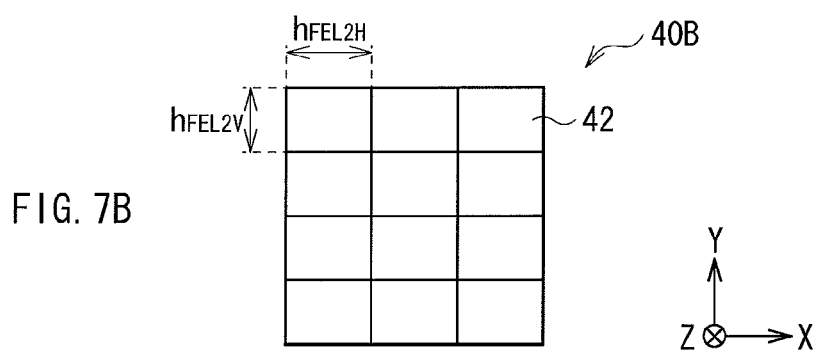
Figure 8:
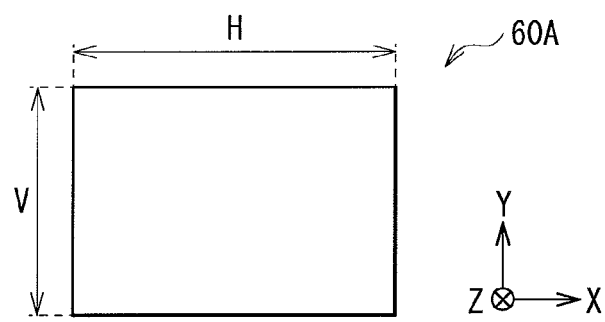
FIG. 8 is a schematic view for describing the size of an illuminated region in FIGS. 1A and 1B.
Figure 9A:
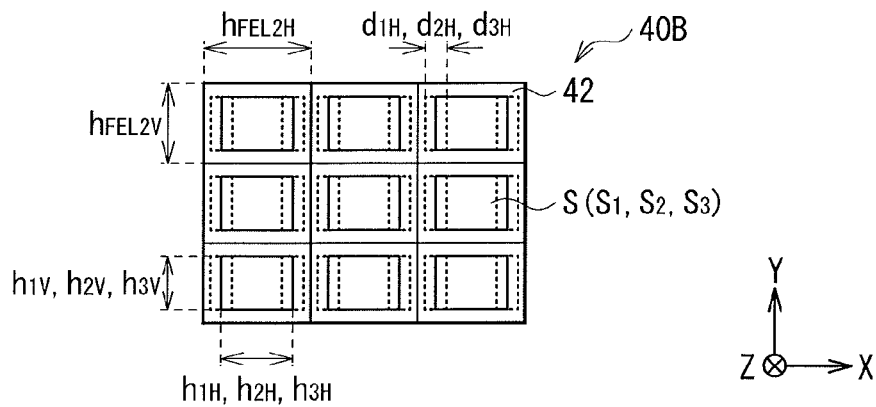
FIGS. 9A to 9C are schematic views illustrating examples of a light source image displayed on a latter fly-eye lens in the projector in FIGS. 1A and 1B.
Figure 9B:
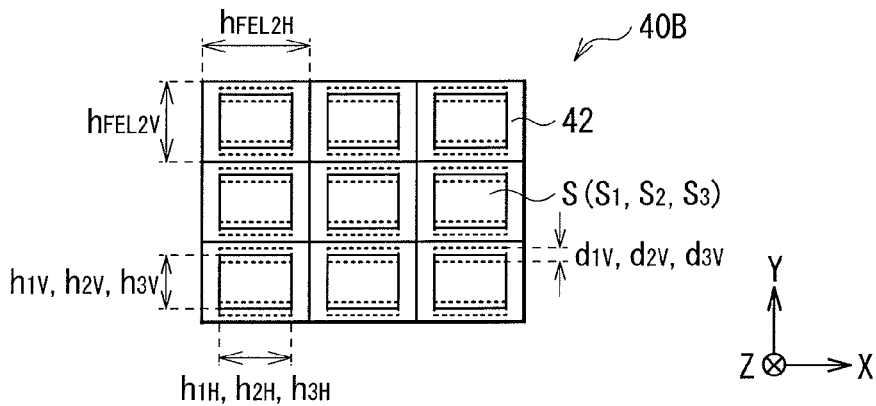
Figure 9C:
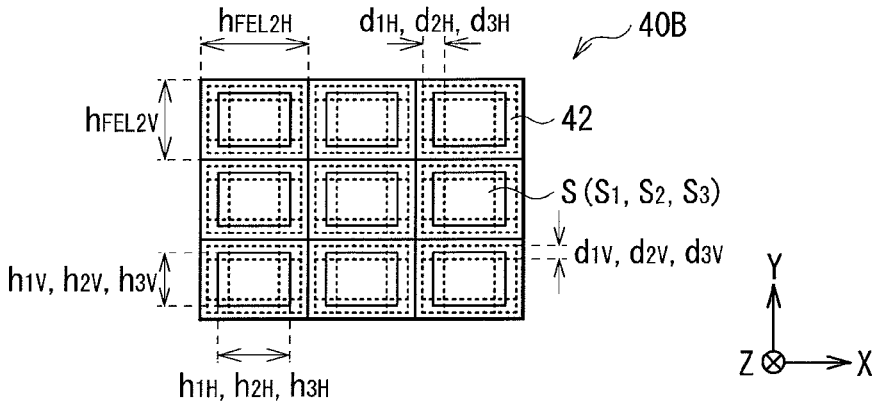

In the embodiment, for example, as illustrated in FIGS. 7A and 7B, in the case where the cells 41 and 42 of the fly-eye lenses 40A and 40B each have an aspect ratio not equal to 1, the focal lengths of the coupling lenses 20A, 20B, and 20C and the focal lengths of the fly-eye lenses 40A and 40B preferably satisfy the following six relational expressions. At this time, the small-amplitude oscillation element 100 preferably performs oscillation having an amplitude component in a longer direction or both of the longer direction and a shorter direction of each of the cells 41 and 42 of the fly-eye lenses 40A and 40B. Moreover, the illumination optical system 1A is preferably configured of an anamorphic optical system by allowing ratios ($f_{CL1H}/f_{CL1V}$, $f_{CL2H}/f_{CL2V}$, $f_{CL3H}/f_{CL3V}$) (anamorphic ratios) of horizontal and vertical focal lengths of the coupling lenses 20A, 20B, and 20C, and an inverse ($h_{FEL2V}/h_{FEL2H}$) of an aspect ratio of the size of each of the cells 42 of the fly-eye lens 40B to become equal to each other. For example, in the case where each cell 42 of the fly-eye lens 40B has a shape with a longer side in a first direction (for example, in a transverse direction), as the coupling lenses 20A, 20B, and 20C, coupling lenses with longer focal lengths $f_{CL1V}$, $f_{CL2V}$, and $f_{CL3V}$ than the focal lengths $f_{CL1H}$, $f_{CL2H}$, and $f_{CL3H}$ are used. The following expressions (7) to (12) are schematically illustrated in FIGS. 9A to 9C. Herein, FIG. 9A illustrates a state where the light source images S (light source images $S_1$, $S_2$, and $S_3$) oscillate in the first direction (for example, in the transverse direction) or a direction corresponding thereto by oscillation of the small-amplitude oscillation element 100. FIG. 9B illustrates a state where the light source images S (light source images $S_1$, $S_2$, and $S_3$) oscillate in a second direction (for example, in the longitudinal direction) or a direction corresponding thereto by oscillation of the small-amplitude oscillation element 100. FIG. 9C illustrates a state where the light source images S (light source images $S_1$, $S_2$, and $S_3$) oscillate in a plane including the first direction and the second direction by oscillation of the small-amplitude oscillation element 100.

$$h_{1H} + d_{1H} = P_{1H} \times (f_{FELH}/f_{CL1H}) + d_{1H} \leq h_{FEL2H} \quad (7)$$

$$h_{2H} + d_{2H} = P_{2H} \times (f_{FELH}/f_{CL2H}) + d_{2H} \leq h_{FEL2H} \quad (8)$$

$$h_{3H} + d_{3H} = P_{3H} \times (f_{FELH}/f_{CL3H}) + d_{3H} \leq h_{FEL2H} \quad (9)$$

$$h_{1V} + d_{1V} = P_{1V} \times (f_{FELV}/f_{CL1V}) + d_{1V} \leq h_{FEL2V} \quad (10)$$

$$h_{2V} + d_{2V} = P_{2V} \times (f_{FELV}/f_{CL2V}) + d_{2V} \leq h_{FEL2V} \quad (11)$$

$$h_{3V} + d_{3V} = P_{3V} \times (f_{FELV}/f_{CL3V}) + d_{3V} \leq h_{FEL2V} \quad (12)$$

where $h_{1H}$ is a size in the first direction (for example, in the transverse direction) of the light source image S (light source image $S_1$) formed by light from the light source 10A, $h_{2H}$ is a size in the first direction (for example, in the transverse direction) of the light source image S (light source image $S_2$) formed by light from the light source 10B, $h_{3H}$ is a size in the first direction (for example, in the transverse direction) of the light source image S (light source image $S_3$) formed by light from the light source 10C, $h_{1V}$ is a size in the second direction (for example, in the longitudinal direction) orthogonal to the first direction of the light source image S (light source image $S_1$) formed by light from the light source 10A, $h_{2V}$ is a size in the second direction (for example, in the longitudinal direction) orthogonal to the first direction of the light source image S (light source image $S_2$) formed by light from the light source 10B, $h_{3V}$ is a size in the second direction (for example, in the longitudinal direction) orthogonal to the first direction of the light source image S (light source image $S_3$) formed by light from the light source 10C, $P_{1H}$ is a size in the first direction or a direction corresponding thereto of the light-emission region of the solid light-emitting element 11 included in the light source 10A, $P_{2H}$ is a size in the first direction or a direction corresponding thereto of the light-emission region of the solid light-emitting element 11 included in the light source 10B, $P_{3H}$ is a size in the first direction or a direction corresponding thereto of the light-emission region of the solid light-emitting element 11 included in the light source 10C, $P_{1V}$ is a size in the second direction or a direction corresponding thereto of the light-emission region of the solid light-emitting element 11 included in the light source 10A, $P_{2V}$ is a size in the second direction or a direction corresponding thereto of the light-emission region of the solid light-emitting element 11 included in the light source 10B, $P_{3V}$ is a size in the second direction or a direction corresponding thereto of the light-emission region of the solid light-emitting element 11 included in the light source 10C, $f_{FELH}$ is a focal length in the first direction of each of the fly-eye lenses 40A and 40B, $f_{FELV}$ is a focal length in the second direction of each of the fly-eye lenses 40A and 40B, $f_{CL1H}$ is a focal length in the first direction or a direction corresponding thereto of the coupling lens 20A, $f_{CL2H}$ is a focal length in the first direction or a direction corresponding thereto of the coupling lens 20B, $f_{CL3H}$ is a focal length in the first direction or a direction corresponding thereto of the coupling lens 20C, $f_{CL1V}$ is a focal length in the second direction or a direction corresponding thereto of the coupling lens 20A, $f_{CL2V}$ is a focal length in the second direction or a direction corresponding thereto of the coupling lens 20B, $f_{CL3V}$ is a focal length in the second direction or a direction corresponding thereto of the coupling lens 20C, $h_{FEL2H}$ is a size in the first direction of one cell 42 of the fly-eye lens 40B, $h_{FEL2V}$ is a size in the second reaction of one cell 42 of the fly-eye lens 40B, $d_{1H}$ is a component in the first direction or a direction corresponding thereto ($d_{1H} \geq 0$, but $d_{1H} > 0$ under $d_{1V} = 0$) of the amount of displacement of the light source image $S_1$ by oscillation amplitude of the small-amplitude oscillation element 100, $d_{2H}$ is a component in the first direction or a direction corresponding thereto ($d_{2H} \geq 0$, but $d_{2H} > 0$ under $d_{2V} = 0$) of the amount of displacement of the light source image $S_2$ by oscillation amplitude of the small-amplitude oscillation element 100, $d_{3H}$ is a component in the first direction or a direction corresponding thereto ($d_{3H} \geq 0$, but $d_{3H} > 0$ under $d_{3V} = 0$) of the amount of displacement of the light source image $S_3$ by oscillation amplitude of the small-amplitude oscillation element 100, $d_{1V}$ is a component in the second direction or a direction corresponding thereto ($d_{1V} \geq 0$, but $d_{1V} > 0$ under $d_{1H} = 0$) of the amount of displacement of the light source image $S_1$ by oscillation amplitude of the small-amplitude oscillation element 100, $d_{2V}$ is a component in the second direction or a direction corresponding thereto ($d_{2V} \geq 0$, but $d_{2V} > 0$ under $d_{2H} = 0$) of the amount of displacement of the light source image $S_2$ by oscillation amplitude of the small-amplitude oscillation element 100, and $d_{3V}$ is a component in the second direction or a direction corresponding thereto ($d_{3V} \geq 0$, but $d_{3V} > 0$ under $d_{3H} = 0$) of the amount of displacement of the light source image $S_3$ by oscillation amplitude of the small-amplitude oscillation element 100.

Herein, the "first direction or a direction corresponding thereto" indicates the first direction in the case where the light sources 10A, 10B, and 10C, and the coupling lenses 20A, 20B, and 20C are arranged on an optical axis of the integrator 40. Moreover, in the case where the light sources 10A, 10B, and 10C, and the coupling lenses 20A, 20B, and 20C are arranged on an optical path deviated from the optical axis of the integrator 40, the "first direction or a direction corresponding thereto" indicates a direction corresponding to the first direction in a relationship in layout of optical elements including the light sources 10A, 10B, and 10C to the integrator 40 arranged on the optical path.

Moreover, the "second direction or a direction corresponding thereto" indicates the second direction in the case where the light sources 10A, 10B, and 10C, and the coupling lenses 20A, 20B, and 20C are arranged on the optical axis of the integrator 40. Further, in the case where the light sources 10A, 10B, and 10C, and the coupling lenses 20A, 20B, and 20C are arranged on an optical path deviated from the optical axis of the integrator 40, the "second direction or a direction corresponding thereto" indicates a direction corresponding to the second direction in a relationship in layout of optical elements from the light sources 10A, 10B, and 10C to the integrator 40 arranged on the optical path.

It is to be noted that in the case where the solid light-emitting element 11 included in the light source 10A is configured of a single ship 11A, $P_{1H}$ is equal to a size in the first direction or a direction corresponding thereto of the light-emission spot 11B of the chip 11A. Likewise, in the case where the solid light-emitting element 11 included in the light source 10B is configured of a single chip 11A, $P_{2H}$ is equal to a size in the first direction or a direction corresponding thereto of the light-emission spot 11B of the chip 11A. In the case where the solid light-emitting element 11 included in the light source 10C is configured of a single chip 11A, $P_{3H}$ is equal to a size in the first direction or a direction corresponding thereto of the light-emission spot 11B of the chip 11A. Further, in the case where the solid light-emitting element 11 included in the light source 10A is configured of a plurality of chips 11A, $P_{1H}$ is equal to a size in the first direction or a direction corresponding thereto of a smallest possible enclosure containing the light-emission spots 11B of all of the chips 11A. Likewise, in the case where the solid light-emitting element 11 included in the light source 10B is configured of a plurality of chips 11A, $P_{2H}$ is equal to a size in the first direction or a direction corresponding thereto of a smallest possible enclosure containing the light-emission spots 11B of all of the chips 11A. In the case where the solid light-emitting element 11 included in the light source 10C is configured of a plurality of chips 11A, $P_{3H}$ is equal to a size in the first direction or a direction corresponding thereto of a smallest possible enclosure containing the light-emission spots 11B of all of the chips 11A. On the other hand, in the case where the solid light-emitting element 11 included in the light source 10A is configured of a single chip 11A, $P_{1V}$ is equal to a size in the second direction or a direction corresponding thereto of the light-emission spot 11B of the chip 11A. Likewise, in the case where the solid light-emitting element 11 included in the light source 10B is configured of a single chip 11A, $P_{2V}$ is equal to a size in the second direction or a direction corresponding thereto of the light-emission spot 11B of the chip 11A. In the case where the solid light-emitting element 11 included in the light source 10C is configured of a single chip 11A, $P_{3V}$ is equal to a size in the second direction or a direction corresponding thereto of the light-emission spot 11B of the chip 11A. Moreover, in the case where the solid light-emitting element 11 included in the light source 10A is configured of a plurality of chips 11A, $P_{1V}$ is equal to a size in the second direction or a direction corresponding thereto of a smallest possible enclosure containing the light-emission spots 11B of all of the chips 11B. Likewise, in the case where the solid light-emitting element 11 included in the light source 10B is configured of a plurality of chips 11A, $P_{2V}$ is equal to a size in the second direction or a direction corresponding thereto of a smallest possible enclosure containing the light-emission spots 11B of all of the chips 11B. In the case where the solid light-emitting element 11 included in the light source 10C is configured of a plurality of chips 11A, $P_{3V}$ is equal to a size in the second direction or a direction corresponding thereto of a smallest possible enclosure containing the light-emission spots 11B of all of the chips 11B.

Moreover, in the embodiment, in the case where the cells 41 and 42 of the fly-eye lenses 40A and 40B each have an aspect ratio not equal to 1, the aspect ratio of the size of each cell 41 of the fly-eye lens 40A and the aspect ratio of the illuminated region 60A preferably satisfy the following relational expression. Herein, an aspect ratio H/V (refer to FIG. 8) of the illuminated region 60A has a correlation with resolution of the spatial modulating element 60, and, for example, in the case where the resolution of the spatial modulating element 60 is VGA (640×480), the aspect ratio H/V of the illuminated region 60A is 640/480, and, for example, in the case where the resolution of the spatial modulating element 60 is WVGA (800×480), the aspect ratio H/V of the illuminated region 60A is 800/480.

$$h_{FEL1H}/h_{FEL1V}=H/V \quad (13)$$

where $h_{FEL1H}$ is a size in the first direction of one cell of the fly-eye lens 40A, $h_{FEL1V}$ is a size in the second direction of one cell of the fly-eye lens 40A, H is a size in the first direction of the illuminated region 60A, and V is a size in the second direction of the illuminated region 60A (Characteristic Part 2)

Moreover, in the embodiment, the focal lengths and numerical apertures of the coupling lenses 20A, 20B, and 20C are determined to allow beam sizes of light incident to the coupling lenses 20A, 20B, and 20C not to exceed the sizes of the coupling lenses 20A, 20B, and 20C. This is represented by the following expressions.

$$\phi_{CL1}=2\times f_{CL1}\times NA_1 \leq h_{CL1} \quad (14)$$

$$\phi_{CL2}=2\times f_{CL2}\times NA_2 \leq h_{CL2} \quad (15)$$

$$\phi_{CL3}=2\times f_{CL3}\times NA_3 \leq h_{CL3} \quad (16)$$

where $\phi_{CL1}$ is the beam size of light incident to the coupling lens 20A, $\phi_{CL2}$ is the beam size of light incident to the coupling lens 20B, $\phi_{CL3}$ is the beam size of light incident to the coupling lens 20C, $NA_1$ is the numeral aperture of the coupling lens 20A,
$NA_2$ is the numerical aperture of the coupling lens 20B,
$NA_3$ is the numerical aperture of the coupling lens 20C,
$h_{CL1}$ is the size of the coupling lens 20A,
$h_{CL2}$ is the size of the coupling lens 20B, and
$h_{CL3}$ is the size of the coupling lens 20C.

In the embodiment, in the case where the coupling lenses 20A, 20B, and 20C each have an aspect ratio not equal to 1, the focal lengths and numerical apertures of the coupling lenses 20A, 20B, and 20C preferably satisfy the following six relational expressions.

$$\phi_{CL1H}=2\times f_{CL1H}\times NA_{1H} \leq h_{CL1H} \quad (17)$$

$$\phi_{CL2H}=2\times f_{CL2H}\times NA_{2H} \leq h_{CL2H} \quad (18)$$

$$\phi_{CL3H}=2\times f_{CL3H}\times NA_{3H} \leq h_{CL3H} \quad (19)$$

$$\phi_{CL1V}=2\times f_{CL1V}\times NA_{1V} \leq h_{CL1V} \quad (20)$$

$$\phi_{CL2V}=2\times f_{CL2V}\times NA_{2V} \leq h_{CL2V} \quad (21)$$

$$\phi_{CL3V}=2\times f_{CL3V}\times NA_{3V} \leq h_{CL3V} \quad (22)$$

where $\phi_{CL1H}$ is a beam size in a third direction (a shorter direction of the coupling lens 20A or a direction corresponding thereto) of light incident to the coupling lens 20A, $\phi_{CL2H}$ is a beam size in a fifth direction (a shorter direction of the coupling lens 20B or a direction corresponding thereto) of light incident to the coupling lens 20B, $\phi_{CL3H}$ is a beam size in a seventh direction (a shorter direction of the coupling lens 20C or a direction corresponding thereto) of light incident to the coupling lens 20C, $\phi_{CL1V}$ is a beam size in a fourth direction (a longer direction of the coupling lens 20A or a direction corresponding thereto) orthogonal to the third direction of light incident to the coupling lens 20A, $\phi_{CL2V}$ is a beam size in a sixth direction (a longer direction of the coupling lens 20B or a direction corresponding thereto) orthogonal to the fifth direction of light incident to the coupling lens 20B, $\phi_{CL3V}$ is a beam size in an eighth direction (a longer direction of the coupling lens 20C or a direction corresponding thereto) orthogonal to the seventh direction of light incident to the coupling lens 20C, $NA_{1H}$ is a numerical aperture in the third direction of the coupling lens 20A, $NA_{2H}$ is a numerical aperture in the fifth direction of the coupling lens 20B, $NA_{3H}$ is a numerical aperture in the seventh direction of the coupling lens 20C, $NA_{1V}$ is a numerical aperture in the fourth direction of the coupling lens 20A, $NA_{2V}$ is a numerical aperture in the sixth direction of the coupling lens 20B, $NA_{3V}$ is a numerical aperture in the eighth direction of the coupling lens 20C, $h_{CL1H}$ is a size in the third direction of the coupling lens 20A, $h_{CL2H}$ is a size in the fifth direction of the coupling lens 20B, $h_{CL3H}$ is a size in the seventh direction of the coupling lens 20C, $h_{CL1V}$ is a size in the fourth direction of the coupling lens 20A, $h_{CL2V}$ is a size in the sixth direction of the coupling lens 20B, and $h_{CL3V}$ is a size in the eighth direction of the coupling lens 20C.

It is to be noted that the third direction is preferably the first direction (for example, the transverse direction) or a direction corresponding thereto. The fourth direction is preferably the second direction (for example, the longitudinal direction) or a direction corresponding thereto. The fifth direction is preferably the first direction (for example, the transverse direction)

or a direction corresponding thereto. The sixth direction is preferably the second direction (for example, the longitudinal direction) or a direction corresponding thereto. The seventh direction is preferably the first direction (for example, the transverse direction) or a direction corresponding thereto. The eighth direction is preferably the second direction (for example, the longitudinal direction) or a direction corresponding thereto.

[Functions and Effects]

Next, functions and effects of the projector 1 according to the embodiment will be described blow. In the embodiment, the small-amplitude oscillation element 100 changing, from time to time, the illumination state in the illuminated region 60A illuminated with light having passed through the integrator 40 is disposed between the optical path combining element 30 and the integrator 40. Therefore, speckles are allowed to be averaged enough not to perceive speckles by human eyes. Moreover, in the embodiment, the focal lengths $f_{CL1}$, $f_{CL2}$, and $f_{CL3}$ of the coupling lenses 20A, 20B, and 20C, focal lengths $f_{FEL}$ of the fly-eye lenses 40A and 40B, and the shape of the small-amplitude oscillation element 100 are determined to allow the size of each light source image S formed on the fly-eye lens 40B by each cell 41 of the fly-eye lens 40A not to exceed the size of one cell 42. Further, the amount of displacement of each light source image S by oscillation amplitude of the small-amplitude oscillation element 100 is determined not to form the light source image S over a plurality of cells 42 of the fly-eye lens 40B. Therefore, light incident to the fly-eye lens 40B efficiently reaches the illuminated region 60A. It is to be noted that the small-amplitude oscillation element 100 oscillates enough to allow the illumination state in the illuminated region 60A to be changed from time to time; therefore, the small-amplitude oscillation element 100 does not impede downsizing of the illumination optical system 1A. Therefore, in the embodiment, while achieving downsizing and an improvement in light use efficiency, the generation of speckles is allowed to be reduced.

Moreover, in the embodiment, in the case where the cells of the fly-eye lenses 40A and 40B each have an aspect ratio not equal to 1, when the focal lengths $f_{CL1H}$, $f_{CL2H}$, $f_{CL3H}$, $f_{CL1V}$, $f_{CL2V}$, and $f_{CL3V}$ of the coupling lenses 20A, 20B, and 20C and the focal lengths $f_{FELH}$ and $f_{FELV}$ of the fly-eye lenses 40A and 40B are determined in consideration of the aspect ratio, light use efficiency in the illumination optical system 1A is allowed to be further improved. Further, in the embodiment, in the case where the coupling lenses 20A, 20B, and 20C each have an aspect ratio not equal to 1, when the focal lengths $f_{CL1H}$, $f_{CL2H}$, $f_{CL3H}$, $f_{CL1V}$, $f_{CL2V}$, and $f_{CL3V}$ and the numerical apertures $NA_{1H}$, $NA_{2H}$, $NA_{3H}$, $NA_{1V}$, $NA_{2V}$, and $NA_{3V}$ of the coupling lenses 20A, 20B, and 20C are determined in consideration of the aspect ratio, light use efficiency in the illumination optical system 1A is allowed to be further improved. Moreover, in the embodiment, in the case where the beam spread angles of the light sources 10A, 10B, and 10C are different from one another, when the focal lengths $f_{CL1H}$, $f_{CL2H}$, $f_{CL3H}$, $f_{CL1V}$, $f_{CL2V}$, and $f_{CL3V}$ and the numerical apertures $NA_{1H}$, $NA_{2H}$, $NA_{3H}$, $NA_{1V}$, $NA_{2V}$, and $NA_{3V}$ of the coupling lenses 20A, 20B, and 20C are determined in consideration of the respective beam spread angles, light use efficiency in the illumination optical system 1A is allowed to be further improved.

In the above-described embodiment, in the case where the chip 11A configured of an LD is included only in the light source 10A, but not in other light sources (the light sources 10B and 10C), for example, as illustrated in FIG. 11, the small-amplitude oscillation element 100 may be disposed between the light source 10A and the coupling lens 20A. Moreover, for example, as illustrated in FIG. 12, the small-amplitude oscillation element 100 may be disposed between the coupling lens 20A and the optical path combining element 30. Further, in the above-described embodiment, in the case where the chip 11A configured of a LD is included only in the light sources 10A and 10B, but not in the other light source (the light source 10C), although not illustrated, the small-amplitude oscillation element 100 may be disposed between the light source 10A and the coupling lens 20A, and between the light source 10B and the coupling lens 20B. At this time, the small-amplitude oscillation element 100 disposed between the light source 10A and the coupling lens 20A corresponds to a specific example of "first small-amplitude oscillation element" in the technology, and the small-amplitude oscillation element 100 disposed between the light source 10B and the coupling lens 20B corresponds to a specific example of "second small-amplitude oscillation element" in the technology. Moreover, in the above-described embodiment, in the case where the chip 11A configured of a LD is included in all of the light sources 10A, 10B, and 10C, although not illustrated, the small-amplitude oscillation element 100 may be disposed between the light source 10A and the coupling lens 20A, between the light source 10B and the coupling lens 20B, and between the light source 10C and the coupling lens 20C. At this time, the small-amplitude oscillation element 100 disposed between the light source 10A and the coupling lens 20A corresponds to a specific example of "first small-amplitude oscillation element" in the technology. Moreover, the small-amplitude oscillation element 100 disposed between the light source 10B and the coupling lens 20B or between the light source 10C and the coupling lens 20C corresponds to a specific example of "second small-amplitude oscillation element" in the technology. It is to be noted that the configuration of the small-amplitude oscillation element 100 corresponding to a specific example of "second small-amplitude oscillation element" in the technology has the same configuration as that of the small-amplitude oscillation element 100 disposed between the light source 10A and the coupling lens 20A.

2. Second Embodiment

[Configuration]

FIGS. 13A and 13B illustrate a schematic configuration of a projector 3 according to a second embodiment of the technology. It is to be noted that the projector 3 corresponds to a specific example of "projection display" in the technology. FIG. 13A illustrates a configuration example of the projector 3 viewed from above (from a y-axis direction), and FIG. 13B illustrates a configuration example of the projector 3 viewed from a side thereof (from an x-axis direction). FIGS. 14A and 14B illustrate an example of an optical path in the projector 3 in FIGS. 13A and 13B. FIG. 14A illustrates an example of the optical path when the projector 3 is viewed from above (from the y-axis direction), and FIG. 14B illustrates an example of the optical path when the projector 3 is viewed from the side thereof (from the x-axis direction).

The projector 3 is different from the projector 1 including the illumination optical system 1A in that the projector 3 includes an illumination optical system 3A. Therefore, different points from the projector 1 will be mainly described below, and similar points to the projector 1 will not be further described.

In the illumination optical system 3A, the coupling lenses 20A, 20B, and 20C and the dichroic mirrors 30A and 30B of the illumination optical system 1A are not included, and instead of them, a coupling lens 20D and a dichroic mirror 30C are included. The dichroic mirror 30C is disposed in a position where optical axes of the light sources 10A, 10B, and 10C intersect with one another. The coupling lens 20D is disposed on a light-emission side of the dichroic mirror 30C, and is disposed between the dichroic mirror 30C and the integrator 40. The small-amplitude oscillation element 100 is disposed between the coupling lens 20D and the integrator 40.

The dichroic mirror 30C includes two mirrors having wavelength selectivity. It is to be noted that the above-described mirrors each are configured by evaporating a multi-layer interference film, for example. The two mirrors are disposed orthogonal to each other, and front sides of the mirrors face a light-emission side of the dichroic mirror 30C. For example, as illustrated in FIG. 14A, the dichroic mirror 30C allows light (light incident from the light sources 10A and 10B) incident from a back side of one mirror (hereinafter referred to as "mirror A" for convenience sake) to pass to a front side of the mirror A, and allows light (light incident from the light source 10C) incident from the front side of the mirror A to be reflected by the mirror A. Moreover, for example, as illustrated in FIG. 14A, the dichroic mirror 30C allows light (light incident from the light sources 10A and 10C) incident from a back side of the other mirror (hereinafter referred to as "mirror B" for convenience sake) to pass to a front side of the mirror B, and allows light (light incident from the light source 10B) incident from the front side of the mirror B to be reflected by the mirror B. Therefore, the optical path combining element 30 combines respective light fluxes emitted from the light sources 10A, 10B, and 10C into a single light flux.

For example, as illustrated in FIGS. 14A and 14B, the coupling lens 20D converts light incident from the dichroic mirror 30C into substantially parallel light, and changes a beam spread angle of light incident from the dichroic mirror 30C to be equal to or close to the beam spread angle of parallel light.

[Functions and Effects]

Next, functions and effects of the projector 3 will be described below. In the embodiment, the small-amplitude oscillation element 100 changing, from time to time, the illumination state in the illuminated region 60A illuminated with light having passed through the integrator 40 is disposed between the coupling lens 20D and the integrator 40. Therefore, speckles are allowed to be averaged enough not to perceive speckles by human eyes. Moreover, in the embodiment, a focal length $f_{CL4}$ of the coupling lens 20D, the focal lengths $f_{FEL}$ of the fly-eye lenses 40A and 40B, and the shape of the small-amplitude oscillation element 100 are determined to allow the size of each light source image S formed on the fly-eye lens 40B by each cell 41 of the fly-eye lens 40A not to exceed the size of one cell 42 of the fly-eye lens 40B. Further, the amount of displacement of each light source image S by oscillation amplitude of the small-amplitude oscillation element 100 is determined not to form the light source image S over a plurality of cells 42 of the fly-eye lens 40B. Therefore, light incident to the fly-eye lens 40B efficiently reaches the illuminated region 60A. It is to be noted that the small-amplitude oscillation element 100 oscillates enough to allow the illumination state in the illuminated region 60A to be changed from time to time; therefore, the small-amplitude oscillation element 100 does not impede downsizing of the illumination optical system 3A. Therefore, in the embodiment, while achieving downsizing and an improvement in light use efficiency, the generation of speckles is allowed to be reduced.

Moreover, in the embodiment, in the case where the cells of the fly-eye lenses 40A and 40B each have an aspect ratio not equal to 1, when the focal lengths $f_{CL4H}$ and $f_{CL4V}$ of the coupling lens 20D and the focal lengths $f_{FELH}$ and $f_{FELV}$ of the fly-eye lenses 40A and 40B are determined in consideration of the aspect ratio, light use efficiency in the illumination optical system 3A is allowed to be further improved. Further, in the embodiment, in the case where the coupling lens 20D has an aspect ratio not equal to 1, when the focal lengths $f_{CL4H}$ and $f_{CL4V}$ and the numerical apertures $NA_{4H}$ and $NA_{4V}$ of the coupling lens 20D are determined in consideration of the aspect ratio, light use efficiency in the illumination optical system 3A is allowed to be further improved.

It is to be noted that in the embodiment, $f_{CL1}$, $f_{CL2}$, and $f_{CL3}$ in the first embodiment are replaced with the focal length $f_{CL4}$ of the coupling lens 20D. Likewise, $f_{CL1H}$, $f_{CL2H}$, and $f_{CL3H}$ in the first embodiment are replaced with the focal length $f_{CL4H}$ in the first direction or a direction corresponding thereto of the coupling lens 20D. Moreover, $f_{CL1V}$, $f_{CL2V}$, and $f_{CL3V}$ in the first embodiment are replaced with the focal length $f_{CL4V}$ in the second direction or a direction corresponding thereto of the coupling lens 20D. Further, $\phi_{CL1}$, $\phi_{CL2}$, and $\phi_{CL3}$ in the first embodiment are replaced with a beam size $\phi_{CL4}$ of light incident to the coupling lens 20D. $NA_1$, $NA_2$, and $NA_3$ in the first embodiment are replaced with the numerical aperture $NA_4$ of the coupling lens 20D. Moreover, $h_{CL1}$, $h_{CL2}$, and $h_{CL3}$ in the first embodiment are replaced with a size $h_{CL4}$ of the coupling lens 20D. Further, $\phi_{CL1H}$, $\phi_{CL2H}$, and $\phi_{CL3H}$ in the first embodiment are replaced with a beam size $\phi_{CL4H}$ in the first direction (for example, the transverse direction) or a direction corresponding thereto of light incident to the coupling lens 20D. Moreover, $\phi_{CL1V}$, $\phi_{CL2V}$, and $\phi_{CL3V}$ in the first embodiment are replaced with a beam size $\phi_{CL4V}$ in the second direction (for example, the longitudinal direction) or a direction corresponding thereto of light incident to the coupling lens 20D. $NA_{1H}$, $NA_{2H}$, and $NA_{3H}$ in the first embodiment are replaced with a numerical aperture $NA_{4H}$ in the first direction or a direction corresponding thereto of the coupling lens 20D. $NA_{1V}$, $NA_{2V}$, and $NA_{3V}$ in the first embodiment are replaced with a numerical aperture $NA_{4V}$ in the second direction or a direction corresponding thereto of the coupling lens 20D. Moreover, $h_{CL1H}$, $h_{CL2H}$, and $h_{CL3H}$ in the first embodiment are replaced with a size $h_{CL4H}$ in the first direction or a direction corresponding thereto of the coupling lens 20D. Further, $h_{CL1V}$, $h_{CL2V}$, and $h_{CL3V}$ in the first embodiment are replaced with a size $h_{CL4V}$ in the second direction or a direction corresponding thereto of the coupling lens 20D. It is to be noted that similar replacement is performed in the following embodiments.

In the second embodiment, for example, as illustrated in FIG. 15, the small-amplitude oscillation element 100 may be disposed between the optical path combining element 30 (the dichroic mirror 30C) and the coupling lens 20D.

Moreover, in the second embodiment, in the case where the chip 11A configured of an LD is included only in the light source 10A, but not in other light sources (the light sources 10B and 10C), for example, as illustrated in FIG. 16, the small-amplitude oscillation element 100 may be disposed between the light source 10A and the optical path combining element 30 (the dichroic mirror 30C).

3. Third Embodiment

[Configuration]

FIGS. 17A and 17B illustrate a schematic configuration of a projector 4 according to a third embodiment of the technology. It is to be noted that the projector 4 corresponds to a specific example of "projection display" in the technology. FIG. 17A illustrates a configuration example of the projector 4 viewed from above (from a y-axis direction), and FIG. 17B illustrates a configuration example of the projector 4 viewed from a side thereof (from an x-axis direction). FIGS. 18A and 18B illustrate an example of an optical path in the projector 4 in FIGS. 17A and 17B. FIG. 18A illustrates an example of the optical path when the projector 4 is viewed from above (from the y-axis direction), and FIG. 18B illustrates an example of the optical path when the projector 4 is viewed from the side thereof (from the x-axis direction).

The projector 4 is different from the projector 3 including the illumination optical system 3A in that the projector 4 includes an illumination optical system 4A. Therefore, different points from the projector 3 will be mainly described below, and similar points to the projector 3 will not be further described.

In the illumination optical system 4A, the light sources 10A, 10B, and 10C and the dichroic mirror 30C of the illumination optical system 3A are not included, and instead of them, a light source 10D is included. The light source 10D is disposed on an optical axis of the coupling lens 20D, and the illumination optical system 4A is configured to allow light emitted from the light source 10D to directly enter the coupling lens 20D. The small-amplitude oscillation element 100 is disposed between the light source 10D and the coupling lens 20D.

The light source 10D includes, for example, the solid light-emitting element 11, and the package 12 supporting the solid light-emitting element 11 and allowing the solid light-emitting element 11 to be covered therewith. The solid light-emitting element 11 included in the light source 10D emits light from a light-emission region configured of a single or a plurality of point-shaped or non-point-shaped light-emission spots. For example, the solid light-emitting element 11 included in the light source 11D may be configured of a single chip 11A emitting light in a predetermined wavelength band, or may be configured of a plurality of chips 11A emitting light in the same wavelength band or in different wavelength bands. In the case where the solid light-emitting element 11 included in the light source 10D is configured of a plurality of chips 11A, these chips 11A may be arranged, for example, in a line in the transverse direction or in a grid-like pattern in the transverse direction and the longitudinal direction.

The chip 11A is configured of a light-emitting diode (LED), an organic EL light-emitting diode (OLED), or a laser diode (LD). In the case where a plurality of chips 11A are included in the light source 10D, all of the chips 11A included in the light source 10D may be configured of LDs. In the case where a plurality of chips 11A are included in the light source 10D, some of chips 11A may be configured of LDs, and the other chips 11A may be configured of LEDs or OLEDs.

In the case where a plurality of chips 11A are included in the light source 10D, these chips 11A included in the light source 10D may emit light in the same wavelength band or light in different wavelength bands. In the case where a plurality of chips 11A are included in the light source 10D, all of the chips 11A may be configured of chips emitting light with a wavelength of approximately 400 nm to 500 nm (blue light), light with a wavelength of approximately 500 nm to 600 nm (green light), or light with a wavelength of approximately 600 nm to 700 nm (red light). Moreover, in the case where a plurality of chips 11A are included in the light source 10D, the plurality of chips 11A included in the light source 10D may be configured of, for example, a chip emitting light with a wavelength of approximately 400 nm to 500 nm (blue light), a chip emitting light with a wavelength of approximately 500 nm to 600 nm (green light), and a chip emitting light with a wavelength of approximately 600 nm to 700 nm (red light).

[Functions and Effects]

Next, functions and effects of the projector 4 according to the embodiment will be described below. In the embodiment, the small-amplitude oscillation element 100 changing, from time to time, the illumination state in the illuminated region 60A illuminated with light having passed through the integrator 40 is disposed between the light source 10D and the coupling lens 20D. Therefore, speckles are allowed to be averaged enough not to perceive speckles by human eyes. Moreover, in the embodiment, the focal length $f_{CL4}$ of the coupling lens 20D, the focal lengths $f_{FEL}$ of the fly-eye lenses 40A and 40B, and the shape of the small-amplitude oscillation element 100 are determined to allow the size of each light source image S formed on the fly-eye lens 40B by each cell 41 of the fly-eye lens 40A not to exceed the size of one cell 42 of the fly-eye lens 40B. Further, the amount of displacement of each light source image S by oscillation amplitude of the small-amplitude oscillation element 100 is determined not to form the light source image S over a plurality of cells 42 of the fly-eye lens 40B. Therefore, light incident to the fly-eye lens 40B efficiently reaches the illuminated region 60A. It is to be noted that the small-amplitude oscillation element 100 oscillates enough to allow the illumination state in the illuminated region 60A to be changed from time to time; therefore, the small-amplitude oscillation element 100 does not impede downsizing of the illumination optical system 4A. Therefore, in the embodiment, while achieving downsizing and an improvement in light use efficiency, the generation of speckles is allowed to be reduced.

Moreover, in the embodiment, in the case where the cells of the fly-eye lenses 40A and 40B each have an aspect not equal to 1, when the focal lengths $f_{CL4H}$ and $f_{CL4V}$ of the coupling lens 20D, and the focal lengths $f_{FELH}$ and $f_{FELV}$ of the fly-eye lenses 40A and 40B are determined in consideration of the aspect ratio, light use efficiency in the illumination optical system 4A is allowed to be further improved. Further, in the embodiment, in the case where the coupling lens 20D has an aspect ratio not equal to 1, when the focal lengths $f_{CL4H}$ and $f_{CL4V}$ and the numerical apertures $NA_{4H}$ and $NA_{4V}$ of the coupling lens 20D are determined in consideration of the aspect ratio, light use efficiency in the illumination optical system 4A is allowed to be further improved.

In the third embodiment, for example, as illustrated in FIG. 19, the small-amplitude oscillation element 100 may be disposed between the coupling lens 20D and the integrator 40.

4. Fourth Embodiment

[Configuration]

FIGS. 20A and 20B illustrate a schematic configuration of a projector 5 according to a fourth embodiment of the technology. It is to be noted that the projector 5 corresponds to a specific example of "projection display" in the technology. FIG. 20A illustrates a configuration example of the projector 5 viewed from above (from a y-axis direction), and FIG. 20B illustrates a configuration example of the projector 5 viewed from a side thereof (from an x-axis direction).

The projector 5 is different from the projector 4 including the illumination optical system 4A in that the projector 5 includes an illumination optical system 5A. Therefore, different points from the projector 4 will be mainly described below, and similar points to the projector 4 will not be further described.

In the illumination optical system 5A, optical axes of the light source 10D and the coupling lens 20D of the illumination optical system 4A are inclined in a direction intersecting with an optical axis of the integrator 40. As illustrated in FIG. 20A, the optical axes of the light source 10D and the coupling lens 20D are preferably inclined in a transverse direction. It is to be noted that although not illustrated, the optical axes of the light source 10D and the coupling lens 20D may be inclined in a longitudinal direction, or may not be inclined.

The illumination optical system 5A further includes a polarization splitting element 80 and a retardation film array 90. The polarization splitting element 80 is disposed between the coupling lens 20D and the integrator 40, and the retardation film array 90 is disposed between the integrator 40 and the condenser lens 50 (or the illuminated region 60A). In the embodiment, the fly-eye lens 40B is disposed in front of a focal position of the fly-eye lens 40A, and the retardation film array 90 is disposed in the focal position (or a substantial focal position) of the fly-eye lens 40A. It is to be noted that the small-amplitude oscillation element 100 is disposed between the light source 10D and the coupling lens 20D.

Figure 21A:
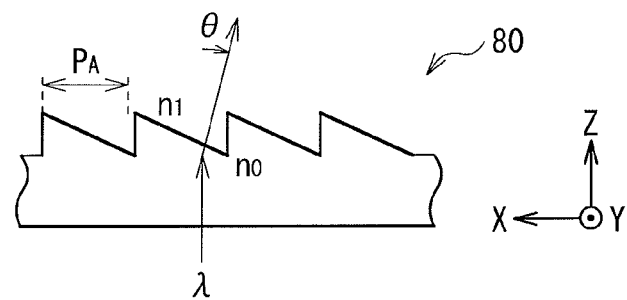
FIGS. 21A and 21B are sectional views illustrating an example of a configuration of a polarization splitting element in FIGS. 20A and 20B.
Figure 21B:
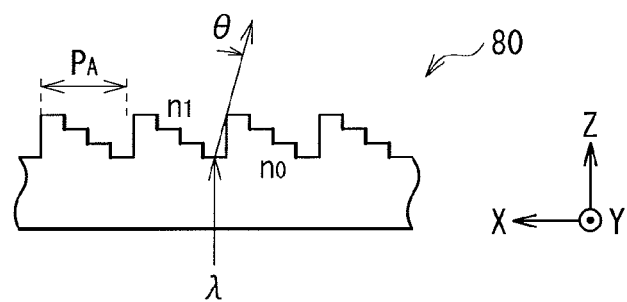

The polarization splitting element 80 is an optical element having anisotropy with respect to polarization of incident light, and splits (for example, diffracts) light incident from the coupling lens 20D into an S-polarized component and a P-polarized component in different traveling directions. A polarization splitting direction is preferably the transverse direction, but may be the longitudinal direction. For example, as illustrated in FIGS. 21A and 21B, the polarization splitting element 80 is preferably a polarization diffraction element with a concavo-convex shape having a plurality of strip-shaped blazed or stepwise projections aligned on one surface. It is to be noted that the polarization splitting element 80 may be a binary type polarization diffraction element (not illustrated). In FIGS. 21A and 21B, $n_0$ is a refractive index of the polarization splitting element 80, and $n_1$ is a refractive index of a region in contact with a surface on a light-emission side of the polarization splitting element 80. $P_A$ is a pitch of the projection of the polarization splitting element 80, and θ is a diffraction angle of light emitted from the surface on the light-emission side of the polarization splitting element 80. Moreover, λ is a wavelength of incident light.

For example, the polarization splitting element 80 allows S-polarized component light included in light incident from the coupling lens 20D to pass therethrough at incident and emission angles equal (or substantially equal) to each other. Moreover, the polarization splitting element 80 diffracts, for example, P-polarized component light included in the light incident from the coupling lens 20D, and allows the P-polarized component light to pass therethrough at incident and emission angles different from each other. It is to be noted that contrary to the above-described example, the polarization splitting element 80 may allow, for example, the P-polarized component light included in the light incident from the coupling lens 20D to pass therethrough at incident and emission angles equal (or substantially equal) to each other. In this case, for example, the polarization splitting element 80 may diffract the S-polarized component light included in the light incident from the coupling lens 20D, and allow the S-polarized component light to pass therethrough at incident and emission angles different from each other. The traveling direction of the S-polarized light emitted from the polarization splitting element 80 and the traveling direction of the P-polarized light emitted from the polarization splitting element 80 are opposite to each other in a relationship with a normal (an optical axis) of the polarization splitting element 80, and are preferably directed toward directions which are linearly symmetrical to each other in a relationship with the normal (the optical axis) of the polarization splitting element 80.

Figure 22:
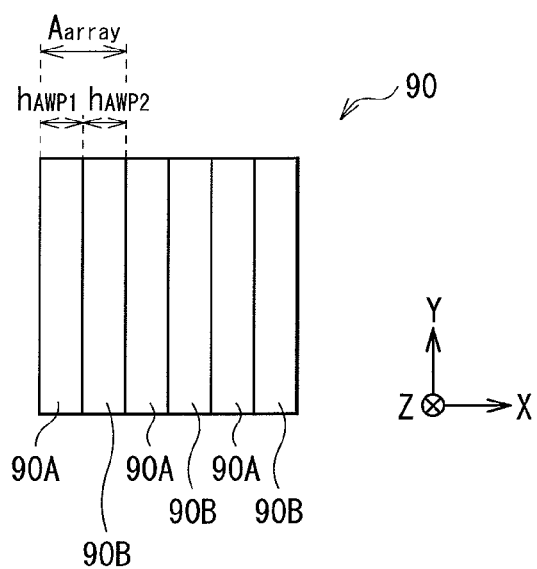
FIG. 22 is a top view illustrating an example of a configuration of a retardation film array in FIGS. 20A and 20B.

For example, as illustrated in FIG. 22, the retardation film array 90 has first regions 90A and second regions 90B having different phase differences from each other. The first regions 90A are disposed in positions where one of the S-polarized component and the P-polarized component split by the polarization splitting element 80 enters, and allows incident light to the first regions 90A to pass therethrough while maintaining the polarization direction of the incident light. On the other hand, the second regions 90B are disposed in positions where the other polarized component of the S-polarized component and the P-polarized component split by the polarization splitting element 80 enters, and convert incident light to the second region 90B into polarized light with polarization equal to that of light incident to the first region 90A. Both of the first regions 90A and the second regions 90B have a strip shape extending in a direction orthogonal to a splitting (diffraction) direction in the polarization splitting element 80, and are alternately arranged in a direction parallel to the splitting (diffraction) direction in the polarization splitting element 80. Herein, in the case where the cells of the fly-eye lenses 40A and 40B each have an aspect ratio not equal to 1, both of the first regions 90A and the second regions 90B preferably extend in a direction perpendicular to the longer directions of the fly-eye lenses 40A and 40B.

A total width $\Lambda_{array}$ of one first region 90A and one second region 90B adjacent to each other is equal to, for example, the width of one cell 42 of the fly-eye lens 40B. For example, as illustrated in FIG. 22, in the case where the first region 90A and the second region 90B are arranged in the transverse direction, the width $\Lambda_{array}$ is equal to, for example, the width ($h_{FEL2H}$) in the transverse direction of the cell 42. In the case where the first region 90A and the second region 90B are arranged in the longitudinal direction (not illustrated), the width $\Lambda_{array}$ is equal to, for example, the width ($h_{FEL2V}$) in the longitudinal direction of the cell 42. For example, a width $h_{AWP1}$ of the first region 90A and a width $h_{AWP2}$ of the second region 90B are equal to each other.

Figure 23A:
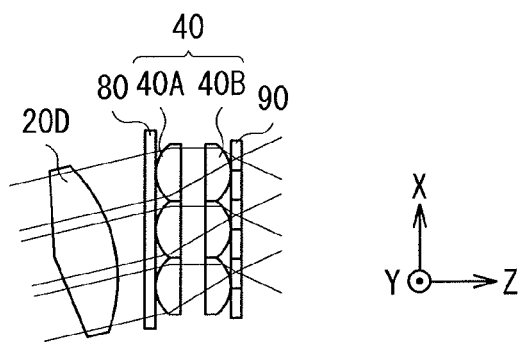
FIGS. 23A to 23C are diagrams illustrating an example of an optical path in the projector in FIGS. 20A and 20B.
Figure 23B:
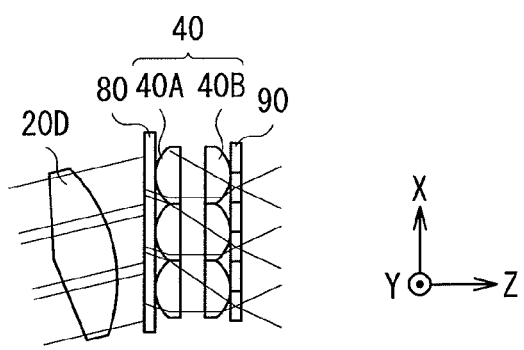
Figure 23C:
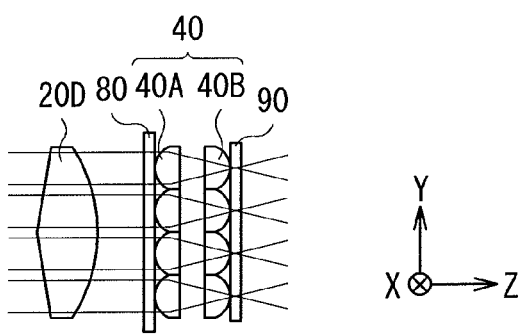

In the embodiment, for example, as illustrated in FIG. 23A to 23C, light from the coupling lens 20D enters the polarization splitting element 80 from an oblique direction. It is to be noted that FIG. 23A schematically illustrates only an optical path of a S-polarized component or a P-polarized component of light incident to the polarization splitting element 80, FIG. 23B schematically illustrates only an optical path of a polarized component different from the polarized component illustrated in FIG. 23A of the light incident to the polarization splitting element 80. FIG. 23C schematically illustrates a state where an optical path is common to the polarized components.

For example, light with an optical axis inclined in a direction (for example, the transverse direction) parallel to an alignment direction in the retardation film array 90 enters the polarization splitting element 80. Therefore, for example, as illustrated in FIGS. 23A and 23B, light of one polarized component of light incident to the polarization splitting element 80 is emitted in a direction parallel to an optical axis of the incident light, and light of the other polarized component of the light incident to the polarization splitting element 80 is emitted in a direction intersecting with the optical axis of the incident light. At this time, a bisector between an optical axis of the light emitted in the direction parallel to the optical axis of the incident light and an optical axis of the light emitted in the direction intersecting with the optical axis of the incident light is preferably parallel (or substantially parallel) to a normal (a z axis) of the polarization splitting element 80.

The light emitted in the direction parallel to the optical axis of the incident light is separated into a plurality of very small light fluxes by the integrator 40, and, for example, as illustrated in FIG. 23A, the very small light fluxes enter the first regions 90A of the retardation film array 90. Moreover, for example, as illustrated in FIG. 23B, the light emitted in the direction intersecting with the optical axis of the incident light is separated into a plurality of very small light fluxes by the integrator 40, and, for example, the very small light fluxes enter the second regions 90B of the retardation film array 90. It is to be noted that, although not illustrated, the light emitted in the direction parallel to the optical axis of the incident light may enter the second regions 90B of the retardation film array 90, and the light emitted in the direction intersecting with the optical axis of the incident light may enter the first regions 90A of the retardation film array 90. In both of the cases, one of P-polarized light and S-polarized light is mainly emitted from the retardation film array 90.

Figure 24:
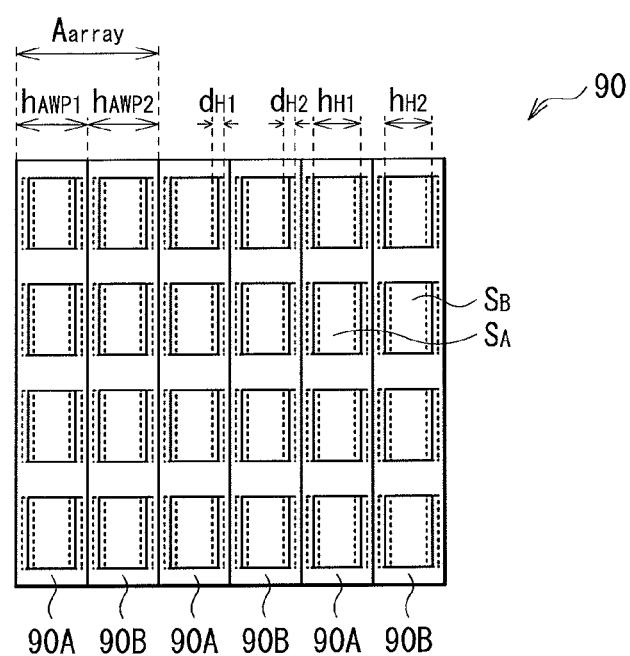
FIG. 24 is a schematic view illustrating an example of a light source image displayed on a latter fly-eye lens in the projector in FIGS. 20A and 20B.
Figure 28A:
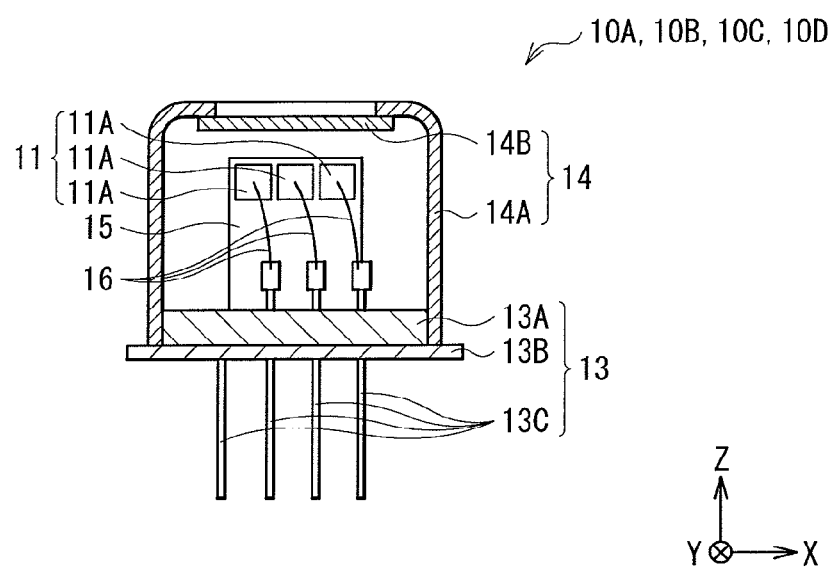
FIGS. 28A and 28B are a sectional view illustrating an example of a modification of the light source in FIGS. 1A and 1B, and a diagram of a solid light-emitting element included in the light source in FIG. 28A when viewed from a light emission surface side, respectively.
Figure 28B:
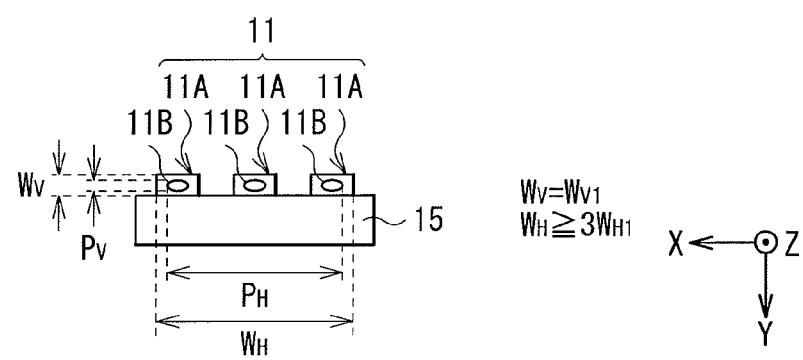
Figures 29A, 29B:
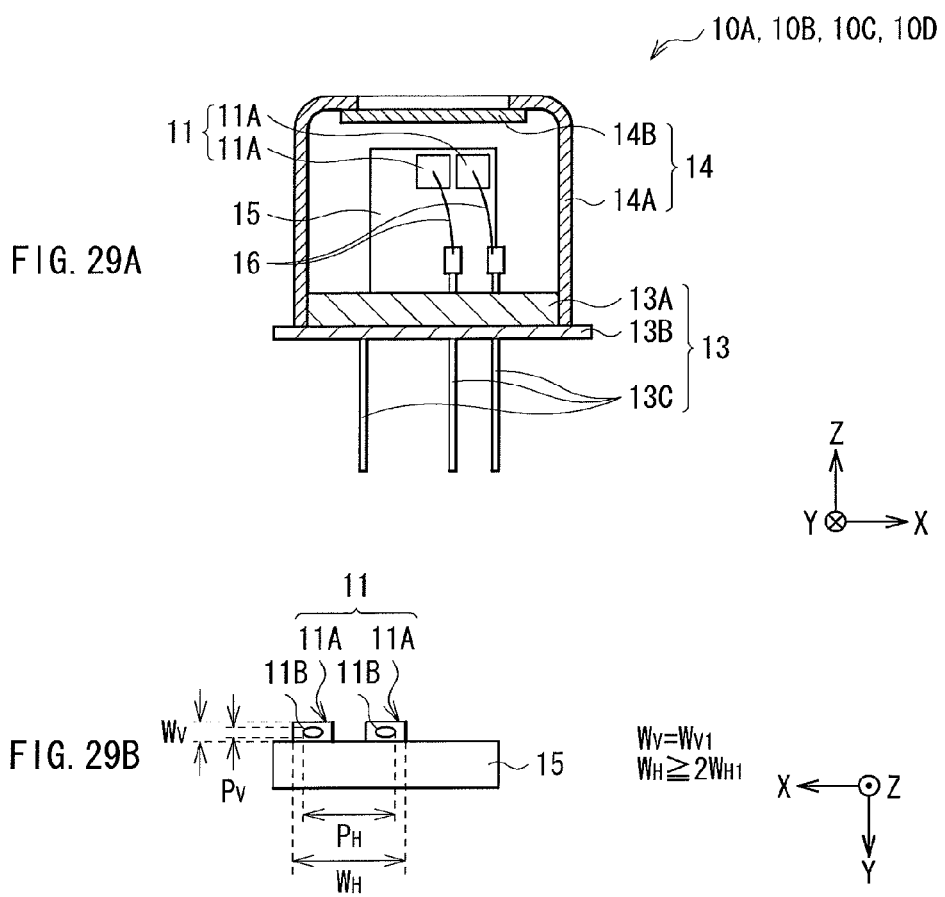
FIGS. 29A and 29B are a sectional view illustrating another example of the configuration of the light source in FIG. 28A, and a diagram of a solid light-emitting element included in the light source in FIG. 29A when viewed from a light emission surface side, respectively.

The light emitted in the direction parallel to the optical axis of the incident light is separated into very small light fluxes by the fly-eye lens 40A, and each of the separated light fluxes is focused on proximity to the first region 90A of the retardation film array 90, thereby forming a secondary light source plane (a light source image $S_A$) thereon (refer to FIG. 24). Likewise, the light emitted in the direction intersecting with the optical axis of the incident light is separated into very small light fluxes by the fly-eye lens 40A, and each of the separated light fluxes is focused on proximity to the second region 90B of the retardation film array 90, thereby forming a secondary light source plane (a light source image $S_B$) thereon (refer to FIG. 24).

In the embodiment, the focal length $f_{CL4}$ of the coupling lens 20D, the focal lengths $f_{FEL}$ of the fly-eye lenses 40A and 40B, and the shape of the small-amplitude oscillation element 100 are determined to allow the size of each of the light sources image $S_A$ and the light source images $S_B$ formed on the retardation film array 90 by each cell 41 of the fly-eye lens 40A not to exceed the size of one cell of the first region 90A and the second region 90B. Moreover, the amounts of displacement of the light source images $S_A$ and $S_B$ by oscillation amplitude of the small-amplitude oscillation element 100 are determined not to form each of the light source images $S_A$ and $S_B$ over the first region 90A and the second region 9B.

The small-amplitude oscillation element 100 performs oscillation having an amplitude component in one or both of a longer direction and a shorter direction of the first region 90A and the second region 90B. A direction where the light fluxes are scanned by the small-amplitude oscillation element 100 is, for example, an alignment direction of the retardation film array 90 (that is, in the shorter direction of the first region 90A and the second region 90B) or a direction corresponding thereto. The direction where the light fluxes are scanned by the small-amplitude oscillation element 100 may be a direction orthogonal to the alignment direction of the retardation film array 90 (that is, the longer direction of the first region 90A and the second region 90B), or a direction corresponding thereto.

Herein, in the case where the direction where the light fluxes are scanned by the small-amplitude oscillation element 100 is the alignment direction of the retardation film array 90 or a direction corresponding thereto, the amounts of displacement of the light source images $S_A$ and $S_B$ preferably satisfy the following expressions (23) and (24). The expressions (23) and (24) are schematically illustrated in FIG. 24. FIG. 24 illustrates a state where the light source images $S_A$ and $S_B$ oscillate in the first direction (for example, the transverse direction) or a direction corresponding thereto by oscillation of the small-amplitude oscillation element 100.

$$h_{H1}+d_{H1}=P_{AH}\times(f_{FEL}/f_{CL4H})d_{H1} \leq h_{AWP1} \qquad (23)$$

$$h_{H2}+d_{H2}=P_{AH}\times(f_{FEL}/f_{CL4H})+d_{H2} \leq h_{AWP2} \qquad (24)$$

where $h_{H1}$ is a size in the first direction or a direction corresponding thereto of the light source image $S_A$, $h_{H2}$ is a size in the first direction or a direction corresponding thereto of the light source image $S_B$, $P_{AH}$ is a size in the first direction or a direction corresponding thereto of a light-emission region of the solid light-emitting element 11 included in the light source 10D, $f_{CL4H}$ is a focal length in the first direction or a direction corresponding thereto of the coupling lens 20D, $h_{AWP1}$ is a size in the alignment direction of the first region 90A, $h_{AWP2}$ is a size in the alignment direction of the second region 90B, $d_{H1}$ is an amount of displacement of the light source image $S_A$ by oscillation amplitude of the small-amplitude oscillation element 100, and $d_{H2}$ is an amount of displacement of the light source image $S_B$ by oscillation amplitude of the small-amplitude oscillation element 100.

It is to be noted that in the case where the solid light-emitting element 11 is configured of a single chip 11A, $P_{AH}$ is equal to the size in the first direction or a direction corresponding thereto of the light-emission spot 11B of the chip 11A. In the case where the solid light-emitting element 11 is configured of a plurality of chips 11A, $P_{AH}$ is equal to a size in the first direction or a direction corresponding thereto of a smallest possible enclosure containing the light-emission spots 11B of all of the chips 11A. Moreover, in the case where the coupling lens 20D is configured of a plurality of lenses, $f_{CL4H}$ is a composite focal length in the first direction or a direction corresponding thereto of respective lenses.

Expressions substantially equivalent to the above-described expressions (23) and (24) are the following expressions (25) and (26). The expressions (25) and (26) are specifically advantageous in the case where the size of the light-emission region of the solid light-emitting element 11 is substantially equal to the size of the solid light-emitting element 11.

$$h_{H1}+d_{H1}=W_{AH}\times(f_{FEL}/f_{CL4H})+d_{H1} \leq h_{AWP1} \qquad (25)$$

$$h_{H2}+d_{H2}=W_{AH}\times(f_{FEL}/f_{CL4H})+d_{H2} \leq h_{AWP2} \qquad (26)$$

where $W_{AH}$ is a size in the first direction or a direction corresponding thereto of the solid light-emitting element 11 included in the light source 10D.

It is to be noted that in the case where the solid light-emitting element 11 is configured of a single chip 11A, $W_{AH}$ is equal to the size of the chip 11A. Moreover, in the case where the solid light-emitting element 11 is configured of a plurality of chips 11A, when a combination of all of the chips 11A is considered as a single chip, $W_{AH}$ is equal to a size of the single chip.

[Functions and Effects]

Next, functions and effects of the projector 5 according to the embodiment will be described below. In the embodiment, the small-amplitude oscillation element 100 changing, from time to time, the illumination state in the illuminated region 60A illuminated with light having passed through the integrator 40 is disposed between the light source 10D and the coupling lens 20D. Therefore, speckles are allowed to be averaged enough not to perceive speckles by human eyes. Moreover, in the embodiment, the focal lengths $f_{CL4}$ of the coupling lens 20D, the focal lengths $f_{FEL}$ of the fly-eye lenses 40A and 40B, and the shape of the small-amplitude oscillation element 100 are determined to allow the size of each of the light source images $S_A$ and $S_B$ formed on the retardation film array 90 by each cell 41 of the fly-eye lens 40A not to exceed the size of one cell of the first region 90A and the second region 90B. Further, the amounts of displacement of the light source images $S_A$ and $S_B$ by oscillation amplitude of the small-amplitude oscillation element 100 are determined not to form each of the light source images $S_A$ and $S_B$ over the first region 90A and the second region 90B. Therefore, light incident to the retardation film array 90 efficiently reaches the illuminated region 60A. It is to be noted that the small-amplitude oscillation element 100 oscillates enough to allow the illumination state in the illuminated region 60A to be changed from time to time; therefore, the small-amplitude oscillation element 100 does not impede downsizing of the illumination optical system 5A. Therefore, in the embodiment, while achieving downsizing and an improvement in light use efficiency, the generation of speckles is allowed to be reduced.

Moreover, in the embodiment, in the case where the cells of the fly-eye lenses 40A and 40B each have an aspect ratio not equal to 1, when the focal lengths $f_{CL4H}$ and $f_{CL4V}$ of the coupling lens 20D and the focal lengths $f_{FELH}$ and $f_{FELV}$ of the fly-eye lenses 40A and 40B are determined in consideration of the aspect ratio, light use efficiency in the illumination optical system 5A is allowed to be further improved. Further, in the embodiment, in the case where the coupling lens 20D has an aspect ratio not equal to 1, when the focal lengths $f_{CL4H}$ and $f_{CL4V}$ and the numerical apertures $NA_{4H}$ and $NA_{4V}$ of the coupling lens 20D are determined in consideration of the aspect ratio, light use efficiency in the illumination optical system 5A is allowed to be further improved.

Moreover, in the embodiment, while the polarization splitting element 80 is disposed in front of the integrator 40, and the retardation film array 90 is disposed behind the integrator 40, light from the coupling lens 20D is allowed to obliquely enter the polarization splitting element 80. Therefore, light emitted from the light source 10D in the case where a polarizing plate is used on a light incident side of the spatial modulating element 60 is allowed to be converted into polarized light mainly including a polarized component parallel to a transmission axis of the above-described polarizing plate. As a result, a loss of light caused in the polarizing plate disposed on the light incident side or the like of the spatial modulating element 60 is allowed to be reduced; therefore, light use efficiency in the whole projector 5 is allowed to be significantly improved.

In the fourth embodiment, for example, as illustrated in FIG. 25, the small-amplitude oscillation element 100 may be disposed between the coupling lens 20D and the integrator 40.

5. Examples

Next, examples of the illumination optical systems 1A, 3A, 4A, and 5A used in the projectors 1, 3, 4, and 5 according to the above-described respective embodiments will be described below. FIG. 26 illustrates design values of examples of the first to third embodiments, and FIG. 27 illustrates design values of an example of the fourth embodiment. Examples 1 to 3 in the drawing indicate common design values for the illumination optical systems 1A, 3A and 4A, and Example 4 in the drawing indicates design values of the illumination optical system 5A. In FIG. 26, expressions in "CONDITIONAL EXPRESSION" at the bottom are obtained through substituting design values in the following expressions (27) to (29) and (31) to (33) which are obtained through combining expressions obtained through replacing $P_{1H}$, $P_{2H}$, $P_{3H}$, $P_{1V}$, $P_{2V}$, and $P_{3V}$ with $W_{1H}$, $W_{2H}$, $W_{3H}$, $W_{1V}$, $W_{2V}$, and $W_{3V}$ in the above-described expressions (7) to (12), and the above-described expressions (17) to (22). In FIG. 27, expressions in "CONDITIONAL EXPRESSION" are obtained through substituting design values in the following expressions (30) and (34) which are obtained through combining expressions in a similar manner. It is to be noted that in FIGS. 26 and 27, for convenience sake, $f_{CL1H}$, $f_{CL2H}$, $f_{CL3H}$, and $f_{CL4H}$ are represented by $f_{CLH}$, and $f_{CL1V}$, $f_{CL2V}$, $f_{CL3V}$, and $f_{CL4V}$ are represented by $f_{CLV}$. Moreover, in FIGS. 26 and 27, for convenience sake, the numerical apertures $NA_{1H}$, $NA_{2H}$, $NA_{3H}$, and $NA_{4H}$ are represented by $NA_H$, and the numerical apertures $NA_{1V}$, $NA_{2V}$, $NA_{3V}$, and $NA_{4V}$ are represented by $NA_V$.

$$(w_{1H}/h_{FEL2H}) \times f_{FELH} \leq f_{CL1H} \leq h_{CL1H}/(2 \times NA_{1H}) \tag{27}$$

$$(w_{2H}/h_{FEL2H}) \times f_{FELH} \leq f_{CL2H} \leq h_{CL2H}/(2 \times NA_{2H}) \tag{28}$$

$$(w_{3H}/h_{FEL2H}) \times f_{FELH} \leq f_{CL3H} \leq h_{CL3H}/(2 \times NA_{3H}) \tag{29}$$

$$(w_{4H}/h_{FEL2H}) \times f_{FELH} \leq f_{CL4H} \leq h_{CL4H}/(2 \times NA_{4H}) \tag{30}$$

$$(w_{1V}/h_{FEL2H}) \times f_{FELV} \leq f_{CL1V} \leq h_{CL1V}/(2 \times NA_{1V}) \tag{31}$$

$$(w_{2V}/h_{FEL2H}) \times f_{FELV} \leq f_{CL2V} \leq h_{CL2V}/(2 \times NA_{2V}) \tag{32}$$

$$(w_{3V}/h_{FEL2V}) \times f_{FELV} \leq f_{CL3V} \leq h_{CL3V}/(2 \times NA_{3V}) \tag{33}$$

$$(w_{4V}/h_{FEL2V}) \times f_{FELV} \leq f_{CL4V} \leq h_{CL4V}/(2 \times NA_{4V}) \tag{34}$$

It is clear from FIGS. 26 and 27 that the focal lengths $f_{CL1H}$, $f_{CL2H}$, $f_{CL3H}$, $f_{CL4H}$, $f_{CL1V}$, $f_{CL2V}$, $f_{CL3V}$, and $f_{CL4V}$ satisfying the expressions (27) to (34) are determined with any of the design values.

6. Modifications

Although the present technology is described referring to a plurality of embodiments, the technology is not limited thereto, and may be variously modified.

(Modification 1)

For example, in the above-described embodiments, as illustrated in FIGS. 3A and 3B to FIGS. 6A and 6B, the case where the chip 11A is a top emission type element is described as an example; however, the chip 11A may be an edge emission type element. In this case, as illustrated in FIGS. 28A and 28B to FIGS. 33A and 33B, the light sources 10A, 10B, 10C, and 10D are of a can type in which the solid light-emitting element 11 configured of one or a plurality of edge emission type chips 11A is contained in an internal space enclosed with a stem 13 and a cap 14.

The stem 13 constitutes, together with the cap 14, a package of the light sources 10A, 10B, 10C, and 10D, and includes, for example, a supporting substrate 13A supporting a submount 15, an outer substrate 13B disposed on a back side of the supporting substrate 13A, and a plurality of connection terminals 13C. The submount 15 is made of a material having conductivity and thermal dissipation. The supporting substrate 13A and the outer substrate 13B each are configured by forming one or a plurality of insulating through holes and one or a plurality of conductive through holes in a base having conductivity and heat dissipation. The supporting substrate 13A and the outer substrate 13B each have, for example, a disk shape, and are laminated to allow central axes (not illustrated) thereof to overlap each other. The diameter of the outer substrate 13B is larger than that of the supporting substrate 13A. An outer edge of the outer substrate 13B is a ring-shaped flange hanging over in a radiation direction from the central axis of the outer substrate 13B in a plane considering the central axis of the outer substrate 13B as a normal. The flange has a role of determining a reference position when the cap 14 is put on the supporting substrate 13A in a manufacturing step. The plurality of connection terminals 13C penetrate through at least the supporting substrate 13A. Terminals (hereinafter referred to as "terminals α" for convenience sake) except for one or more terminals of the plurality of connection terminals 13C are electrically connected to electrodes (not illustrated) of the chips 11A, respectively. For example, the terminals α are protruded long on the outer substrate 13B side, and are protruded short on the supporting substrate 13A side. Moreover, a terminal (hereinafter referred to as "terminal β" for convenience sake) other than the above-described terminals α of the plurality of connection terminals 13C is electrically connected to the other electrodes (not illustrated) of all of the chips 11A. For example, the terminal β is protruded long on the outer substrate 13B side, and, for example, an end on the supporting substrate 13A side of the terminal β is embedded in the supporting substrate 13A. A portion protruded long on the outer substrate 13 side of each of the connection terminals 13C corresponds to a portion fit in, for example, a substrate or the like. On the other hand, portions protruded short on the supporting substrate 13A of the plurality of connection terminals 13C correspond to portions electrically connected to the chips 11A through wires 16, respectively. Portions embedded in the supporting substrate 13A of the plurality of connection terminals 13C correspond to, for example, portions electrically connected to all of the chips 11A through the supporting substrate 13 and the submount 15. The terminals α are supported by the insulating through holes provided in the supporting substrate 13A and the outer substrate 13B, and are insulated and separated from the supporting substrate 13A and the outer substrate 13B by the through holes. Moreover, the terminals α are insulated and separated from one another by the above-described insulating members. On the other hand, the terminal β is supported by the conductive through holes provided in the supporting substrate 13A and the outer substrate 13B, and is electrically connected to the through holes.

The cap 14 seals the solid light-emitting element 11. The cap 14 has a tube section 14A having openings in upper and lower ends thereof. The lower end of the tube section 14A is in contact with, for example, a side surface of the supporting substrate 13A, and the solid light-emitting element 11 is disposed in the internal space of the tube section 14A. The cap 14 has a light transmission window 14B disposed to block the opening in the upper end of the tube section 14A. The light transmission window 14B is disposed in a position facing the light emission surface of the solid light-emitting element 11, and has a function of allowing light emitted from the solid light-emitting element 11 to pass therethrough.

In the modification, the solid light-emitting element 11 emits light from a light-emission region configured of a single or a plurality of point-shaped or non-point-shaped light-emission spots. The solid light-emitting element 11 may be configured of, for example, a single chip 11A emitting light in a predetermined wavelength band, or a plurality of chips 11A emitting light in the same wavelength band or different wavelength bands. In the case where the solid light-emitting element 11 is configured of a plurality of chips 11A, for example, as illustrated in FIGS. 28A, 28B, 29A and 29B, these chips 11A may be arranged in a line in a transverse direction, or, for example, as illustrated in FIGS. 31A, 31B, 32A, and 32B, these chips 11A may be arranged in a line in a longitudinal direction. The number of chips 11A included in the solid light-emitting element 11 may vary from one of the light sources 10A, 10B, 10C, and 10D to another, or may be equal in all of the light sources 10A, 10B, 10C, and 10D.

Figure 30A:
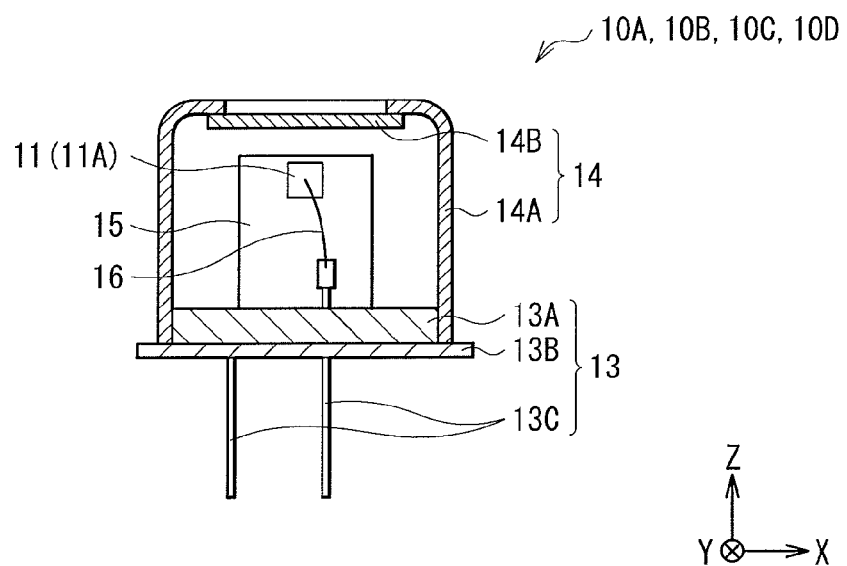
FIGS. 30A and 30B are a sectional view illustrating another example of the light source in FIG. 28A, and a diagram of a solid light-emitting element included in the light source in FIG. 30A when viewed from a light emission surface side, respectively.
Figure 30B:
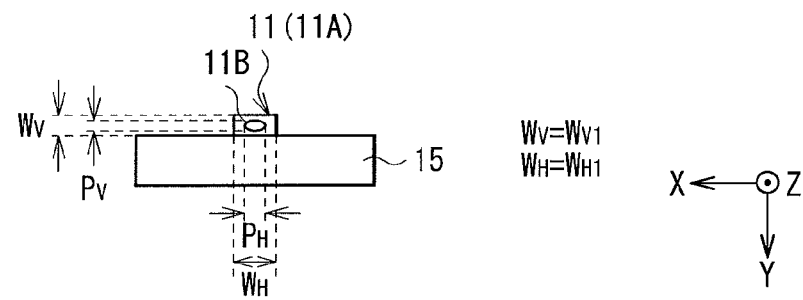
Figure 32A:
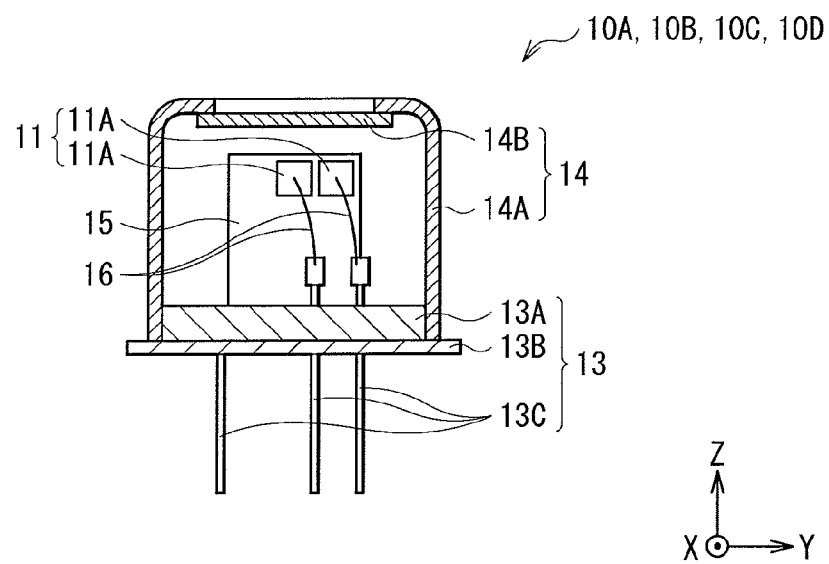
FIGS. 32A and 32B are a sectional view illustrating an example of the configuration of the light source in FIGS. 29A and 29B rotated by 90° on an XY plane, and a diagram of the solid light-emitting element included in the light source in FIG. 32A when viewed from a light emission surface side, respectively.
Figure 32B:
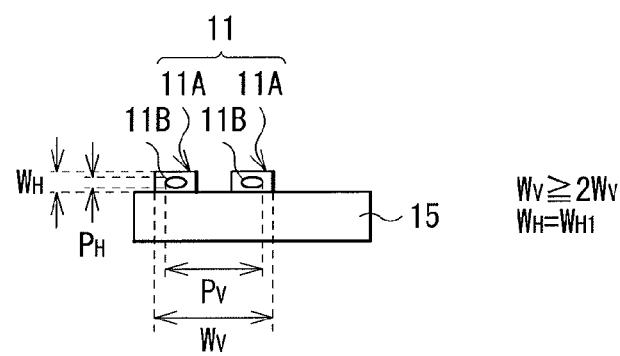

In the case where the solid light-emitting element 11 is configured of a single chip 11A, the size ($W_V \times W_H$) of the solid light-emitting element 11 is equal to the size ($W_{V1} \times W_{H1}$) of the single chip 11A, for example, as illustrated in FIGS. 30B and 33B. On the other hand, in the case where the solid light-emitting element 11 is configured of a plurality of chips 11A, for example, as illustrated in FIGS. 28B, 29B, 31B, and 32B, the size of the solid light-emitting element 11 is equal to the size of a combination of all of the chips 11A. In the case where the plurality of chips 11A are arranged in a line in the transverse direction, the size ($W_V \times W_H$) of the solid light-emitting element 11 is larger than $W_{V1} \times 3W_{H1}$ in an example in FIG. 28B, and is larger than $W_{V1} \times 2W_{H1}$ in an example in FIG. 29B. Moreover, in the case where the plurality of chips 11A are arranged in a line in the longitudinal direction, the size ($W_V \times W_H$) of the solid light-emitting element 11 is larger than $3W_{V1} \times W_{H1}$ in an example in FIG. 31B, and is larger than $2W_{V1} \times W_{H1}$ in an example in FIG. 32B.

The chip 11A is configured of, for example, a laser diode (LD). All of the chips 11A included in the light sources 10A, 10B, 10C, and 10D may be configured of LDs. Moreover, the chips 11A included in one or more of the light sources 10A, 10B, 10C, and 10D may be configured of LDs, and the chips 11A included in the other light sources may be configured of LEDs or OLEDs.

For example, as illustrated in FIGS. 28A and 28B to 33A and 33B, the chips 11A each have a light-emission spot 11B with a smaller size ($P_{V1} \times P_{H1}$) than the size ($W_V \times W_H$) of the chip 11A. The light-emission spot 11B corresponds to a region (light-emission region) emitting light from the chip 11A when a current is injected into the chip 11A to drive the chip 11A. In the case where the chip 11A is configured of the LD, the light-emission spot 11B has a smaller point shape than the light-emission spot of the LED or the OLED.

In the case where the solid light-emitting element 11 is configured of a single chip 11A, for example, as illustrated in FIGS. 30B and 33B, the number of light-emission spots 11B is 1. On the other hand, in the case where the solid light-emitting element 11 is configured of a plurality of chips 11A, for example, as illustrated in FIGS. 28B, 29B, 31B, and 32B, the number of the light-emission spots 11B is equal to the number of chips 11A. In this case, in the case where the solid light-emitting element 11 is configured of a single chip 11A, the size ($P_V \times P_H$) of a light-emission region of the solid light-emitting element 11 is equal to the size ($P_{V1} \times P_{H1}$) of the light-emission spot 11B. On the other hand, in the case where the solid light-emitting element 11 is configured of a plurality of chips 11A, the size ($P_V \times P_H$) of the light-emission region of the solid light-emitting element 11 is equal to the size of a smallest possible enclosure containing the light-emission spots 11B of all of the chips 11A. In the case where the plurality of chips 11A are arranged in a line in the transverse direction, in an example in FIG. 28B, the size ($P_V \times P_H$) of the light-emission region is larger than $P_{V1} \times 3P_{H1}$, and smaller than $W_V \times W_H$. Likewise, in an example in FIG. 29B, the size ($P_V \times P_H$) of the light-emission region is larger than $P_{V1} \times 2P_{H1}$, and smaller than $W_V \times W_H$. Moreover, in the case where the plurality of chips 11A are arranged in a line in the longitudinal direction, in an example in FIG. 31B, the size ($P_V \times P_H$) of the light-emission region is larger than $3P_{V1} \times P_{H1}$, and smaller than $W_V \times W_H$. Likewise, in an example in FIG. 32B, the size $(P_V \times P_H)$ of the light-emission region is larger than $2P_{V1} \times P_{H1}$, and smaller than $W_V \times W_H$.

(Modification 2)

Moreover, in the above-described embodiments and modifications thereof, the illumination optical systems 1A, 3A, 4A, and 5A each include an infinite optical system allowing parallel light to enter the fly-eye lens 40A; however, they may include a finite optical system allowing convergent light (or divergent light) to enter the fly-eye lens 40A. In this case, in the above-described embodiments and modifications thereof, instead of the coupling lenses 20A to 20D, a beam spread angle changing element having a function of converging or diverging light emitted from the light sources 10A to 10D may be arranged. However, in this case, optical magnification of an optical system configured of the above-described beam spread angle changing element and the fly-eye lenses 40A and 40B, and the shape of the small-amplitude oscillation element 100 are preferably determined to allow the size of each light source image S formed on the fly-eye lens 40B by each cell 41 of the fly-eye lens 40A not to exceed the size of one cell 42 of the fly-eye lens 40B. In this case, the size of the light source image S preferably satisfies the following expression.

$$h = P \times m$$

where h is the size of the light source image S,

P is the size of the light-emission spot 11B of the solid light-emitting element 11 included in the light sources 10A to 10D, and m is optical magnification of the optical system configured of the above-described beam spread angle changing element and the fly-eye lenses 40A and 40B.

Moreover, the amount of displacement of each light source image S by oscillation amplitude of the small-amplitude oscillation element 100 is preferably determined not to form the light source image S over a plurality of cells 42 of the fly-eye lens 40B.

Moreover, in the modification, in the case where the cells 41 and 42 of the fly-eye lenses 40A and 40B each have an aspect ratio not equal to 1, the illumination optical systems 1A, 3A, 4A, and 5A each are preferably configured of an anamorphic optical system.

(Modification 3)

Moreover, in the above-described embodiments and modifications thereof, the case where the technology is applied to the projection display is described; however, the technology is applicable to any other displays. For example, as illustrated in FIG. 34, the technology is applicable to a rear projection display 6. The rear projection display 6 includes any of the projector 1, 3, 4, and 5 including the illumination optical system 1A, 3A, 4A, and 5A, respectively, and a transmissive screen 7 displaying image light projected from the projector 1, 3, 4, or 5 (the projection optical system 70). Thus, when the illumination optical system 1A, 3A, 4A, or 5A is used as an illumination optical system of the rear projection display 6, light use efficiency is allowed to be improved.

(Modification 4)

Further, in the above-described embodiments and modifications thereof, the small-amplitude oscillation element 100 includes the optical element 110 and the drive section 120 applying small-amplitude oscillation to the optical element 110; however, instead of them, the small-amplitude oscillation element 100 may include, for example, a power element converging a part of incident light and diverging a part of the incident light, and a drive section applying small-amplitude oscillation to the power element.

In the modification, the drive section changes a relative position between the power element and the integrator 40. For example, the drive section applies oscillation to the power element in one direction in a plane thereof to change the relative position between the power element and the integrator 40. Therefore, the incident position of convergent light and the incident position of divergent light are changed in an incident plane of the integrator 40, thereby allowing the illumination state in the illuminated region 60A to be changed from time to time. It is to be noted that scanning of the light fluxes by the drive section may be performed in a continuous cyclic manner or may be discretely repeated. In any case, the illumination state in the illuminated region 60A is allowed to be changed from time to time. The drive section preferably controls the power element to allow an incident angle to the fly-eye lens 40A of light emitted from the power element to fall in an allowable angle of the fly-eye lens 40A.

Figure 35A:
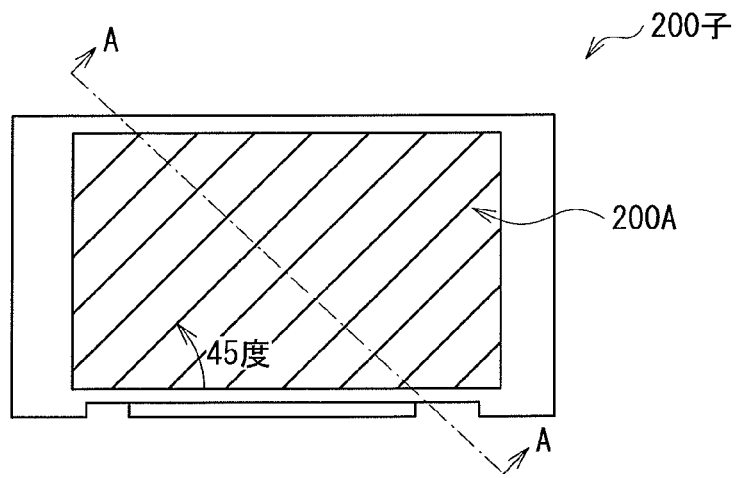
FIGS. 35A and 35B are a plan view and a sectional view illustrating an example of a power element included in a small-amplitude oscillation element according to a modification, respectively.
Figure 35B:
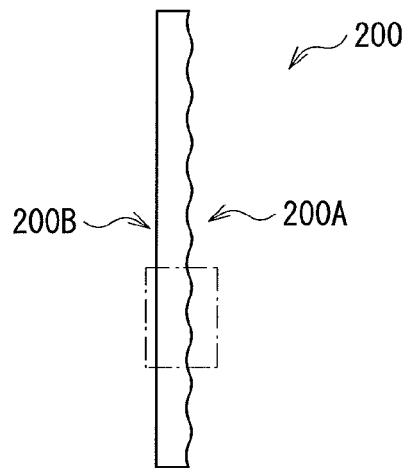
Figure 36:
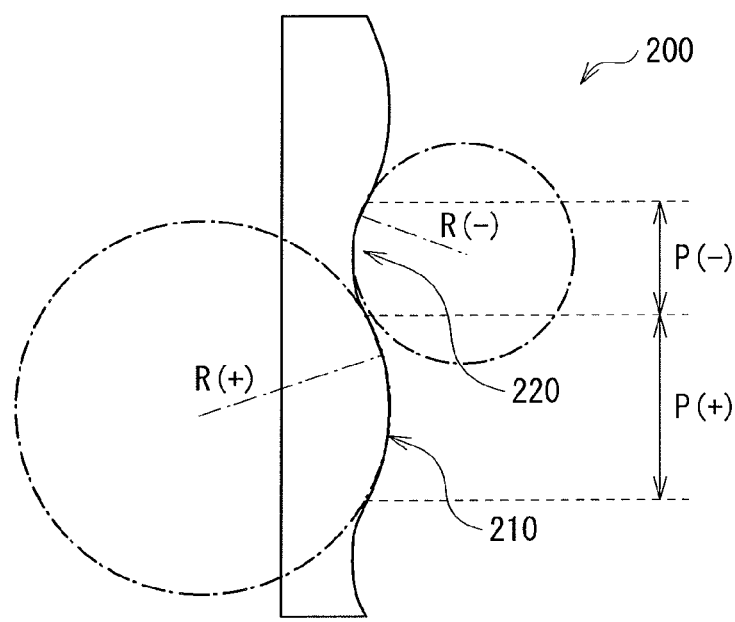
FIG. 36 is an enlarged view of the power element in FIG. 35B.

FIG. 35A is a plan view illustrating an example of the above-described power element. FIG. 35B is a sectional view taken along an arrow direction A-A of FIG. 35A. FIG. 36 is an enlarged view of a portion enclosed by an alternate long and short dashed line in FIG. 35B, and FIG. 37 is a sectional view illustrating the power element in FIG. 36 together with the integrator 40.

A power element 200 illustrated in FIG. 35A has, on the integrator 40 side, a concavo-convex surface 200A having convex cylinder surfaces 210 (first optical surfaces) and concave cylinder surfaces 220 (second optical surfaces) which are alternately arranged, and further has a flat surface 200B on a side opposite to the integrator 40 side. The convex cylinder surfaces 210 and the concave cylinder surfaces 220 extend in a direction intersecting with the transverse direction at an angle of 45°, and are alternately arranged in a direction orthogonal to the extending direction. The convex cylinder surfaces 210 are convex curved surfaces with a curvature radius R(+), and convert light incident from the flat surface 200B into a convergent light flux. The concave cylinder surfaces 220 are concave curved surfaces with a curvature radius R(−), and convert light incident from the flat surface 200B into a divergent light flux. The curvature radius R(+) of each of the convex cylinder surfaces 210 is larger than the curvature radius R(−) of each of the concave cylinder surfaces 220. Moreover, a width P(+) (width in an arrangement direction) of the convex cylinder surface 210 is larger than a width P(−) (width in the arrangement direction) of the concave cylinder surface 220.

Figure 37:
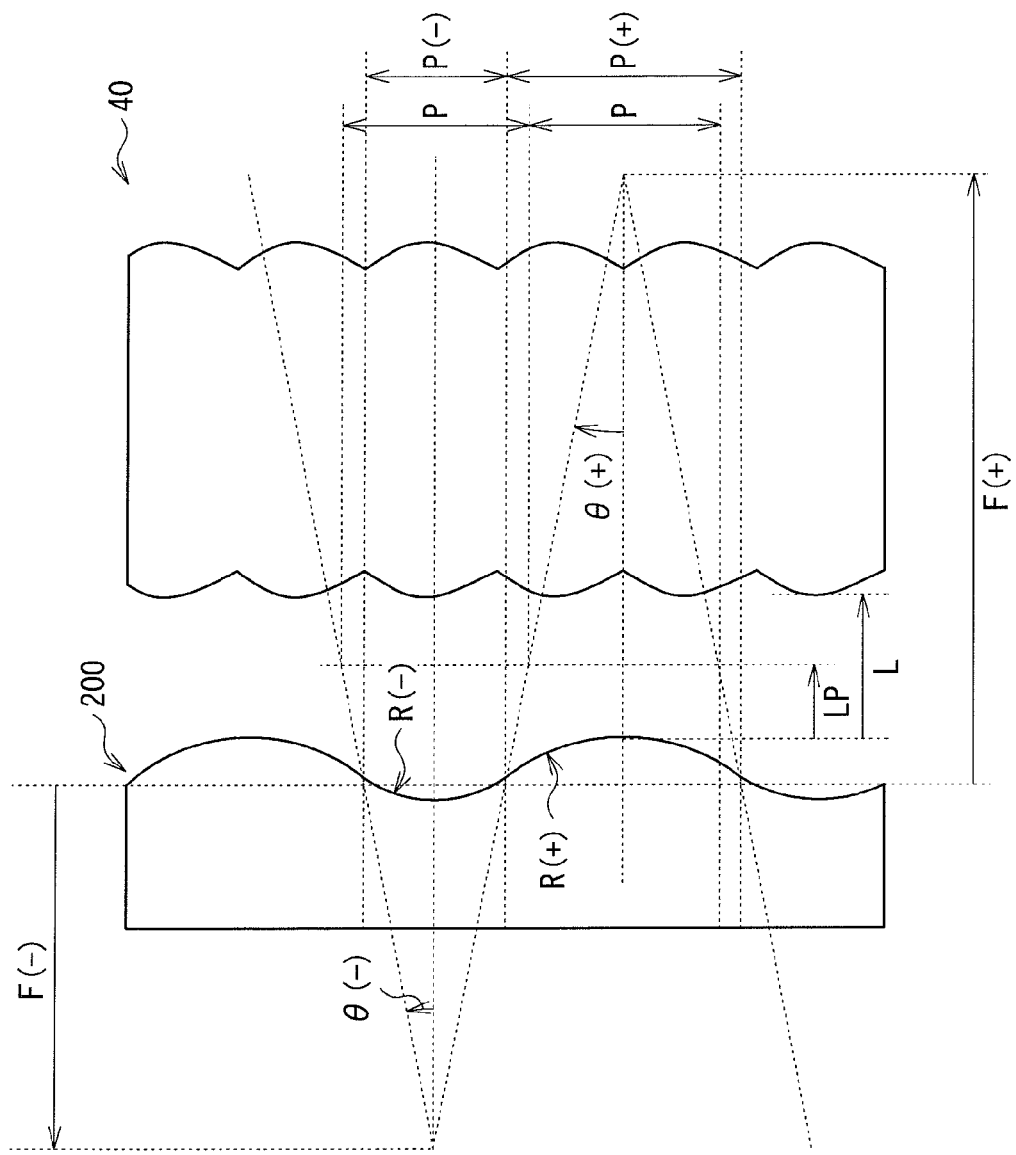
FIG. 37 is a sectional view illustrating the power element in FIG. 36B together with an integrator.

In this case, F(+) in FIG. 37 is a focal length of the convex cylinder surface 210. Moreover, F(−) is a focal length of the concave cylinder surface 220. Moreover, θ(+) is a maximum angle which a traveling direction of light rays forming a convergent light flux forms with the optical axis of the integrator 40. Further, θ(−) is a maximum angle which a traveling direction of light rays forming a divergent light flux forms with the optical axis of the integrator 40. LP is a distance from a plane including a point where a width of a convergent light flux of the convex cylinder surface 210 and a width of a divergent light flux of the concave cylinder surface 220 are equal to each other to the power element 200. P is a width of each of the convergent light flux of the convex cylinder surface 210 and the divergent light flux of the concave cylinder surface 220 at the point where these widths are equal to each other. L is a distance from the power element 200 to the integrator 40, and more specifically, L is a distance from a plane including a top section of each convex cylinder surface 210 to a plane including a top section of each cell 41 of the fly-eye lens 40A. It is to be noted that values of respective parameters of the power element 200 as an example are illustrated in the following Table 1.

TABLE 1

| Parameter | Value  | Unit |
|-----------|--------|------|
| R(+)      | 1.582  | mm   |
| R(−)      | −1.334 | mm   |
| F(+)      | 2.891  | mm   |
| F(−)      | −2.438 | mm   |
| P(+)      | 0.304  | mm   |
| P(−)      | 0.256  | mm   |
| θ(+)      | −3.00  | °    |
| θ(−)      | 3.00   | °    |
| LP        | 0.22   | mm   |
| P         | 0.28   | mm   |
| L         | 0.5    | mm   |

(Modification 5)

Moreover, in the above-described embodiments and modifications thereof, the small-amplitude oscillation element 100 includes the optical element 110 and the drive section 120 applying small-amplitude oscillation to the optical element 110; however, instead of them, the small-amplitude oscillation element 100 may include a diffraction branching element using a diffraction effect and a drive section applying small-amplitude oscillation to the diffraction branching element. The diffraction branching element diffracts incident light to branch the incident light into a plurality of diffraction order light fluxes, thereby emitting the light fluxes at different angles. However, the diffraction branching element is preferably configured to allow an incident angle to the fly-eye lens 40A of light emitted therefrom to fall in an allowable angle of the fly-eye lens 40A. Further, the drive section preferably applies oscillation to the diffraction branching element to allow the incident angle to the fly-eye lens 40A of light emitted from the diffraction branching element to fall in the allowable angle of the fly-eye lens 40A.

(Modification 6)

Moreover, in the above-described embodiments and modifications thereof, the small-amplitude oscillation element 100 includes the optical element 110 and the drive section 120 applying small-amplitude oscillation to the optical element 110; however, instead of them, the small-amplitude oscillation element 100 may include a diffuser plate and a drive section applying small-amplitude oscillation to the diffuser plate. However, the diffuser plate is preferably configured to allow an incident angle to the fly-eye lens 40A of light emitted therefrom to fall in the allowable angle of the fly-eye lens 40A. Moreover, the drive section preferably applies oscillation to the diffuser plate to allow the incident angle to the fly-eye lens 40A of light emitted from the diffuser plate to fall in the allowable angle of the fly-eye lens 40A.

Moreover, for example, the technology is allowed to have the following configurations.

(1) An illumination device including:

a first light source including a first solid light-emitting element which emits light from a light-emission region configured of a single or a plurality of light-emission spots;

a first beam spread angle changing element changing a beam spread angle of light incident from the first light source;

an integrator equalizing an illuminance distribution of light in a predetermined illuminated region illuminated with light having passed through the first beam spread angle changing element; and a first small-amplitude oscillation element disposed between the first light source and the first beam spread angle changing element or between the first beam spread angle changing element and the integrator, and changing, from time to time, an illumination state in the illuminated region, in which the first solid light-emitting element includes a laser diode, the integrator is configured of a first fly-eye lens and a second fly-eye lens, the first fly-eye lens where light from the first beam spread angle changing element enters, the second fly-eye lens where light from the first fly-eye lens enters, optical magnification of an optical system configured of the first beam spread angle changing element and the first and second fly-eye lenses, and a shape of the first small-amplitude oscillation element are determined to allow a size of each light source image formed on the second fly-eye lens by each cell of the first fly-eye lens not to exceed a size of one cell of the second fly-eye lens, and an amount of displacement of each light source image by oscillation amplitude of the first small-amplitude oscillation element is determined not to form the light source image over a plurality of cells of the second fly-eye lens.

(2) The illumination device according to (1), in which the first solid light-emitting element is configured of a single chip emitting light in a predetermined wavelength band, or a plurality of chips emitting light in the same wavelength band, or light in different wavelength bands, and the amount of displacement of the light source image by oscillation amplitude of the first small-amplitude oscillation element satisfies the following relational expression:

$$h + d \leq h_{FEL2}$$

where h is the size of the light source image, d is the amount of displacement of the light source image by oscillation of the first small-amplitude oscillation element, and $h_{FEL2}$ is the size of one cell of the second fly-eye lens.

(3) The illumination device according to (2), in which cells of the first and second fly-eye lenses each have an aspect ratio not equal to 1, and the amount of displacement of the light source image by oscillation amplitude of the first small-amplitude oscillation element satisfies the following relational expressions:

$$h_x + d_x \leq h_{FEL2x}$$

$$h_y + d_y \leq h_{FEL2y}$$

where $h_x$ is a size in a first direction (a longer direction of each cell of the first and second fly-eye lenses or a direction corresponding thereto) of the light source image, $h_y$ is a size in a second direction (a shorter direction of each cell of the first and second fly-eye lenses or a direction corresponding thereto) orthogonal to the first direction of the light source image, $h_{FEL2x}$ is a size in the first direction of one cell of the second fly-eye lens, $h_{FEL2y}$ is a size in the second direction of one cell of the second fly-eye lens, $d_x$ is a component in the first direction ($d_x \geq 0$, but $d_x > 0$ under $d_y = 0$) of the amount of displacement of the light source image by oscillation amplitude of the first small-amplitude oscillation element, and $d_y$ is a component in the second direction ($d_y \geq 0$, but $d_y > 0$ under $d_x = 0$) of the amount of displacement of the light source image by oscillation amplitude of the first small-amplitude oscillation element.

(4) The illumination device according to any one of (1) to (3) further including:

a second light source including a second solid light-emitting element which emits light from a light-emission region configured of a single or a plurality of light-emission spots;

a second beam spread angle changing element changing a beam spread angle of light incident from the second light source; and an optical path combining element combining light having passed through the first beam spread angle changing element and light having passed through the second beam spread angle changing element into composite light, and then outputting the composite light to the integrator, in which the second solid light-emitting element includes a laser diode, and the first small-amplitude oscillation element is disposed between the optical path combining element and the integrator.

(5) The illumination device according to (4), in which the first small-amplitude oscillation element is disposed between the first light source and the first beam spread angle changing element or between the first beam spread angle changing element and the optical path combining element, the illumination device further includes a second small-amplitude oscillation element disposed between the second light source and the second beam spread angle changing element or between the second beam spread angle changing element and the optical path combining element, and changing, from time to time, an illumination state in the illuminated region, optical magnification of an optical system configured of the second beam spread angle changing element and the first and second fly-eye lenses, and a shape of the second small-amplitude oscillation element are determined to allow the size of each light source image formed on the second fly-eye lens by each cell of the first fly-eye lens not to exceed the size of one cell of the second fly-eye lens, and a shape of the second small-amplitude oscillation element and an amount of displacement of each light source image by oscillation amplitude of the second small-amplitude oscillation element are determined not to form the light source image over a plurality of cells of the second fly-eye lens.

(6) The illumination device according to any one of (1) to (5), in which a focal length of the first beam spread angle changing element has an aspect ratio not equal to 1, cells of the first and second fly-eye lenses each have an aspect ratio not equal to 1, and a ratio of vertical and horizontal focal lengths of the first beam spread angle changing element and an inverse of the aspect ratio of each cell of the second fly-eye lens are equal to each other.

(7) The illumination device according to any one of (1) to (6), in which the first fly-eye lens is disposed in a substantial focal position of the second fly-eye lens, and the second fly-eye lens is disposed in a substantial focal position of the first fly-eye lens.

(8) The illumination device according to any one of (1) to (7) further including:

a polarization splitting element disposed between the first beam spread angle changing element and the integrator; and a retardation film array disposed between the integrator and the illuminated region, in which the first small-amplitude oscillation element is disposed between the first light source and the first beam spread angle changing element or between the first beam spread angle changing element and the polarization splitting element, the polarization splitting element splits light incident from the first beam spread angle changing element into an S-polarized component and a P-polarized component with different traveling directions, the retardation film array has first regions and second regions with different phase differences, the first regions are disposed in positions where one of the S-polarized component and the P-polarized component split by the polarization splitting element enters, and allow light incident thereto to pass therethrough while maintaining the polarization direction of the incident light, and the second regions are disposed in positions where the other polarized component of the S-polarized component and the P-polarized component enters, and converts light incident thereto into light with polarization equal to that of light incident to the first regions.

(9) The illumination device according to (8), in which both of the first regions and the second regions have a strip shape extending in a direction orthogonal to a splitting direction in the polarization splitting element, and are alternately arranged in a direction parallel to the splitting direction in the polarization splitting element.

(10) The illumination device according to (8), in which cells of the first and second fly-eye lenses each have an aspect ratio not equal to 1, and both of the first regions and the second regions have a strip shape extending in a direction perpendicular to a longer direction of the first and second fly-eye lenses.

(11) The illumination device according to (8), in which the retardation film array is disposed in a substantial focal position of the first fly-eye lens, and the second fly-eye lens is disposed in front of the focal position of the first fly-eye lens.

(12) A projection display including:

an illumination optical system;

a spatial modulating element modulating light from the illumination optical system based on an input picture signal to generate image light; and a projection optical system projecting the image light generated by the spatial modulating element, in which the illumination optical system includes:

a first light source including a laser diode, a first beam spread angle changing element changing a beam spread angle of light incident from the first light source, an integrator equalizing an illuminance distribution of light in a predetermined illuminated region illuminated with light having passed through the first beam spread angle changing element, and a first small-amplitude oscillation element disposed between the first light source and the first beam spread angle changing element or between the first beam spread angle changing element and the integrator, and changing, from time to time, an illumination state in the illuminated region, the integrator is configured of a first fly-eye lens and a second fly-eye lens, the first fly-eye lens where light from the first beam spread angle changing element enters, the second fly-eye lens where light from the first fly-eye lens enters, and optical magnification of an optical system configured of the first beam spread angle changing element and the first and second fly-eye lenses, and a shape of the first small-amplitude oscillation element, and an amount of displacement of each light source image by oscillation amplitude of the first small-amplitude oscillation element are determined to allow a size of each light source image formed on the second fly-eye lens by each cell of the first fly-eye lens not to exceed a size of one cell of the second fly-eye lens.

(13) A direct-view display including:
an illumination optical system;
a spatial modulating element modulating light from the illumination optical system based on an input picture signal to generate image light;
a projection optical system projecting the image light generated by the spatial modulating element; and
a transmissive screen displaying the image light projected from the projection optical system,
in which the illumination optical system includes:
a first light source including a laser diode,
a first beam spread angle changing element changing a beam spread angle of light incident from the first light source,
an integrator equalizing an illuminance distribution of light in a predetermined illuminated region illuminated with light having passed through the first beam spread angle changing element, and
a first small-amplitude oscillation element disposed between the first light source and the first beam spread angle changing element or between the first beam spread angle changing element and the integrator, and changing, from time to time, an illumination state in the illuminated region,
the integrator is configured of a first fly-eye lens and a second fly-eye lens, the first fly-eye lens where light from the first beam spread angle changing element enters, the second fly-eye lens where light from the first fly-eye lens enters, and
optical magnification of an optical system configured of the first beam spread angle changing element and the first and second fly-eye lenses, and a shape of the first small-amplitude oscillation element, and an amount of displacement of each light source image by oscillation amplitude of the first small-amplitude oscillation element are determined to allow a size of each light source image formed on the second fly-eye lens by each cell of the first fly-eye lens not to exceed a size of one cell of the second fly-eye lens.

The present application contains subject matter related to that disclosed in Japanese Priority Patent Application 2011-62923 filed in the Japan Patent Office on Mar. 22, 2011, and Japanese Priority Patent Application 2011-258665 filed in the Japan Patent Office on Nov. 28, 2011, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:
1. An illumination device comprising:
a first light source including a first solid light-emitting element, which emits light from a light-emission region configured of a single or a plurality of light-emission spots;
a first beam spread angle changing element that changes a beam spread angle of light incident from the first light source;
an integrator that equalizes an illuminance distribution of light in a predetermined illuminated region illuminated with light having passed through the first beam spread angle changing element; and
a first small-amplitude oscillation element disposed between the first light source and the first beam spread angle changing element or between the first beam spread angle changing element and the integrator, and that changes, from time to time, an illumination state in the illuminated region,
wherein,
the first solid light-emitting element includes a laser diode,
the integrator is configured of a first fly-eye lens and a second fly-eye lens, the first fly-eye lens being where light from the first beam spread angle changing element enters, the second fly-eye lens being where light from the first fly-eye lens enters,
optical magnification of an optical system comprised of the first beam spread angle changing element and the first and second fly-eye lenses, and a shape of the first small-amplitude oscillation element are such to allow a size of each light source image formed on the second fly-eye lens by each cell of the first fly-eye lens not to exceed a size of one cell of the second fly-eye lens, and
an amount of displacement of each light source image by oscillation amplitude of the first small-amplitude oscillation element is such not to form the light source image over a plurality of cells of the second fly-eye lens.

2. The illumination device according to claim 1, wherein:
the first solid light-emitting element is configured of a single chip emitting light in a predetermined wavelength band, or a plurality of chips emitting light in the same wavelength band, or light in different wavelength bands, and
the amount of displacement of the light source image by oscillation amplitude of the first small-amplitude oscillation element satisfies the following relational expression:

$$h+d \leq h_{FEL2},$$

where h is the size of the light source image,
d is the amount of displacement of the light source image by oscillation of the first small-amplitude oscillation element, and
$h_{FEL2}$ is the size of one cell of the second fly-eye lens.

3. The illumination device according to claim 2, wherein cells of the first and second fly-eye lenses each have an aspect ratio not equal to 1, and
the amount of displacement of the light source image by oscillation amplitude of the first small-amplitude oscillation element satisfies the following relational expressions:

$$h_x+d_x \leq h_{FEL2x}, \text{ and}$$

$$h_y+d_y \leq h_{FEL2y},$$

where,
$h_x$ is a size in a first direction (a longer direction of each cell of the first and second fly-eye lenses or a direction corresponding thereto) of the light source image,
$h_y$ is a size in a second direction (a shorter direction of each cell of the first and second fly-eye lenses or a direction corresponding thereto) orthogonal to the first direction of the light source image,
$h_{FEL2x}$ is a size in the first direction of one cell of the second fly-eye lens,
$h_{FEL2y}$ is a size in the second direction of one cell of the second fly-eye lens,
$d_x$ is a component in the first direction ($d_x \geq 0$, but $d_x > 0$ under $d_y=0$) of the amount of displacement of the light source image by oscillation amplitude of the first small-amplitude oscillation element, and
$d_y$ is a component in the second direction ($d_y \geq 0$, but $d_y > 0$ under $d_x=0$) of the amount of displacement of the light source image by oscillation amplitude of the first small-amplitude oscillation element.

4. The illumination device according to claim 1 further comprising:
- a second light source including a second solid light-emitting element, which emits light from a light-emission region configured of a single or a plurality of light-emission spots;
- a second beam spread angle changing element that changes a beam spread angle of light incident from the second light source; and
- an optical path combining element that combines light having passed through the first beam spread angle changing element and light having passed through the second beam spread angle changing element into composite light, and then outputting the composite light to the integrator, wherein,
- the second solid light-emitting element includes a laser diode, and
- the first small-amplitude oscillation element is disposed between the optical path combining element and the integrator.

5. The illumination device according to claim 4, wherein:
the first small-amplitude oscillation element is disposed between the first light source and the first beam spread angle changing element or between the first beam spread angle changing element and the optical path combining element,
the illumination device further includes a second small-amplitude oscillation element disposed between the second light source and the second beam spread angle changing element or between the second beam spread angle changing element and the optical path combining element, and that changes, from time to time, an illumination state in the illuminated region,
optical magnification of an optical system configured of the second beam spread angle changing element and the first and second fly-eye lenses, and a shape of the second small-amplitude oscillation element are such to allow the size of each light source image formed on the second fly-eye lens by each cell of the first fly-eye lens not to exceed the size of one cell of the second fly-eye lens, and
a shape of the second small-amplitude oscillation element and an amount of displacement of each light source image by oscillation amplitude of the second small-amplitude oscillation element are such not to form the light source image over a plurality of cells of the second fly-eye lens.

6. The illumination device according to claim 1, wherein:
a focal length of the first beam spread angle changing element has an aspect ratio not equal to 1,
cells of the first and second fly-eye lenses each have an aspect ratio not equal to 1, and
a ratio of vertical and horizontal focal lengths of the first beam spread angle changing element and an inverse of the aspect ratio of each cell of the second fly-eye lens are equal to each other.

7. The illumination device according to claim 1, wherein:
the first fly-eye lens is disposed in a substantial focal position of the second fly-eye lens, and
the second fly-eye lens is disposed in a substantial focal position of the first fly-eye lens.

8. The illumination device according to claim 1 further comprising:
- a polarization splitting element disposed between the first beam spread angle changing element and the integrator; and
- a retardation film array disposed between the integrator and the illuminated region, wherein,
- the first small-amplitude oscillation element is disposed between the first light source and the first beam spread angle changing element or between the first beam spread angle changing element and the polarization splitting element,
- the polarization splitting element splits light incident from the first beam spread angle changing element into an S-polarized component and a P-polarized component with different traveling directions,
- the retardation film array has first regions and second regions with different phase differences,
- the first regions are disposed in positions where one of the S-polarized component and the P-polarized component split by the polarization splitting element enters, and allow light incident thereto to pass therethrough while maintaining the polarization direction of the incident light, and
- the second regions are disposed in positions where the other polarized component of the S-polarized component and the P-polarized component enters, and converts light incident thereto into light with polarization equal to that of light incident to the first regions.

9. The illumination device according to claim 8, wherein both of the first regions and the second regions have a strip shape extending in a direction orthogonal to a splitting direction in the polarization splitting element, and are alternately arranged in a direction parallel to the splitting direction in the polarization splitting element.

10. The illumination device according to claim 8, wherein cells of the first and second fly-eye lenses each have an aspect ratio not equal to 1, and
both of the first regions and the second regions have a strip shape extending in a direction perpendicular to a longer direction of the first and second fly-eye lenses.

11. The illumination device according to claim 8, wherein:
the retardation film array is disposed in a substantial focal position of the first fly-eye lens, and
the second fly-eye lens is disposed in front of the focal position of the first fly-eye lens.

12. A projection display comprising:
an illumination optical system;
a spatial modulating element that modulates light from the illumination optical system based on an input picture signal to generate image light; and
a projection optical system that projects the image light generated by the spatial modulating element,
wherein,
the illumination optical system includes:
- a first light source including a laser diode,
- a first beam spread angle changing element that changes a beam spread angle of light incident from the first light source,
- an integrator that equalizes an illuminance distribution of light in a predetermined illuminated region illuminated with light having passed through the first beam spread angle changing element, and
- a first small-amplitude oscillation element disposed between the first light source and the first beam spread angle changing element or between the first beam spread angle changing element and the integrator, and that changes, from time to time, an illumination state in the illuminated region,
the integrator is comprised of a first fly-eye lens and a second fly-eye lens, the first fly-eye lens being where light from the first beam spread angle changing element enters, the second fly-eye lens being where light from the first fly-eye lens enters, and optical magnification of an optical system configured of the first beam spread angle changing element and the first and second fly-eye lenses, and a shape of the first small-amplitude oscillation element, and an amount of displacement of each light source image by oscillation amplitude of the first small-amplitude oscillation element are such to allow a size of each light source image formed on the second fly-eye lens by each cell of the first fly-eye lens not to exceed a size of one cell of the second fly-eye lens.

13. A direct-view display comprising:

an illumination optical system;

a spatial modulating element that modulates light from the illumination optical system based on an input picture signal to generate image light;

a projection optical system that projects the image light generated by the spatial modulating element; and a transmissive screen that displays the image light projected from the projection optical system, wherein, the illumination optical system includes:

a first light source including a laser diode, a first beam spread angle changing element that changes a beam spread angle of light incident from the first light source, an integrator that equalizes an illuminance distribution of light in a predetermined illuminated region illuminated with light having passed through the first beam spread angle changing element, and a first small-amplitude oscillation element disposed between the first light source and the first beam spread angle changing element or between the first beam spread angle changing element and the integrator, and that changes, from time to time, an illumination state in the illuminated region, the integrator is comprised of a first fly-eye lens and a second fly-eye lens, the first fly-eye lens being where light from the first beam spread angle changing element enters, the second fly-eye lens being where light from the first fly-eye lens enters, and optical magnification of an optical system comprised of the first beam spread angle changing element and the first and second fly-eye lenses, and a shape of the first small-amplitude oscillation element, and an amount of displacement of each light source image by oscillation amplitude of the first small-amplitude oscillation element are such to allow a size of each light source image formed on the second fly-eye lens by each cell of the first fly-eye lens not to exceed a size of one cell of the second fly-eye lens.

\* \* \* \* \*